United States Patent
Mori et al.

(10) Patent No.: US 6,901,313 B2
(45) Date of Patent: May 31, 2005

(54) LEGGED MOBILE ROBOT AND CONTROL METHOD THEREOF, LEG STRUCTURE OF LEGGED MOBILE ROBOT, AND MOBILE LEG UNIT FOR LEGGED MOBILE ROBOT

(75) Inventors: Naoto Mori, Tokyo (JP); Yuichi Hattori, Chiba (JP); Jinichi Yamaguchi, Tama Research Institute, 5-14-38, Tamadaira, Hino-Shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 103 days.

(21) Appl. No.: 10/181,282
(22) PCT Filed: Nov. 16, 2001
(86) PCT No.: PCT/JP01/10025
§ 371 (c)(1),
(2), (4) Date: Nov. 4, 2002
(87) PCT Pub. No.: WO02/40223
PCT Pub. Date: May 23, 2002

(65) Prior Publication Data
US 2003/0144763 A1 Jul. 31, 2003

(30) Foreign Application Priority Data
Nov. 17, 2000 (JP) ........................... 2000-350923
Nov. 20, 2000 (JP) ........................... 2000-352158
Sep. 12, 2001 (JP) ........................... 2001-277084

(51) Int. Cl.$^7$ ............................................... G06F 19/00
(52) U.S. Cl. ...................... 700/245; 700/246; 700/250; 700/254; 700/260; 700/261; 700/262; 318/568.12; 318/568.15; 901/1; 901/2; 180/8.1; 180/8.6; 701/23
(58) Field of Search ................................ 700/245–246, 700/250, 254, 260–262; 318/568.12, 568.15; 901/1, 2, 8.1, 8.6; 701/23; 180/8.1, 8.6

(56) References Cited

U.S. PATENT DOCUMENTS

| | | | |
|---|---|---|---|
| 5,151,859 A | | 9/1992 | Yoshino et al. |
| 5,255,753 A | | 10/1993 | Nishikawa et al. |
| 5,357,433 A | * | 10/1994 | Takenaka et al. ............. 701/23 |

(Continued)

FOREIGN PATENT DOCUMENTS

| | | |
|---|---|---|
| EP | 0 406 018 | 1/1991 |
| EP | 0 433 091 | 6/1991 |
| EP | 0 573 203 | 12/1993 |

(Continued)

OTHER PUBLICATIONS

Hirai et al., The development of Honda humanoid robot, 1998, IEEE, pp. 1321–1326.*

(Continued)

*Primary Examiner*—Richard M. Camby
*Assistant Examiner*—McDieunel Marc
(74) *Attorney, Agent, or Firm*—Frommer, Lawrence & Haug LLP; William S. Frommer; Darren M. Simon

(57) ABSTRACT

A legged mobile robot controls the posture of the body thereof in a stable manner using a ZMP stability determination criterion with a relatively long sampling period. The legged mobile robot has a stable ZMP region which is a supporting polygon formed of the ground contact point of a sole of a movable leg and a walking surface, and a ZMP behavior space in which a momentum of the robot body is generated so that the ZMP shifts to the approximate center of the stable ZMP region. In the ZMP behavior space, the momentum of the robot shifts in a positive direction or in a negative direction. In the negative direction, a space distortion shifts the ZMP to the periphery of the stable region, and in the positive direction, a space distortion shifts the ZMP to the center of the stable region.

50 Claims, 40 Drawing Sheets

U.S. PATENT DOCUMENTS

| | | | |
|---|---|---|---|
| 5,416,393 A | | 5/1995 | Gomi et al. |
| 5,432,417 A | | 7/1995 | Takenaka et al. |
| 5,445,235 A | | 8/1995 | Gomi et al. |
| 5,455,497 A | | 10/1995 | Hirose et al. |
| 6,493,606 B2 | * | 12/2002 | Saijo et al. .................. 700/245 |
| 6,505,096 B2 | * | 1/2003 | Takenaka et al. ........... 700/245 |
| 6,697,709 B2 | * | 2/2004 | Kuroki et al. ............... 700/245 |
| 2001/0030523 A1 | * | 10/2001 | Mori et al. ............ 318/568.12 |
| 2002/0022907 A1 | * | 2/2002 | Takenaka et al. ........... 700/245 |
| 2002/0183897 A1 | * | 12/2002 | Kuroki et al. ............... 700/245 |
| 2003/0173926 A1 | * | 9/2003 | Hattori et al. ............... 318/567 |

FOREIGN PATENT DOCUMENTS

| | | |
|---|---|---|
| JP | 5-305578 | 11/1993 |
| JP | 5-305585 | 11/1993 |
| JP | 5-305586 | 11/1993 |
| JP | 6-39755 | 2/1994 |
| JP | 2520019 | 5/1996 |
| JP | 2826858 | 9/1998 |
| JP | 10-315349 | 12/1998 |
| JP | 2911985 | 4/1999 |
| JP | 3026275 | 1/2000 |

OTHER PUBLICATIONS

Park et al., Biped robot walking using gravity–compensated inverted pendulum mode and computed torque control, 1998, IEEE, pp. 3528–3533.*

Park et al., ZMP trajectory generation for reduced trunk motions of biped robots,, 1998, IEEE, pp. 90–95.*

* cited by examiner

HEAD UNIT 102

TORSO UNIT 101

UPPER LIMB UNITS 103

LOWER LIMB UNITS 104

AMBULATORY ROBOT 100 (FRONT)

CHANGE OF SHAPE OR
DISPLECEMENT OF ROBOT

ZMP POSITION

STABLE REGION

CHANGE OF SHAPE OR
DISPLECEMENT OF ROBOT

ZMP POSITION

STABLE REGION

RECESS c 403-c

PROJECTION e 403-e

PROJECTION 403d
ANKLE CONNECTION UNIT 401
RECESS 403a
RECESS 403-b
PROJECTION 403e
RECESS 403c
FOOT FRAME 403 (CROSS SECTION)

Roll    Pitch

LEGGED MOBILE ROBOT AND CONTROL METHOD THEREOF, LEG STRUCTURE OF LEGGED MOBILE ROBOT, AND MOBILE LEG UNIT FOR LEGGED MOBILE ROBOT

TECHNICAL FIELD

The present invention relates to a legged mobile robot having at least a plurality of movable legs and, in particular, to a legged mobile robot performing walking operation and other legged operations with the movable legs.

More specifically, the present invention relates to a legged mobile robot which performs body posture control using a so-called ZMP (Zero Moment Point) as a stability determination criterion during the legged operation, and further relates to a legged mobile robot which performs body posture control using a ZMP stability determination criterion with a relatively long sampling period.

BACKGROUND ART

A machine that moves by means of magnetic effects mimicking the behavior of a human is called a "robot." The term robot is said to be derived from Slavic word Robota (slave machine). In Japan, robots started to be widely used from the 1960s, and most of the robots were then industrial robots such as manipulators and conveyance robots for automating a production line in a plant or for use in an unmanned plant.

Research and development have advanced in moving legged mobile robots that imitate the body mechanism and the motion of living things such as humans and apes, which perform bipedal walking, and expectation about the commercialization of these robots is mounted. The legged mobile robot is unstable and presents more difficulty in posture control and legged control than crawling robots, quadrupedalling robots, and sextuple pedalling robots. However, the legged mobile robot is excellent in that the legged mobile robot is flexible in moving over, for instance, bumpy walking surfaces with unregulated surfaces and obstacles, or discontinuous walking surfaces such as stairs or ladders.

The legged mobile robots which mimic the body mechanism and the motion of the human beings are called "human-like figured" or "human-type" robots (humanoid robots). Humanoid robots assist daily life and a variety of human activities in living environments.

The work space and living space of human beings are formed in accordance with the body mechanism and the behavior pattern of bipedal walking human beings. In other words, currently available mechanical systems having wheels or other driving devices as travel means must overcome a diversity of barriers existing in the living space of the human beings. For mechanical systems such as robots to perform various human activities for human beings and become ubiquitous in the living environment, the area of work of the robot is preferably almost identical to that of the human beings. For this reason, the commercialization of the bipedalling legged mobile robots is expected. Bipedal walking capability is an essential requirement for enhancing the intimacy of the robot with the living environment of the human beings.

Numerous techniques have been proposed relating to the posture control and stable walking of the bipedalling legged mobile robot. The stable "walking" may be defined as a "movement around using legs without falling." The posture control of the robot is important to avoid falling during the operation of the robot. The falling means an interruption of the activity of the robot, and a great deal of labor and time is required to stand up from the fallen state and to resume the activity. There is a risk that the robot itself is damaged and that an object that could be hit by the falling robot may be severely destroyed. In the design and development of the legged mobile robot, the posture control for stable posture and falling prevention during walking are the most important issues.

Many proposals relating to the robot posture control and the robot falling prevention during walking use a ZMP (Zero Moment Point) as a walk stability determination criterion. The stability determination criterion of the ZMP is based on "D'Alembert's principle" according to which gravity and inertia working from a walking system on a walking surface balance a floor reaction force and a floor reaction moment as reaction working from the walking surface to the walking system. As a result of kinetic consideration, a point at which a pitch axis moment and a roll axis moment become zero "ZMP" (Zero Moment Point) is present along the edge of a supporting polygon (namely, a stable ZMP region) formed between the sole contact point and the walking surface or within the supporting polygon.

In summary, the ZMP criterion refers to a rule "At any moment of walking, the ZMP is present within a supporting polygon formed of a foot and a walking surface, and if a force a robot applies on the walking surface works, the robot stably walks without falling (without a rotary motion)."

In accordance with the bipedalling pattern based on the ZMP criterion, a sole landing point is set beforehand, and the kinetic restriction conditions of a toe are easy to consider accounting for the configuration of the walking surface. Since the use of the ZMP as the stability determination criterion means that a course rather than a force is treated as a target in motion control, the technical feasibility of using the ZMP as the stability determination criterion is high.

The concept of the ZMP and the application of the ZMP in the stability determination criterion of the legged mobile robot are described in a book entitled "LEGGED LOCOMOTION ROBOTS" authored by Miomir Vukobratovic ("LEGGED ROBOT AND ARTIFICIAL FOOT" translated by Kato et al. (NIKKAN KOGYO SHINBUN)).

In conventional typical posture control and walk control of the robot using the ZMP as the stability determination criterion, the ZMP position is controlled to return to a stable region if the ZMP position is deviated from the stable ZMP region. In other words, during a normal operation, the ZMP is free to move. The ZMP position is controlled in response by controlling joints such as of a leg after the fact that the amount of momentum exceeds a predetermined limit.

The legged mobile robot disclosed in Japanese Unexamined Patent Application Publication No. 5-305579 is designed to stably walk with a point on a floor having a zero ZMP set to be a target value.

In the legged mobile robot disclosed in Japanese Unexamined Patent Application Publication No. 5-305581, a ZMP is positioned within a supporting polyhedron (a polygon) or during landing on or lifting from a floor, the ZMP is positioned to be within a predetermined margin from the edge of a supporting polygon. In this case, the ZMP has the predetermined margin even under the presence of disturbance, and the stability of the robot body is increased during walking.

Japanese Unexamined Patent Application Publication No. 5-305583 discloses a control method in which a walking speed of a legged mobile robot is controlled according to a ZMP target position. Specifically, leg joints are driven so that the ZMP agrees with the target position, using predetermined walk pattern data, and the inclination of the upper body of the robot is detected and a set walk pattern data output rate is modified in accordance with the detected inclination of the upper body. When the robot is forwardly inclined as a result of stepping on unknown walking surface irregularities, the output rate may be increased to recover the posture of the robot. With the ZMP controlled to the target position, the output rate may be modified without any problem during a double support phase.

Japanese Unexamined Patent Application Publication No. 5-305585 discloses a control method in which a landing position of a legged mobile robot is controlled in accordance with a ZMP target position. Specifically, the disclosed legged mobile robot detects a difference between a ZMP target position and an actually measured position, and one or both of the legs are driven to eliminate the difference, or a moment about the ZMP target position is detected and the legs are then driven to reduce the moment to zero.

Japanese Unexamined Patent Application Publication No. 5-305586 discloses a control method in which an inclined posture of a legged mobile robot is controlled in accordance with a ZMP target position. Specifically, a moment about the ZMP position is detected, and stable walking is achieved by driving a leg unit until a moment becomes zero when the moment takes place.

The above-mentioned attitude control methods of the robot are based on a basic operation in which a point at which a pitch axis moment and a roll axis moment become zero is searched for within or along the side of a supporting polygon formed of the ground contact point of a sole of the movable leg and a walking surface, namely, a stable ZMP region. Correction control is performed to return to a stable ZMP region when the ZMP position is deviated from the stable ZMP region.

The ZMP criterion is merely a criterion which is applicable on the assumption that the body of the robot and the walking surface are extremely close to a solid body in nature (specifically, these are not deformable nor movable even under any force or moment). In other words, when the assumption that the robot body and the walking surface are extremely close to a solid body in nature does not hold, a (translational) force acting on the ZMP with the robot moving at a high speed and an impact at the switching of supporting legs become large, and the robot itself is subject to a momentum. Without adequately managing the momentum of the robot in response to the force exerted on the robot, a space within which the ZMP is present becomes unstable. Even if the posture of the robot satisfies the. ZMP criterion (namely, the ZMP is present within the supporting polygon, and the robot exerts a pressing force on the walking surface), the robot posture itself becomes unstable as a result of stabilizing an unstable ZMP. As the center of gravity of the robot becomes lower in level, a rotary motion takes place in the robot body, and stable walking becomes very difficult to accomplish.

FIG. 1 and FIG. 2 respectively illustrate an ideal model in which a robot and a walking surface are extremely close to a solid body in nature, and the relationship (in other words, a ZMP behavior space of the robot) between the ZMP position and the momentum of the robot when the robot body and the walking surface are really not solid.

In the ideal case in which the robot and the walking surface are extremely close to a solid body in nature, no momentum takes place in the robot in any ZMP position in the calculated stable ZMP region within the ZMP behavior space as shown in FIG. 1. In other words, the stable posture of the robot body is not destroyed at any ZMP position.

In the ZMP behavior space in an actual system, the robot and the walking surface are not solid. Even within the calculated stable ZMP region, a momentum takes place in the robot depending on the ZMP position. In the case illustrated in FIG. 2, no momentum takes place in the robot in the vicinity of the center of the stable ZMP region. In this state, the stable posture of the robot is not destroyed. As the ZMP position outwardly shifts from the center of the stable ZMP region, the momentum of the robot increases in a negative direction.

Referring to FIG. 1 and FIG. 2, the ZMP behavior space is defined by a ZMP position and a floor reaction force of a floor surface acting on the robot body. Concerning the direction of the momentum of the robot, a negative direction is defined as a direction which distorts the space in a manner such that the ZMP position shifts toward the periphery of the stable region, and a positive direction is defined as a direction which distorts the space in a manner such that the ZMP position shifts to the center of the stable region. As shown in FIG. 2, the momentum of the robot increases in the negative direction as the ZMP position outwardly shifts from the center of the stable ZMP region. Even within the stable ZMP region, the robot is displaced toward the periphery of the stable ZMP region, and finally falls.

For this reason, posture control must be continuously performed to shift the ZMP position back to the center of the stable ZMP region even if calculation shows that the ZMP position of the robot stays within the stable ZMP region. A typical example of the control method in which the ZMP position is continuously shifted back to the center is an "inverse pendulum." In this case, high-speed control needs to be carried out (specifically, the sampling period of the system is extremely short), and the workload on a computer performing posture control increases.

The ZMP stability determination criterion is a mere criterion which is based on the assumption that walking is performed under ideal environments including preconditions that cannot be realized under actual operation environments. To allow the robot to continuously walk in an autonomous fashion under living environments of human beings, a robot system configuration accounting for the stability of the ZMP space needs to be invented.

The stability and the controllability of the legged mobile robot during a legged job are subject to not only a gait pattern or a motion pattern of the four limbs but also conditions of the ground and walking surfaces on which the legged job such as walking is performed. This is because as long as the legs of the robot are in contact with the walking surface, the robot is continuously under a reaction force. The reaction force from the walking surface becomes a large impact particularly when the lifted leg lands on the ground during the legged job such as walking. The reaction force can become a disturbance, leading to an instability of the robot.

In other words, to allow the biped walking robot to perform the legged job without destroying the posture thereof, the robot preferably fits the ground with a stable posture thereof kept at the moment of landing, and the reaction force of the walking surface acting on the robot during the landing is preferably reduced as much as possible. The structure of the sole of the foot which comes into contact with the ground is extremely important to establish an excellent relationship between the robot and the ground surface.

To absorb the impact from which the robot suffers from the ground surface during the landing, it is well known to those skilled in the art that an elastic material is applied on the sole of the foot.

When the robot receives a reaction force from the ground surface during the landing of the leg, the robot body is subject to various disturbances about the roll axis and the pitch axis thereof. The legged mobile robot which mainly moves forward has a wide degree of freedom in the fore-aft direction, and relatively easily responds to disturbances in the forward direction, namely, about the pitch axis. On the other hand, the legged mobile robot has a low robustness to disturbances about the roll axis that roll the robot. Even if the impact from the ground surface is uniformly absorbed by the elastic material on the sole of the foot, the impact about each axis is merely absorbed. The robot stable posture which has been destroyed at the landing of the foot or by other disturbances is not restored. Although the impact at the moment of landing is absorbed, the robot body may finally fall. In this case, posterior control in which the ZMP is corrected after the fact that the ZMP position has been deviated from the stable ZMP region is subject to limitation.

The search for the ZMP means the passage of the trajectory of the ZMP between both right and left feet (namely, the inside of each foot) in the bipedalling legged mobile robot body. More specifically, when the ZMP trajectory is shifted outside of one foot as a result of the movement of the robot, the stable posture of the robot cannot be maintained unless the robot steps on the outside of the other foot. This operation is a crossing operation of the legs across the one foot and the other foot, and is a physically and mechanically difficult action in which the right and left legs interfere with each other.

The biped walking robot is designed based on the movement in accordance with the behavior mechanism of the human beings and apes. The robustness of the robot to disturbances in the fore-aft direction is high, while the robustness to disturbances in the traverse direction is relatively low.

In view of the computation speed of a controller, the response speed of a target to be controlled, and other parameters, it is extremely difficult to control the posture of the robot by operation control alone during the legged job. In other words, the posterior control in which the ZMP is corrected after the fact that the ZMP position has been deviated from the stable ZMP region is subject to limitation.

DISCLOSURE OF THE INVENTION

It is an object of the present invention to provide an excellent legged mobile robot and a control method therefor, in which the posture control of the robot is appropriately performed using a so-called ZMP (Zero Moment Point) as a stability determination criterion during a legged job.

It is yet another object of the present invention to provide an excellent legged mobile robot and a control method therefor, in which the posture control of the robot is appropriately performed using the ZMP stability determination criterion with a relatively long sampling period.

It is yet a further object of the present invention to provide an excellent legged mobile robot and a control method therefor, in which a ZMP behavior space to allow the robot to dynamically walk in a stable under living environments of human beings is formed.

It is yet a further object of the present invention to provide a foot structure in a movable leg unit of a legged mobile robot, in which an impact of a walking surface to which a foot is subject at the moment of landing is absorbed, and a stable robot posture which is about to be destroyed is restored or the restoration of the stable posture becomes easy.

It is yet a further object of the present invention to provide an excellent legged mobile robot which easily maintains a stable posture thereof not only by the operation control of the robot body but also by means the mechanical structure of the robot.

It is yet another object of the present invention to provide an excellent legged mobile robot which easily maintains the posture stability thereof by enhancing the robustness thereof against traverse disturbances.

The present invention has been developed in view of these objects, and relates in one aspect to a legged mobile robot having at least two movable legs and a control method therefor. The legged mobile robot and the control method therefore respectively comprise ZMP behavior space control means and step for controlling a ZMP behavior space which is defined by a ZMP position at which a pitch axis moment and a roll axis moment of the body of the robot become zero and a floor reaction force of a floor surface acting on the body of the robot, wherein the ZMP behavior space control means and step impart beforehand a predetermined distortion or predetermined characteristics to the ZMP behavior space.

As already discussed in connection with the "Background Art," the ZMP stability determination criterion is used only when the robot body and the walking surface are extremely close to a solid body in nature. In other words, when the assumption that the robot body and the walking surface are extremely close to a solid body in nature does not hold, the space within which the ZMP is present become unstable unless the momentum of the robot in response to a force applied thereon is managed properly with a relatively short sampling period. Even if the posture of the robot satisfies the ZMP stability determination criterion, the posture of the robot becomes unstable to stabilize the unstable ZMP.

In the ambulator robot and the control method therefor in accordance with the first aspect of the present invention, the ZMP (Zero Moment Point) is adopted as a stability determination criterion for posture. A robot system configuration having a stable ZMP space is adopted accounting for the momentum of the robot body.

The ZMP behavior space control means or step may impart beforehand a distortion to the ZMP behavior space so that a momentum takes place in the robot body to shift the ZMP position to the center of a stable ZMP region as the ZMP position shifts from the center of the stable ZMP region which is a supporting polygon formed of the ground contact point of a sole of the movable leg and the walking surface. In this way, a structure results in which the robot easily maintains the posture thereof. In the ZMP behavior space control means or step, the predetermined characteristics may be that the momentum of the robot changes in magnitude or direction in response to the floor reaction force.

In the legged mobile robot and the control method therefor in accordance with the first aspect of the present invention, the space distortion and the predetermined characteristics are provided rather than starting posterior correction control after the fact that the shifting of the ZMP position has exceeded a predetermined range. Even if the control mechanism of the robot body has no sufficiently fast response, a high robustness against disturbances is assured.

In the ZMP behavior space control means or step, the ZMP behavior space control means may set the momentum of the robot body to a minimum point in the approximate center of the stable ZMP region. In this case, the momentum of the robot body takes place in a direction that the posture is continuously stabilized. The posture stability is thus easily maintained. Even with a relatively long sampling period, a sufficiently stable posture control is performed.

The ZMP behavior space control means or step may set the momentum of the robot body to a minimum point in the approximate center of the stable ZMP region, while setting the momentum of the robot body to a maximum point in the vicinity of the boundary of the stable ZMP region. In an area interposed between the maximum points, the momentum of the robot body takes place so that the ZMP position shifts toward the center of the stable ZMP region. It is easy to maintain the posture stability. Even with a relatively long sampling period, a sufficiently stable posture control is performed. In contrast, beyond the maximum points, the momentum of the robot takes place so that the ZMP position outwardly shifts from the stable ZMP region. The robot is thus transitioned from a "posture stability model", to a "falling mode."

The ZMP behavior space control means or step may impart a space distortion to an upstanding leg during the later term of a single support phase, in the ZMP behavior space formed of a first coordinate axis having, as a positive direction, a direction in which the ZMP position outwardly shifts out of the robot body, and a second coordinate axis having, as a positive direction, a direction in which the momentum of the robot causes the ZMP position to shift toward the center of the stable ZMP region so that the momentum of the robot has a maximum value in a negative region of the ZMP behavior space, and so that the ZMP position of the maximum value of the momentum of the robot is shifted in a positive direction as the floor reaction force increases.

In this case, flexing is reduced in approximately linear proportion to the shifting of the ZMP position in the Y direction in the upstanding leg during the later term of the single support phase. When the floor reaction force is small, the upstanding leg is inwardly flexed when the ZMP position shifts to the inside of the robot body. The upstanding leg is flexed outwardly when the ZMP position outwardly shifts from the robot body. As the floor reaction force becomes large, the upstanding leg becomes difficult to outwardly flex even if the ZMP position outwardly shifts out of the robot body.

Assuming that the overall weight of the robot is 100, the floor reaction force is defined as a "large" force when it becomes equal to or larger than 100. When the floor reaction force is within a range from 20 to 100, it is defined as an "intermediate" force and when the floor reaction force is equal to or smaller than 20, it is defined as a "small" force. These are rough measures, and depending on the robot structure and weight, this categorization is subject to change. A "small floor reaction force," in qualitative point of view, refers to a floor reaction force acting on the other foot when one foot supports almost entire body of the robot during a double support phase.

The ZMP behavior space control means or step may impart a space distortion to an upstanding leg during the later term of a single support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region so that the momentum of the robot in a negative region of the ZMP behavior space has a maximum value in the approximate center of the stable ZMP region, and so that a change in the momentum of the robot is decreased as the floor reaction force increases.

In this case, flexing is reduced in approximately linear proportion to the shifting of the ZMP position in the X direction in the upstanding leg during the later term of the single support phase. When the floor reaction force is small, the upstanding leg is forwardly flexed when the ZMP position forwardly shifts from the robot body. The upstanding leg is flexed backward when the ZMP position backwardly shifts from the robot body. As the floor reaction force becomes large, the upstanding leg becomes difficult to flex regardless of whether the ZMP position forwardly or backwardly shifts.

In a direction perpendicular to the direction of movement, the ZMP behavior space control means or step may impart a space distortion to an upstanding leg during the later term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases. In the direction of movement, the ZMP behavior space control means or step may impart a space distortion to the upstanding leg during the later term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

During the single support phase with the floor reaction force being small, the upstanding leg is inwardly flexed as the ZMP position shifts inwardly to the robot body, and is outwardly flexed as the ZMP position outwardly shifts from the robot body. With the floor reaction force increasing, conversely, the upstanding leg is outwardly flexed as the ZMP position inwardly shifts to the robot body, and is inwardly flexed as the ZMP position outwardly shifts from the robot body. When the floor reaction force is small, the upstanding leg is forwardly flexed as the ZMP position forwardly shifts from the robot body, and is backwardly flexed as the ZMP position backwardly shifts from the robot body. With the floor reaction force increasing, conversely, the upstanding leg is backwardly flexed as the ZMP position forwardly shifts from the robot body, and is forwardly flexed as the ZMP position backwardly shifts from the robot body.

In a direction perpendicular to the direction of movement, the ZMP behavior space control means or step may impart a space distortion to a torso unit during the later term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases. In the direction of movement, the ZMP behavior space control means or step may impart a space distortion to the torso unit during the later term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

When the floor reaction force is small, the torso unit is inwardly flexed as the ZMP position shifts inwardly to the robot body, and is outwardly flexed as the ZMP position outwardly shifts from the robot body. With the floor reaction force increasing, conversely, the torso unit is outwardly flexed as the ZMP position inwardly shifts to the robot body, and is inwardly flexed as the ZMP position outwardly shifts from the robot body. When the floor reaction force is small, the torso unit is forwardly flexed as the ZMP position forwardly shifts from the robot body, and is backwardly flexed as the ZMP position backwardly shifts from the robot body. With the floor reaction force increasing, conversely, the torso unit is backwardly flexed as the ZMP position forwardly shifts from the robot body, and is forwardly flexed as the ZMP position backwardly shifts from the robot body.

The ZMP behavior space control means or step may impart a space distortion to upstanding legs during a double support phase, in the ZMP behavior space formed of a first coordinate axis having, as a positive direction, a direction in which the ZMP position outwardly shifts out of the robot body, and a second coordinate axis having, as a positive direction, a direction in which the momentum of the robot causes the ZMP position to shift toward the center of the stable ZMP region so that the momentum of the robot in a negative region of the ZMP behavior space has a maximum value in the approximate center of the stable ZMP region, and so that a change in the momentum of the robot is decreased as the floor reaction force increases.

In this case, the flexing of the leg is reduced in approximately linear proportion to the shifting of the ZMP position in the outward direction from the robot body. When the floor reaction force is small, the upstanding leg is inwardly flexed as the ZMP position inwardly shifts to the robot body, and is outwardly flexed as the ZMP position shifts outwardly from the robot body. With the floor reaction force increasing, the upstanding leg becomes difficult to flex regardless of whether the ZMP position forwardly or backwardly shifts. During the double support phase, the robot is supported by both legs, and the flex of the leg is smaller than that during the single support phase with a single leg supporting the robot.

The ZMP behavior space control means or step may impart a space distortion to upstanding legs during a double support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region so that the momentum of the robot in a negative region of the ZMP behavior space has a maximum value in the approximate center of the stable ZMP region, and so that a change in the momentum of the robot is decreased as the floor reaction force increases.

In this case, the flexing of the leg is reduced in approximately linear proportion to the shifting of the ZMP position in the forward direction from the robot body. When the floor reaction force is small, the upstanding leg is forwardly flexed when the ZMP position forwardly shifts from the robot body. The upstanding leg is backwardly flexed when the ZMP position backwardly shifts from the robot body. As the floor reaction force becomes large, the upstanding leg becomes difficult to flex regardless of whether the ZMP position forwardly or backwardly shifts. During the double support phase, the robot is supported by both legs, and the flexing of the leg is smaller than that during the single support phase with a single leg supporting the robot.

In a direction perpendicular to the direction of movement, the ZMP behavior space control means or step may impart a space distortion to upstanding legs during a double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases. In the direction of movement, the ZMP behavior space control means or step may impart a space distortion to the upstanding legs during the double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

During the double support phase with the floor reaction force being small, the upstanding leg is inwardly flexed as the ZMP position inwardly shifts to the robot body, and is outwardly flexed as the ZMP position outwardly shifts from the robot body. With the floor reaction force increasing, conversely, the upstanding leg is outwardly flexed as the ZMP position inwardly shifts to the robot body, and is inwardly flexed as the ZMP position outwardly shifts from the robot body. When the floor reaction force is small, the upstanding leg is forwardly flexed as the ZMP position forwardly shifts from the robot body, and is backwardly flexed as the ZMP position backwardly shifts from the robot body. With the floor reaction force increasing, conversely, the upstanding leg is backwardly flexed as the ZMP position forwardly shifts from the robot body, and is forwardly flexed as the ZMP position backwardly shifts from the robot body.

In a direction perpendicular to the direction of movement, the ZMP behavior space control means or step may impart a space distortion to a torso unit during a double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases. In the direction of movement, the ZMP behavior space control means or step may impart a space distortion to the torso unit during the double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

When the floor reaction force is small, the torso unit is inwardly flexed as the ZMP position shifts inwardly to the robot body, and is outwardly flexed as the ZMP position outwardly shifts from the robot body. With the floor reaction force increasing, conversely, the torso unit is outwardly flexed as the ZMP position inwardly shifts to the robot body, and is inwardly flexed when the ZMP position outwardly shifts from the robot body. When the floor reaction force is small, the torso unit is forwardly flexed as the ZMP position forwardly shifts from the robot body, and is backwardly flexed as the ZMP position backwardly shifts from the robot body. With the floor reaction force increasing, conversely, the torso unit is backwardly flexed as the ZMP position forwardly shifts from the robot body, and is forwardly flexed as the ZMP position backwardly shifts from the robot body.

The ZMP behavior space control means or step may impart a space distortion to an upstanding leg during the early term of a single support phase, in the ZMP behavior space formed of a first coordinate axis having, as a negative direction, a direction in which the ZMP position outwardly shifts out of the robot body, and a second coordinate axis having, as a positive direction, in a direction in which the momentum of the robot causes the ZMP position to shift toward the center of the stable ZMP region so that the momentum of the robot has a maximum value in a negative region of the ZMP behavior space, and so that the ZMP position of the maximum value of the momentum of the robot body is shifted in the positive direction as the floor reaction force increases.

In the leg upstanding during the single support phase, the flexing of the leg is reduced in approximately linear proportion to the shifting of the ZMP position in the Y direction. When the floor reaction force is small, the upstanding leg is inwardly flexed as the ZMP position inwardly shifts to the robot body, and is outwardly flexed as the ZMP position outwardly shifts from the robot body. With the floor reaction force increasing, the upstanding leg becomes difficult to outwardly flex even if the ZMP position outwardly shifts from the robot body.

The ZMP behavior space control means or step may impart a space distortion to an upstanding leg during the early term of a single support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region so that the momentum of the robot in a negative region of the ZMP behavior space has a maximum value in the approximate center of the stable ZMP region, and so that a change in the momentum of the robot is decreased as the floor reaction force increases.

In the leg upstanding during the early term of the single support phase, the flexing of the leg is reduced in approximately linear proportion to the shifting of the ZMP position in the X direction. When the floor reaction force is small, the upstanding leg is forwardly flexed as the ZMP position forwardly shifts from the robot body, and is backwardly flexed as the ZMP position backwardly shifts from the robot body. With the floor reaction force increasing, the upstanding leg becomes difficult to flex regardless of whether the ZMP position forwardly or backwardly shifts from the robot body.

In a direction perpendicular to the direction of movement, the ZMP behavior space control means or step may impart a space distortion to an upstanding leg during the early term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases. In the direction of movement, the ZMP behavior space control means or step may impart a space distortion to the upstanding leg during the early term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

During the early term of the single support phase with the floor reaction force being small, the upstanding leg is outwardly flexed as the ZMP position outwardly shifts from the robot body, and is inwardly flexed as the ZMP position inwardly shifts to the robot body. With the floor reaction force increasing, conversely, the upstanding leg is inwardly flexed as the ZMP position outwardly shifts from the robot body, and is outwardly flexed as the ZMP position inwardly shifts to the robot body. When the floor reaction force is small, the upstanding leg is forwardly flexed as the ZMP position forwardly shifts from the robot body, and is backwardly flexed as the ZMP position backwardly shifts from the robot body. With the floor reaction force increasing, conversely, the upstanding leg is backwardly flexed as the ZMP position forwardly shifts from the robot body, and is forwardly flexed as the ZMP position backwardly shifts from the robot body.

In a direction perpendicular to the direction of movement, the ZMP behavior space control means or step may impart a space distortion to a torso unit during the early term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases. In the direction of movement, the ZMP behavior space control means or step may impart a space distortion to the torso unit during the early term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

When the floor reaction force is small, the torso unit is outwardly flexed as the ZMP position outwardly shifts from the robot body, and is inwardly flexed as the ZMP position inwardly shifts to the robot body. With the floor reaction force increasing, conversely, the torso unit is inwardly flexed as the ZMP position outwardly shifts from the robot body, and is outwardly flexed as the ZMP position inwardly shifts to the robot body. When the floor reaction force is small, the torso unit is forwardly flexed as the ZMP position forwardly shifts from the robot body, and is backwardly flexed as the ZMP position backwardly shifts from the robot body. With the floor reaction force increasing, conversely, the torso unit is backwardly flexed as the ZMP position forwardly shifts from the robot body, and is forwardly flexed as the ZMP position backwardly shifts from the robot body.

The ZMP behavior space control means may be a foot structure of each movable, including a foot frame having a generally planar structure, a sole cushioning body, disposed on the sole of the foot frame, having non-linear elastic characteristics with an area having a relatively large deformation for an initial period and an area having a relatively small deformation subsequent to the initial period, and an ankle connection unit, disposed on the approximate center of the top surface of the foot frame, for linking the foot frame to the movable leg of the legged mobile robot.

The sole cushioning body having the non-linear elastic characteristics is deformed first when the foot comes into contact with the walking surface. A sufficient cushioning effect is thus expected. As the sole cushioning body is further deformed, the non-linear elastic characteristics reduce a deformation per applied load, and the sole of the foot is free from becoming unstable due to an excess deformation. In other words, the ZMP behavior space control means, formed of the foot structure, results in the ZMP behavior space having a space deformation that causes the momentum of the robot to shift the ZMP position inwardly to the stable ZMP region.

The ZMP behavior space control means may be a leg structure of each movable leg, including at least one joint actuator for accomplishing degrees of freedom at the movable leg, an inner support body having a first rigidity for supporting the joint actuator on the inside of the legged mobile robot body, and an outer support body, having a second rigidity relatively larger than the first rigidity, for supporting the joint actuator on the outside of the legged mobile robot body.

The ZMP behavior space control means, formed of the leg structure, makes it difficult for the ZMP to shift to the outside of the foot, namely, the opposite side from the arch of the foot even when unexpected disturbances occur in the robot body. As a result, the robustness of the legged mobile robot against the traverse disturbances is enhanced, thereby substantially facilitating posture control of the robot body. In other words, the ZMP is guided to shift to the inside of the robot body, namely, the arch side of the foot. A space distortion, which results in the momentum of the robot which causes the ZMP position to inwardly move to within the stable ZMP region, is imparted to the ZMP behavior space. For example, the legged mobile robot quickly lands a lifted foot when an unexpected disturbance shifts the ZMP to the arch side of the foot, namely, between the left and right feet. The stable region is thus expanded, thereby easily preventing falling.

The present invention in a second aspect relates to a foot structure for a legged mobile robot having at least a plurality of movable legs. The foot structure includes a foot frame having a generally planar structure, a sole cushioning body, disposed on the sole of the foot frame, having non-linear elastic characteristics with an area having a relatively large deformation for an initial period and an area having a relatively small deformation subsequent to the initial period, and an ankle connection unit, disposed on the approximate center of the top surface of the foot frame, for linking the foot frame to the movable leg of the legged mobile robot.

The sole cushioning body may be formed of at least two cushioning materials arranged at predetermined locations on the sole of the foot frame, wherein the cushioning materials are different in height dimensions. The use of the cushioning materials having different height dimensions relatively easily achieves non-linear deformation characteristics of the sole cushioning body.

The cushioning body having the non-linear elastic characteristics is deformed first when the foot comes into contact with the walking surface. A sufficient cushioning effect is thus expected. As the sole cushioning body is further deformed, the non-linear elasticity reduces a deformation per applied load, and the sole of the foot is free from becoming unstable due to an excess deformation. In other words, the foot structure of the legged mobile robot in the second aspect of the present invention provides the ZMP behavior space having a space deformation that causes the momentum of the robot to inwardly shift the ZMP position to the stable ZMP region.

The cushioning materials may be disposed on the inside portion and the outside portion of the sole of the foot frame. The cushioning materials may be disposed on the inside portion and the outside portion of the sole of the foot frame, wherein the cushioning material on the outside portion is higher in rigidity than the cushioning material on the inside portion.

The difference between the deformation characteristics of the sole cushioning materials on the inside portion and the outside portion on the sole of the foot allows the inside cushioning material sinks more than the outside cushioning material when a high impact is exerted on the robot. As a result, the leg unit mounted on the foot frame is inclined toward the inside of the robot body, namely, toward the center (the arch side of the foot) of the robot body. The lifted leg is thus landed while the ZMP of the robot inwardly shifts to the robot body so that the stable region is expanded. The stability and controllability in the posture of the robot are thus enhanced.

Rigidity about a roll axis of the legged mobile robot may be set to be higher than rigidity about a pitch axis of the legged mobile robot in the foot frame. A rigidity about a roll axis of the legged mobile robot may be set to be higher than a rigidity about a pitch axis of the legged mobile robot by forming recesses on the top surface and/or the sole of the foot frame at predetermined locations thereof.

A bipedalling legged mobile robot typically has a narrower range in the ZMP in a traverse direction (a direction about the roll axis) than that in a fore-aft direction (a direction about a pitch axis). In other words, the robustness against the disturbances about the roll axis is low, and extremely high control accuracy is required of the robot in the transverse direction, namely, about the roll axis. In accordance with the foot structure of the present invention, the rigidity about the roll axis is increased, thereby substantially enhancing the robustness against the transverse disturbances. As a result, the posture control of the bipedalling legged mobile robot becomes easy.

The present invention in a third aspect relates to a legged mobile robot and includes at least a pair of left and right movable leg units for performing a bipedalling job. The movable leg unit includes at least one joint actuator for accomplishing degrees of freedom at a movable leg, an inner support body having a first rigidity for supporting the joint actuator on the inside of the legged mobile robot body, and an outer support body, having a second rigidity relatively larger than the first rigidity, for supporting the joint actuator on the outside of the legged mobile robot body.

The legged mobile robot of the present invention in the third aspect thereof adopts, in each of the left and right movable leg units, a structure in which the outside support body and the inside support body are different in rigidity, specifically, the outside support body is set to be higher in rigidity (particularly, in flexural rigidity) than the inside support body. This arrangement makes it difficult for the ZMP to shift to the outside of the foot, namely, the side opposite from the arch of the foot even when unexpected disturbances occur in the robot body. As a result, the robustness of the legged mobile robot against the traverse disturbances is enhanced, thereby substantially facilitating posture control of the robot body.

In other words, the ZMP is guided to shift to the inside of the robot body, namely, the arch side of the foot. A space distortion, which results in the momentum of the robot which causes the ZMP position to inwardly move to within the stable ZMP region, is imparted to the ZMP behavior space. For example, the legged mobile robot quickly lands a lifted foot when an unexpected disturbance shifts the ZMP to the arch side of the foot, namely, between the left and right feet. The stable region is thus expanded, thereby easily preventing falling.

The second rigidity is preferably 1.2 times as high as the first rigidity in terms of flexural rigidity.

The difference between the first rigidity and the second rigidity may be accomplished by making a difference in thickness between the inner support body and the outer support body.

The difference between the first rigidity and the second rigidity may be accomplished by making a difference in shape between the inner support body and the outer support body.

The difference between the first rigidity and the second rigidity may be accomplished by fabricating the inner support body and the outer support body of materials having different mechanical strengths.

The degrees of freedom of joint of the movable leg may include at least the degree of freedom about a hip roll axis and the degree of freedom about a knee roll axis. Furthermore, the degrees of freedom of joint of the movable leg may include the degree of freedom of the ankle joint for connecting the foot to the leg.

The present invention in a fourth aspect relates to a movable leg unit used in a left and right pair in a legged mobile robot performing a legged job. The movable leg unit includes at least one joint actuator for accomplishing degrees of freedom at a movable leg, an inner support body having a first rigidity for supporting the joint actuator on the inside of the legged mobile robot body, and an outer support body, having a second rigidity relatively larger than the first rigidity, for supporting the joint actuator on the outside of the legged mobile robot body.

The legged mobile robot of the present invention in the fourth aspect thereof adopts, in each of the pair left and right movable leg units, a structure in which the outside support body and the inside support body are different in rigidity, specifically, the outside support body is set to be higher in rigidity (particularly, in flexural rigidity) than the inside support body. This arrangement makes it difficult for the ZMP to shift to the outside of the foot, namely, the side opposite from the arch of the foot even when unexpected disturbances occur in the robot body. As a result, the robustness of the legged mobile robot against the traverse disturbances is enhanced, thereby substantially facilitating posture control of the robot body.

In other words, the ZMP is guided to shift to the inside of the robot body, namely, the arch side of the foot. A space distortion, which results in the momentum of the robot which causes the ZMP position to inwardly move to within the stable ZMP region, is imparted to the ZMP behavior space. For example, the legged mobile robot quickly lands a lifted foot when an unexpected disturbance shifts the ZMP to the arch side of the foot, namely, between the left and right feet. The stable region is thus expanded, thereby easily preventing falling.

The second rigidity is preferably 1.2 times as high as the first rigidity in terms of flexural rigidity. More preferably, the second rigidity is preferably 1.5 though 2.0 times as high as the first rigidity.

The difference between the first rigidity and the second rigidity may be accomplished by making a difference in thickness between the inner support body and the outer support body.

The difference between the first rigidity and the second rigidity may be accomplished by making a difference in shape between the inner support body and the outer support body.

The difference between the first rigidity and the second rigidity may be accomplished by fabricating the inner support body and the outer support body of materials having different mechanical strengths.

The degrees of freedom of joint of the movable leg may include at least the degree of freedom about a hip roll axis and the degree of freedom about a knee roll axis. Furthermore, the degrees of freedom of joint of the movable leg may include the degree of freedom of the ankle joint for connecting the foot to the leg.

The present invention in a fifth aspect relates to a method of controlling a legged mobile robot having at least two movable legs, and includes the step of defining a ZMP behavior space by a ZMP position at which a pitch axis moment and a roll axis moment of the body of the robot become zero and by a floor reaction force of a floor surface acting on the robot body, the step of determining a stable ZMP position based on the definition of the ZMP behavior space, and the step of controlling the operation of the robot body based on the determined stable ZMP position.

The control method for controlling the legged mobile robot of the present invention in the fifth aspect thereof adopts the ZMP as the stability determination criterion for posture, and controls the action of the robot body having a stable ZMP space, accounting for the momentum of the robot body.

A distortion is imparted beforehand to the ZMP behavior space so that a momentum takes place in the robot body to shift the ZMP position to the center of a stable ZMP region as the ZMP position shifts from the center of the stable ZMP region which is a supporting polygon formed of the ground contact of a sole of the movable leg and a walking surface. Even when the control mechanism of the robot body has no sufficiently fast response speed, a high robustness against disturbances results.

The control method for controlling the legged mobile robot of the present invention in the fifth aspect thereof may includes the step of modifying the definition of the ZMP behavior space in accordance with the contact condition between the legged mobile robot and a walking surface.

When the floor reaction force of the floor surface acting on the sole of the foot changes, the space distortion imparted to the ZMP behavior space depending on the contact condition between the sole and the walking surface is dynamically controlled. Under any conditions, the posture control of the robot body is easily performed so that the momentum of the robot body takes place causing the ZMP position to shift to the center of the stable ZMP region as the ZMP position outwardly shifts.

The step of defining the ZMP behavior space may designate the maximum point and/or the minimum point at any point in the ZMP behavior space. The step of defining the ZMP behavior space may designate the maximum point and/or the minimum point at any point in the ZMP behavior space at any time. The step of defining the ZMP behavior space may designate the maximum point and/or the minimum point at any point in the ZMP behavior space depending on the support state of the leg, such as the later term of the single support phase, the double support phase, the early term of the single support phase.

In the legged job, the robot dynamically generates the ZMP behavior space having a space distortion in which the posture control is easily performed in response to a momentarily changing gait of the robot.

Other objects, features and advantages of the present invention will become obvious from the following detailed description of the invention and the accompanying drawings.

BEST MODE FOR CARRYING OUT THE INVENTION

The embodiments of the present invention are discussed below with reference to the drawings.

A. Construction of the Robot

Figure 1:
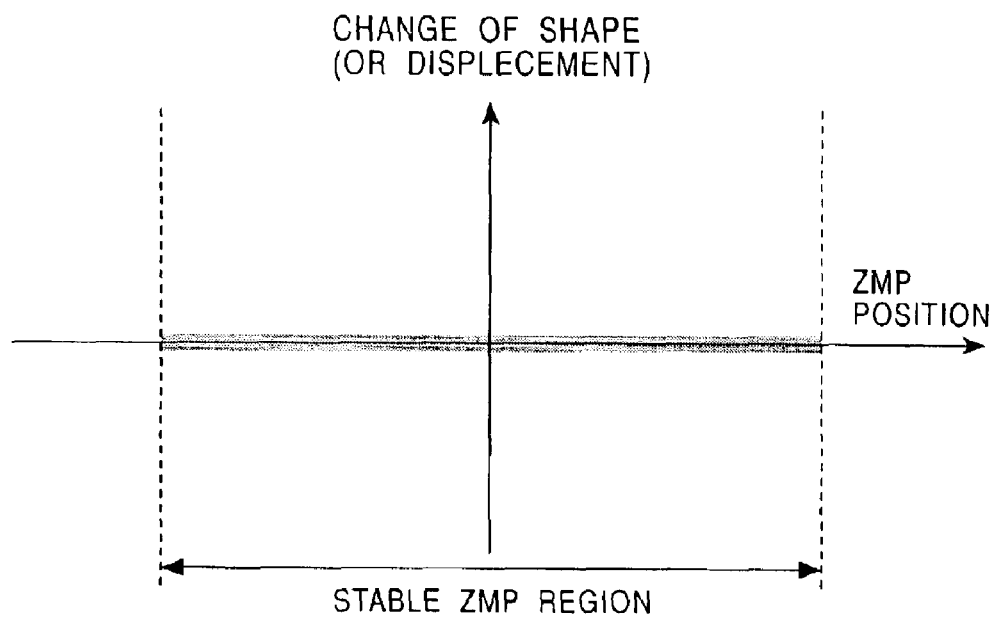
FIG. 1 plots the relationship (a ZMP behavior space of a robot) between a ZMP position and a momentum of the robot in a model in which the robot and a walking surface are extremely close to a solid body in nature.
Figure 2:
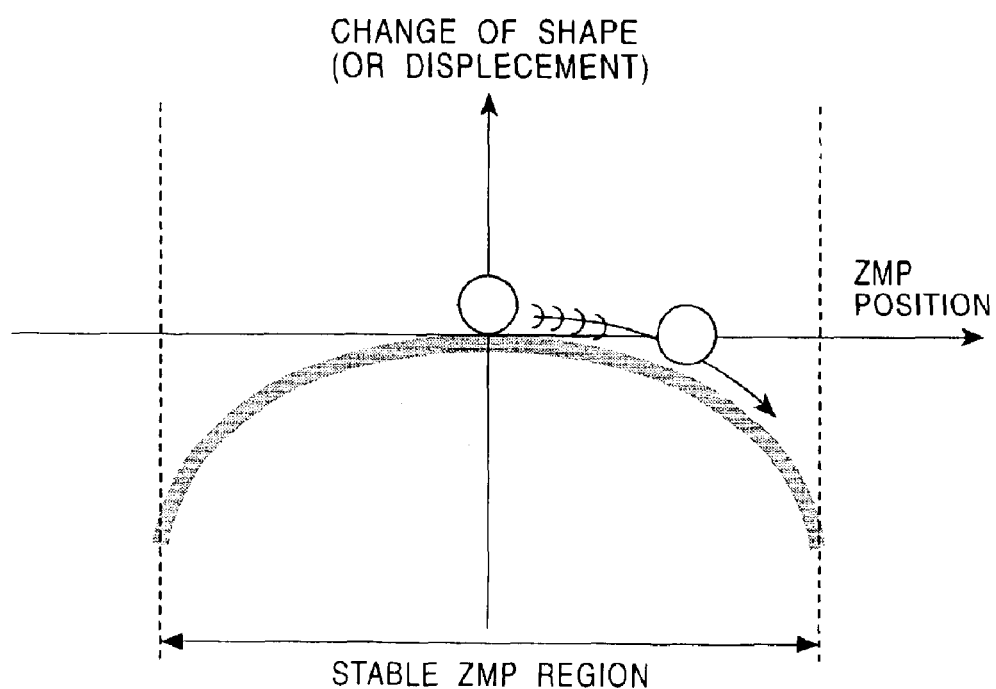
FIG. 2 plots the relationship (a ZMP behavior space of a robot) between a ZMP position and a momentum of the robot when the robot and a walking surface are not a solid body.
Figure 3:
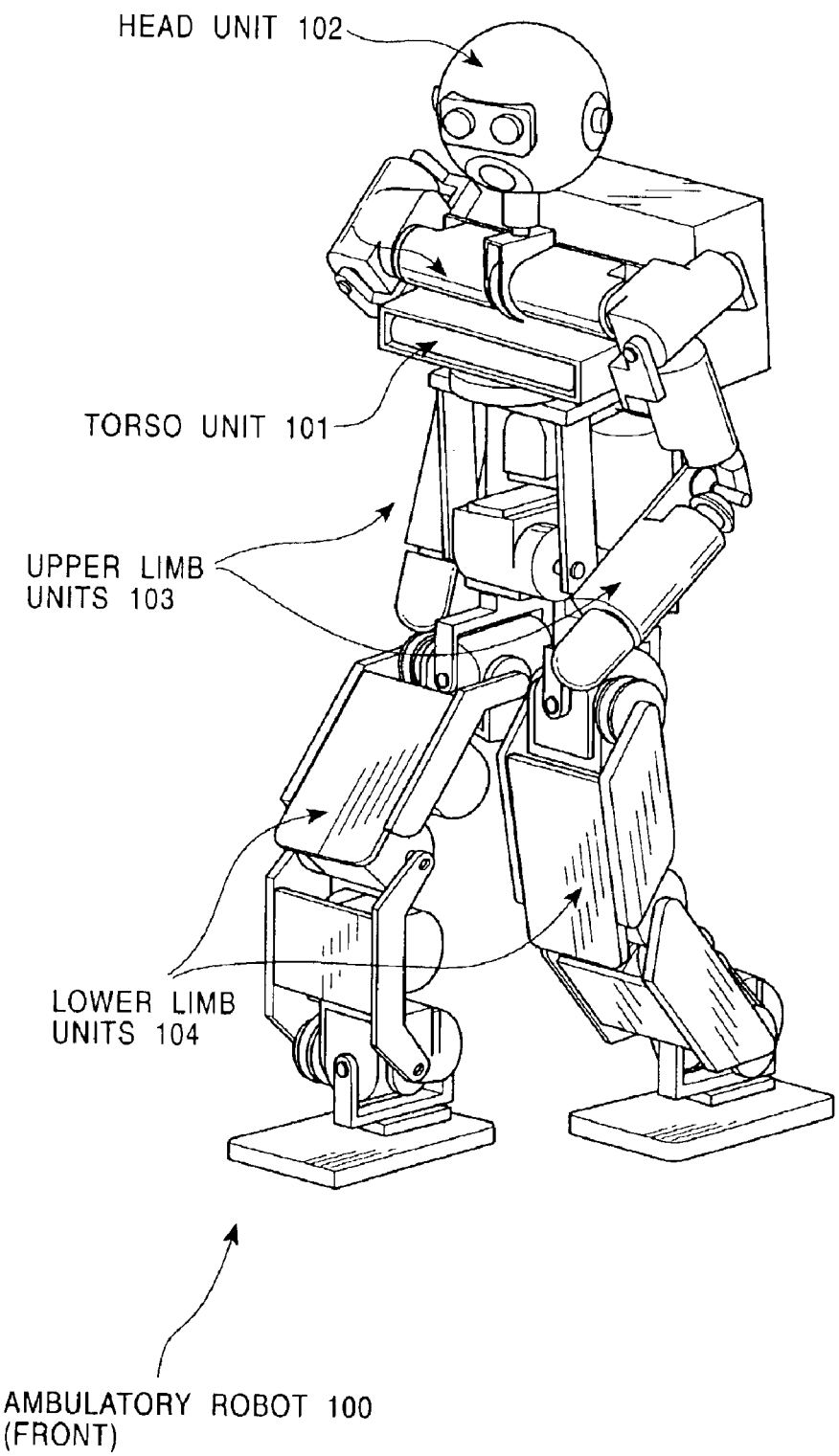
FIG. 3 is a perspective view of the front of an upstanding "human-like figured" or "human-type" legged mobile robot 100 implementing the present invention.
Figure 4:
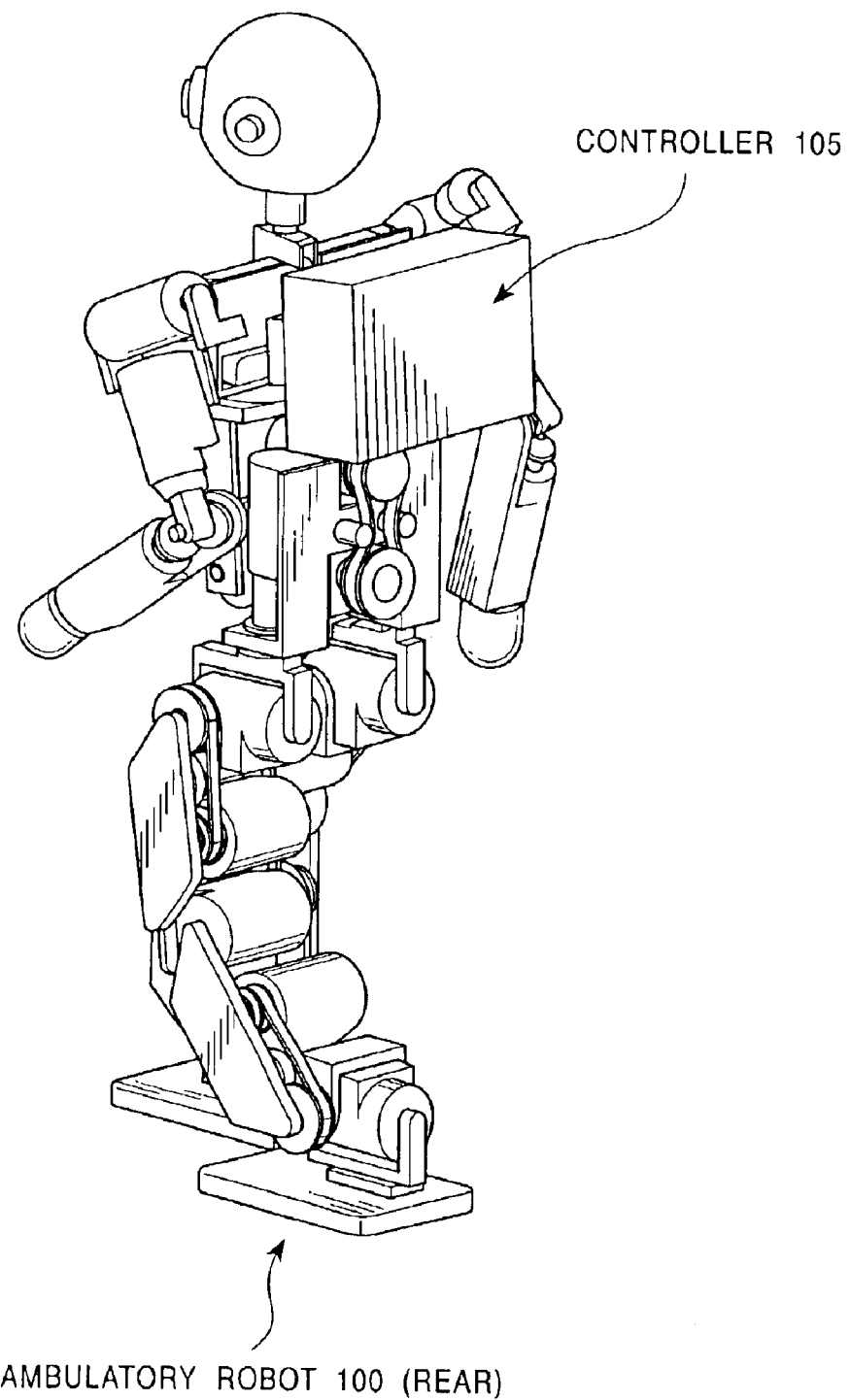
FIG. 4 is a perspective view of the back of the upstanding "human-like figured" or "human-type" legged mobile robot 100 implementing the present invention.

FIG. 3 and FIG. 4 illustrate the front and back of a "human-like figured" or "human-type" legged mobile robot 100 in an upstanding position, in which the present invention is implemented. As shown, the legged mobile robot 100 includes a torso unit 101, a head unit 102, left and right upper limb units 103, left and right lower limb units 104 for legging, and a controller 105 for generally controlling the operation of the robot body.

The left and right lower limb units 104, each of which includes a thigh, a knee joint, a lower thigh, an ankle, and a foot, are connected to the approximate lower end of the torso unit through hip joints. The upper limb units, each of which includes an upper arm, an elbow joint, and a forearm, are connected to top left side and top right side of the torso unit through shoulder joints. The head unit is connected to the approximate top center portion of the torso unit through a neck joint.

The controller 105 includes a (main) control unit for driving each actuator forming the legged mobile robot 100, and for processing signals input from sensors (to be discussed later), a power supply circuit, and other peripheral devices. The controller may further include a communication interface for remote control and communication devices. In the example illustrated in FIG. 3 and FIG. 4, the legged mobile robot 100 backpacks the controller, but the mounting position of the controller is not limited to any particular location of the robot.

The legged mobile robot 100 thus constructed bipedally walks through operation control by the controller 105 in a whole body coordinating fashion. Such bipedal walking is typically performed by repeating a walk period which is divided into operation phases as below.

(1) A single support phase by a left leg with a right leg lifted.

(2) A double support phase with the right leg landed.

(3) A single support phase by the right leg with the left leg lifted.

(4) A double support phase with the left leg landed.

The legged control of the legged mobile robot 100 is performed by planning a target path of the lower limb units, and modifying the planned path in each of the above phase. Specifically, during the double support phase, the correction of the path of the lower limb unit is suspended, and the height of the hips is corrected by a constant value using an overall correction amount to the planned path. During the single support phase, a corrected path is generated so that the relative positional relationship between the corrected ankle and the hips is restored back to the planned path. Specifically, the correction is performed through an interpolation calculation using a quintic polynomial so that position, speed, and acceleration become continuous to reduce a deviation in the ZMP.

Figure 5:
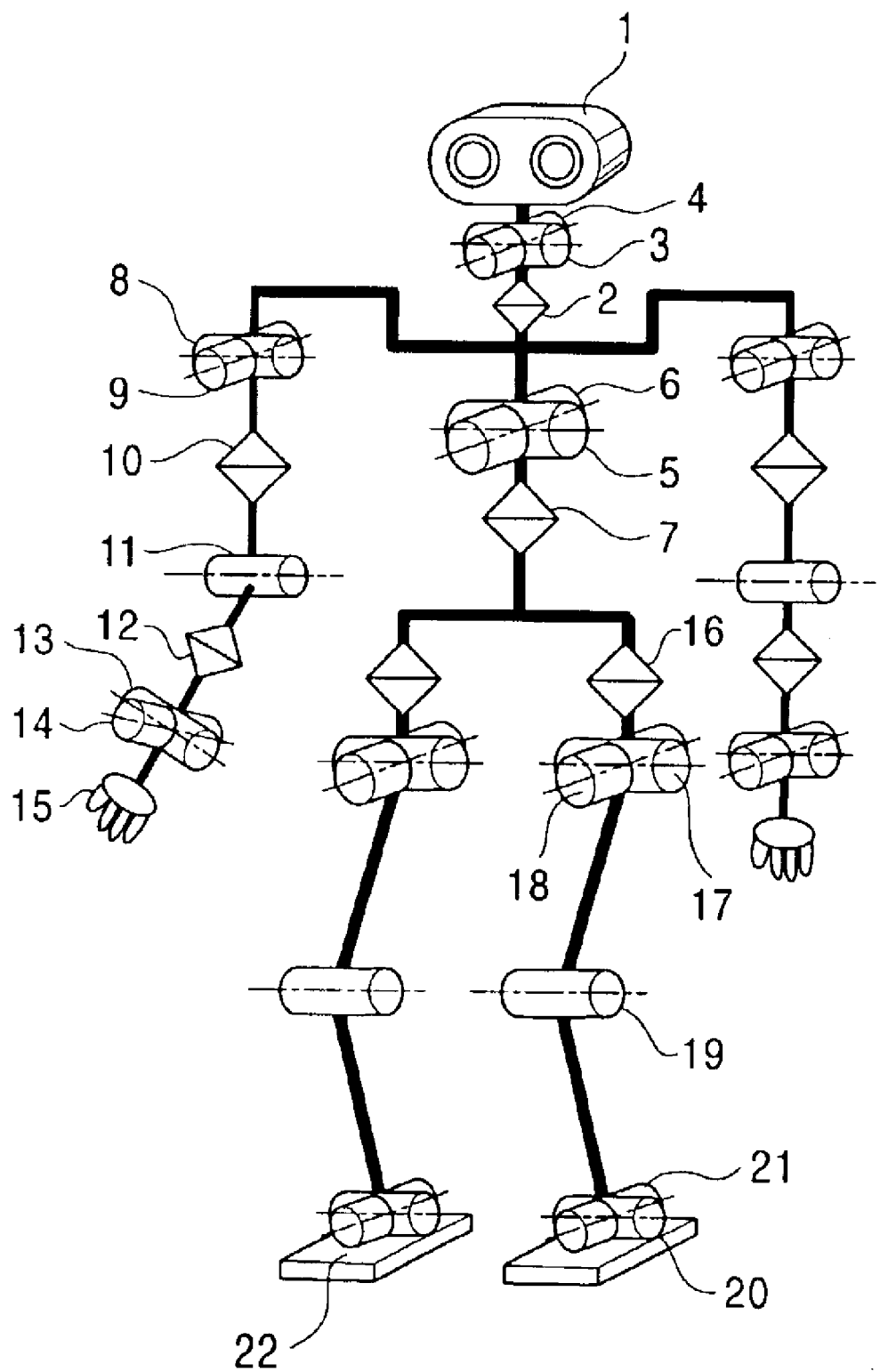
FIG. 5 diagrammatically illustrates the degrees of freedom of the legged mobile robot 100.

FIG. 5 diagrammatically illustrates the degrees of freedom of the legged mobile robot 100. As shown, the legged mobile robot 100 is a structure having a plurality limbs, including two arm units, a head unit, and lower limb units for legged, and a torso unit for connecting the arm units and the head unit to the lower limb units.

The neck joint for supporting the head unit 1 has 3 degrees of freedom of a neck joint yaw axis 2, a neck joint pitch axis 3, and a neck joint roll axis 4.

Each arm has a shoulder joint pitch axis 8, a shoulder joint roll axis 9, an upper arm yaw axis 10, an elbow joint pitch axis 11, a forearm yaw axis 12, a wrist joint pitch axis 13, a wrist joint roll axis 14, and a hand 15. The hand 15, including fingers, is actually a multi-articulate, multi-degrees of freedom structure. However, since the contribution and influence of the operation of the hand 15 to the posture control and the legged control are not very much, the degrees of freedom of the hand 15 is assumed to be zero. Each arm has thus 7 degrees of freedom.

The torso unit has 3 degrees of freedom of a torso pitch axis 5, a torso roll axis 6, and a torso yaw axis 7.

Each leg unit forming each lower limb unit has a hip joint yaw axis 16, a hip joint pitch axis 17, a hip joint roll axis 18, a knee joint pitch axis 19, an ankle joint pitch axis 20, an ankle joint roll axis 21, and a foot 22. Although the foot 22, including a sole, is actually a multi-articulate, multi-degrees of freedom structure, it is assumed that the sole of the legged mobile robot 100 related to this embodiment has zero degree of freedom. Each leg has thus 6 degrees of freedom.

In summary, the entire legged mobile robot 100 of this embodiment has 3+7×2+3+6×2=32, namely, a total of 32 degrees of freedom. The legged mobile robot 100 for entertainment purposes is not limited to 32 degrees of freedom. Depending on restrictions in design and manufacturing, and required specifications, the degrees of freedom, namely, the number of joints may be increased or decreased as necessary.

As discussed above, each degree of freedom of the legged mobile robot 100 is installed using an actuator in practice. To satisfy the requirements that the robot be produced imitating the body of human with no unnatural projections incorporated, and that the posture control be performed on the biped walking unstable structure, each actuator is preferably compact and light-weight. This embodiment employs a compact AC servo actuator of the type having a direct gear coupling type motor unit containing a one-chip servo mechanism therewithin. The AC servo actuator is disclosed in Japanese Unexamined Patent Application Publication 2000-299970 (Japanese Patent Application No. 11-33386), which is assigned to the assignee of this invention.

Figure 6:
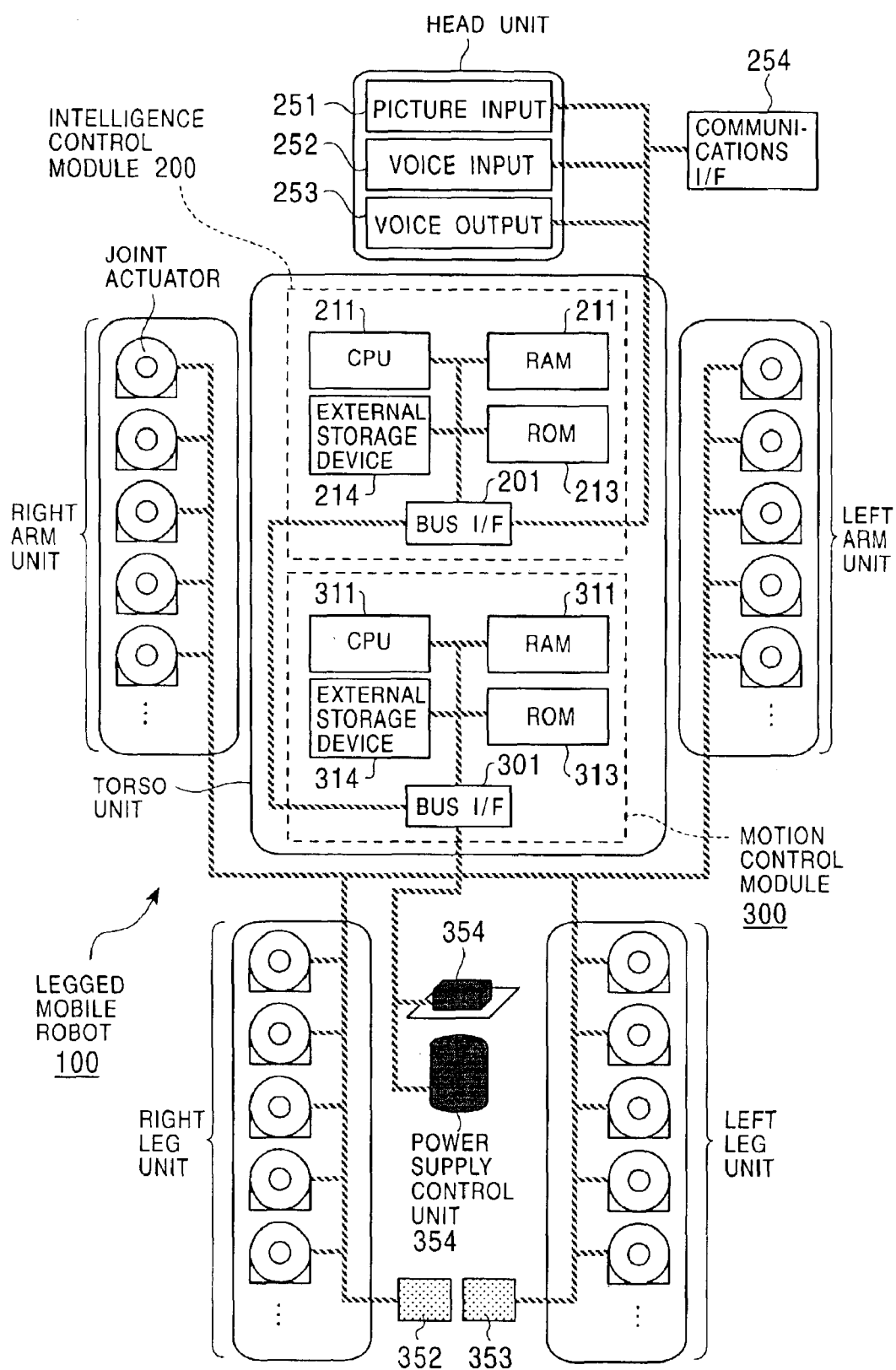
FIG. 6 diagrammatically illustrates a control system configuration of the legged mobile robot 100 in accordance with one embodiment of the present invention.

FIG. 6 diagrammatically illustrates a control system configuration of the legged mobile robot 100 in accordance with one embodiment of the present invention. As shown, the control system includes an intelligence control module 200 for controlling the determination of sentiment and the expression of feeling, and a motion control module 300 for controlling the whole body coordinated movement of the robot such as the driving of each actuator.

The intelligence control module 200 includes a CPU (Central Processing Unit) 211 for calculating and processing the sentiment determination and the feeling expression, a RAM (Random Access Memory) 212, a ROM (Random Only Memory) 213, and an external storage device (such as a hard disk drive) 214. The intelligence control module 200 is an independently driven information processing device that performs a process in a autonomous fashion.

The intelligence control module 200 includes a CPU (Central Processing Unit) 211 for calculating and processing the sentiment determination and the feeling expression, a RAM (Random Access Memory) 212, a ROM (Read Only Memory) 213, and an external storage device (such as a hard disk drive) 214. The intelligence control module 200 is an independently driven information processing device that performs a process in a autonomous fashion.

The intelligence control module 200 decides a current feeling and a thought of the legged mobile robot 100 in response to external stimulation such as visual data input from a video input device 251 and audio data input from a voice input device 252. Furthermore, the intelligence control module 200 issues commands to the motion control module 300 to perform an action or a behavior sequence based on the decision making, namely, to cause the limb units to move.

On the other hand, the motion control module 300 includes a CPU (Central Processing Unit) 311 for generally controlling the whole body coordinated movement of the legged mobile robot 100, a RAM (Random Access Memory) 312, a ROM (Read Only Memory) 313, and an external storage device (such as a hard disk drive) 314. The motion control module 300 is an independently driven information processing device that performs a process in an autonomous fashion. The external storage device 314 may store a gait pattern and a ZMP target path calculated on line, and other action plans.

The motion control module 300 is connected through a bus interface 301 to a variety of devices including joint actuators (see FIG. 5) achieving respective degrees of freedom and distributed over the entire body of the legged mobile robot 100, a posture sensor 351 for measuring the posture and the inclination of the torso unit, ground touch sensors 352 and 353 for detecting that the left and right soles touch the ground or lift off the ground, and a power supply control unit for managing power supply such as a battery.

The intelligence control module 200 and the motion control module 300a are configured on the same platform, and are mutually interconnected through bus interfaces 201 and 301.

The motion control module 300 controls the robot body to perform the whole body coordinated action through the joint actuators in response to the commands issued from the intelligence control module 200. Specifically, the CPU 311 retrieves a behavior pattern, issued by the intelligence control module 200, from the external storage device 314, or internally generates a behavior pattern. In response to the issued behavior pattern, the CPU 311 sets a leg motion, a ZMP path, a torso motion, an upper limb motion, and a hip level position and height, and sends command values responsive to the settings, and representing respective actions to the actuators.

Furthermore, the CPU 311 detects the posture and the inclination of the torso unit of the legged mobile robot 100 from the output signal from the posture sensor 351 while detecting, from the output signals from the ground touch sensors 352 and 353, the state of each leg concerning whether each leg is lifted or landed. The CPU 311 thus adaptively controls the whole body coordinated motion of the legged mobile robot 100.

The CPU 311 controls the posture and the motion of the robot so that the ZMP position shifts toward the center of the stable ZMP region.

The motion control module 300 returns, to the intelligence control module 200, the data about the progress of the process, namely, the data of to what degree the action determined by the intelligence control module 200 has been carried out as intended.

B. Posture Control of the Robot

Many of the legged mobile robots adopt the ZMP (Zero Moment Point) as a stability determination criterion for legging.

The stability determination criterion of the ZMP is based on "D'Alembert's principle" according to which gravity and inertia working from a walking system on a walking surface balance a floor reaction force and a floor reaction moment as reaction working from the walking surface to the walking system. According to this principle, "the robot stably ambulates without falling (without a rotary motion of the body) as long as the ZMP is present within the supporting polygon formed of the foot and the walking surface and as long as a pressing force of the robot works on the walking surface at any moment of legging."

The posture control of the robot using the ZMP as the stability determination criterion needs to search for a point at which a pitch axis moment and a roll axis moment become zero within the supporting polygon formed of the sole contact point and the walking surface. In the generation of a bipedal walking pattern based on the ZMP stability determination criterion, a sole landing point is advantageously set beforehand, and the kinetic restriction conditions of a toe are easy to consider for the configuration of the walking surface. Since the use of the ZMP as the stability determination criterion means that a course rather than a force is treated as a target, the technical feasibility of using the ZMP as the stability determination criterion is heightened.

As already discussed in connection with the "Background Art," the ZMP stability determination criterion is used only when the robot body and the walking surface are extremely close to a solid body in nature. In other words, when the assumption that the robot body and the walking surface are extremely close to a solid body in nature does not hold, a (translational) force acting on the ZMP with the robot moving at a high speed and an impact at the switching of supporting legs become large, and the robot itself is subject to a momentum or movement. Without adequately managing the momentum of the robot in response to the force exerted on the robot, a space within which the ZMP is present becomes unstable. Even if the posture of the robot satisfies the ZMP criterion, the robot posture itself becomes unstable as a result of stabilizing an unstable ZMP.

In posterior control in which correction control is initiated after the fact that the ZMP position has been deviated from the stable ZMP region, no sufficiently fast response is accomplished and the robustness against disturbances is not so high.

This embodiment adopts a robot system configuration having a stable ZMP behavior space accounting for the momentum of the robot body. The ZMP behavior space is defined by the ZMP position and the floor reaction force of a floor surface acting on the robot body. In this embodiment, a predetermined space distortion or predetermined characteristics are imparted beforehand to the ZMP behavior space so that the momentum for stabilizing the robot takes place in the robot body.

Since the space distortion is given beforehand to stabilize the posture of the robot rather than initiating a posterior correction control after the fact that the travel distance of the ZMP position has exceeded a predetermined range, a high robustness against disturbances is assured even if the control mechanism of the robot body has no sufficiently fast response.

It should be noted that concerning the direction of the momentum of the robot, a negative direction is defined as a direction which distorts the space in a manner such that the ZMP position shifts toward the periphery of the stable region, and a positive direction is defined as a direction which distorts the space in a manner such that the ZMP position shifts to the center of the stable region.

Figure 7:
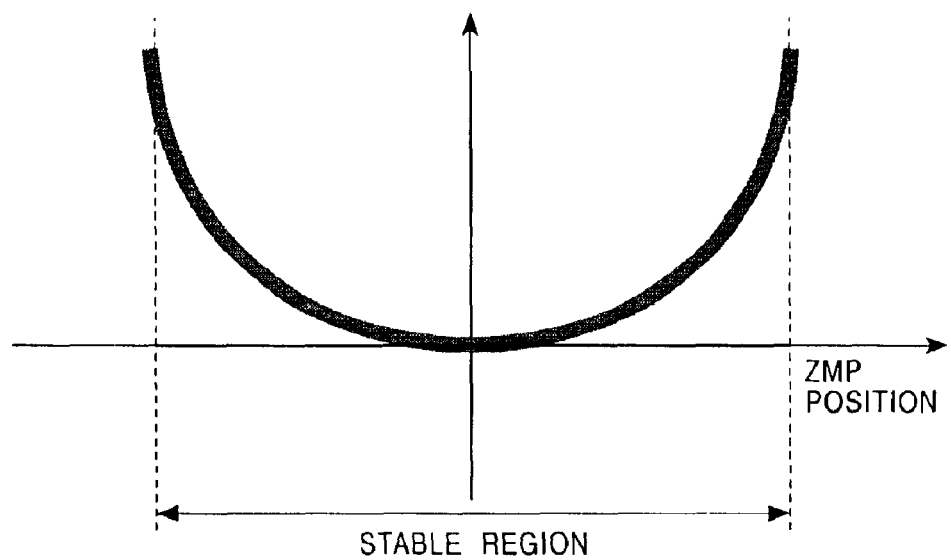
FIG. 7 illustrates a ZMP behavior space representing the relationship between the momentum of the robot and the ZMP position.

FIG. 7 illustrates the ZMP behavior space representing the relationship between the momentum of the robot and the ZMP position.

As shown, the ZMP behavior space is represented by a non-linear line such as a parabola or a semicircle. Although not shown, a discontinuity and a point of inflection may be contained in the ZMP behavior space.

Since no large momentum takes place with the ZMP position present in the vicinity of the stable ZMP region, the robot body does not lose the stable posture thereof there.

As the ZMP position departs from the center of the stable ZMP region, the momentum of the robot increases in the positive direction. Along with this, the space distortion works to shift the ZMP to the center of the stable region. It is thus easy to maintain the stable posture of the robot body.

Figure 8:
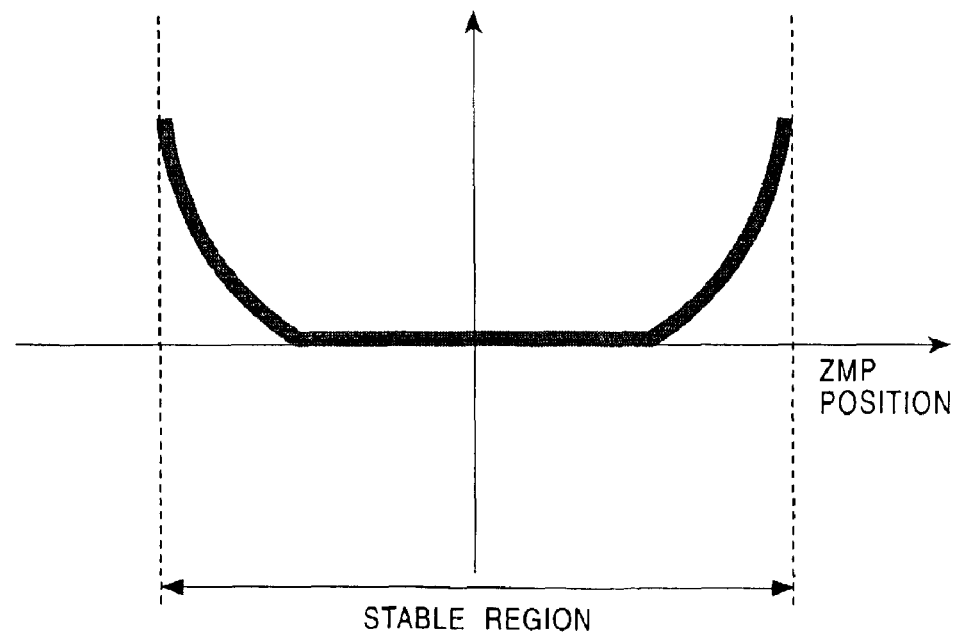
FIG. 8 illustrates another ZMP behavior space representing the relationship between the momentum of the robot and the ZMP position.

FIG. 8 illustrates another ZMP behavior space representing the relationship between the momentum of the robot and the ZMP position.

As shown, the ZMP behavior space is formed of a straight line segment in the center of the stable ZMP region and non-linear curved segments connected to the left and right ends of the straight line segment, wherein discontinuities are contained between the straight line segment and each of the curved segments. Although not shown, a point of inflection may be contained.

Since no large momentum takes place with the ZMP position present in the vicinity of the stable ZMP region, namely, in the flat portion of the stable ZMP region, the robot body does not lose the stable posture thereof there.

When the ZMP position is deviated from the flat area, the momentum of the robot rapidly increases. Along with this, the space deformation for shifting the ZMP back to the center of the stable region works and without a positive motion control, the stable posture of the robot body is easy to maintain.

Figure 9:
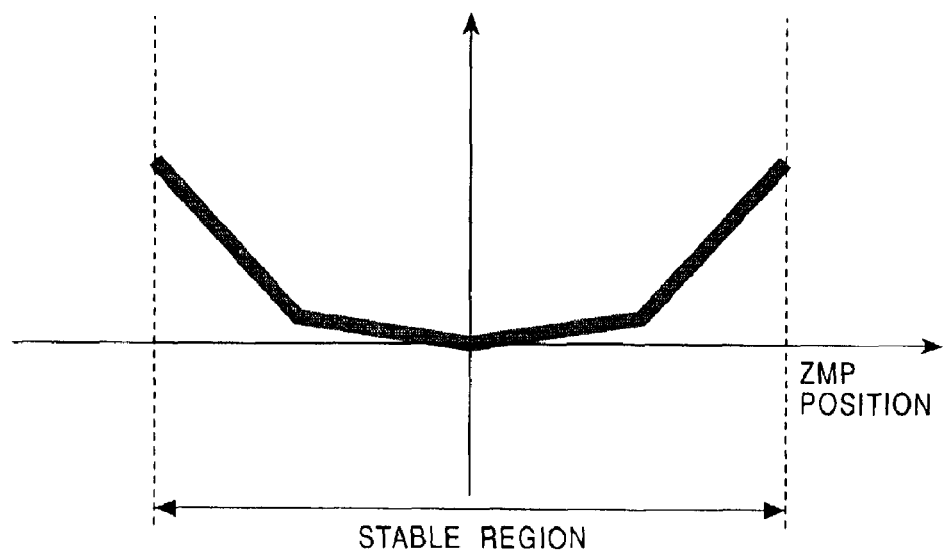
FIG. 9 illustrates yet another ZMP behavior space representing the relationship between the momentum of the robot and the ZMP position.

FIG. 9 illustrates yet another ZMP behavior space representing the relationship between the momentum of the robot and the ZMP position.

As shown, the ZMP behavior space is formed of a plurality of straight lines connected and contains a plurality of discontinuities.

With the ZMP position in the vicinity of the center of the stable ZMP region, the momentum of the robot gradually increases in the positive direction in accordance with the straight line at a relatively mild angle of inclination with the distance from the center of the stable ZMP region. At a predetermined distance from the center of the stable ZMP region, the momentum of the robot starts rapidly increase in the positive direction in accordance with a relatively steep angle of inclination with the distance from the center of the stable ZMP region.

As shown, a relatively weak effect works to generate a space distortion for shifting the ZMP to the center of the stable region with the ZMP position in the vicinity of the center of the stable ZMP region, while a relatively strong effect works to generate a space distortion for shifting the ZMP to the center of the stable region with the ZMP position spaced away from the center of the center of the stable ZMP region by a predetermined distance. Without a positive motion control, the stable posture of the robot body is easy to maintain.

Figure 10:
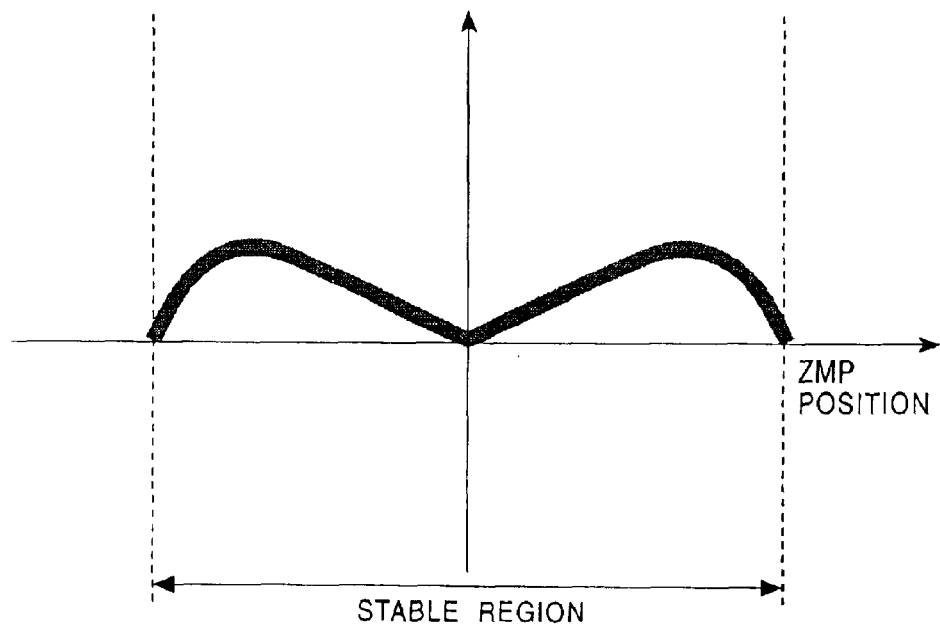
FIG. 10 illustrates yet another ZMP behavior space representing the relationship between the momentum of the robot and the ZMP position.

FIG. 10 illustrates yet another ZMP behavior space representing the relationship between the momentum of the robot and the ZMP position.

As illustrated, the ZMP behavior space is formed of non-linear curves, with a minimum point in the approximate center of the stable ZMP region and maximum points near the boundary of the stable ZMP region.

With the ZMP position between the left and right maximum points in such a ZMP behavior space, the momentum of the robot increases in the positive direction with the distance from the center of the stable ZMP region. A stable posture mode is thus achieved in which the posture stability of the robot body is easy to maintain.

With the ZMP position outside the left and right maximum points, the momentum of the robot gradually decreases, and the space distortion for shifting the ZMP to the center of the stable region is reduced. As a result, the robot body is likely to lose its stable posture, leading to a falling mode.

Figure 11:
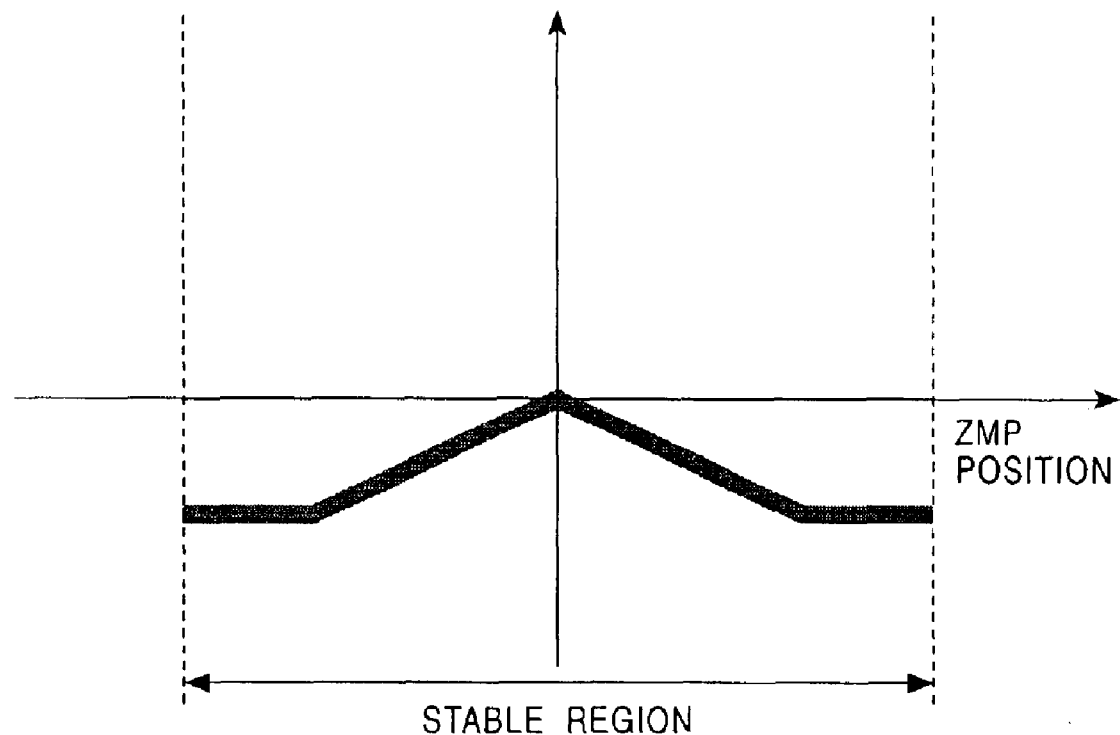
FIG. 11 illustrates still another ZMP behavior space representing the relationship between the momentum of the robot and the ZMP position.

FIG. 11 illustrates still another ZMP behavior space representing the relationship between the momentum of the robot and the ZMP position.

As illustrated, the ZMP behavior space is formed by connecting a plurality of straight lines with a plurality of discontinuities. The momentum of the robot gradually increases in the negative direction at a relatively mild angle of inclination in the vicinity of the center of the stable ZMP region with the distance from the center of the stable ZMP region. At a predetermined distance from the center of the stable ZMP region, the momentum of the robot flattens off.

In this ZMP behavior space, the momentum of the robot works in the negative direction only at any position within the stable ZMP region. When the ZMP position departs away from the center thereof by a predetermined distance, the space distortion for shifting the ZMP outside the stable region becomes constant. The ZMP behavior space is thus unstable but control thereof is easy.

The ZMP behavior space is now considered in which the two-legged mobile robot 100 shown in FIG. 3 through FIG. 5 ambulates. In this embodiment, the space distortion is imparted to the ZMP behavior space so that the ZMP position shifts to the center of the stable ZMP region. The momentum of the robot body takes place in response to the floor reaction force so that the ZMP position shifts in a direction that the robot body is stabilized.

Figure 12:
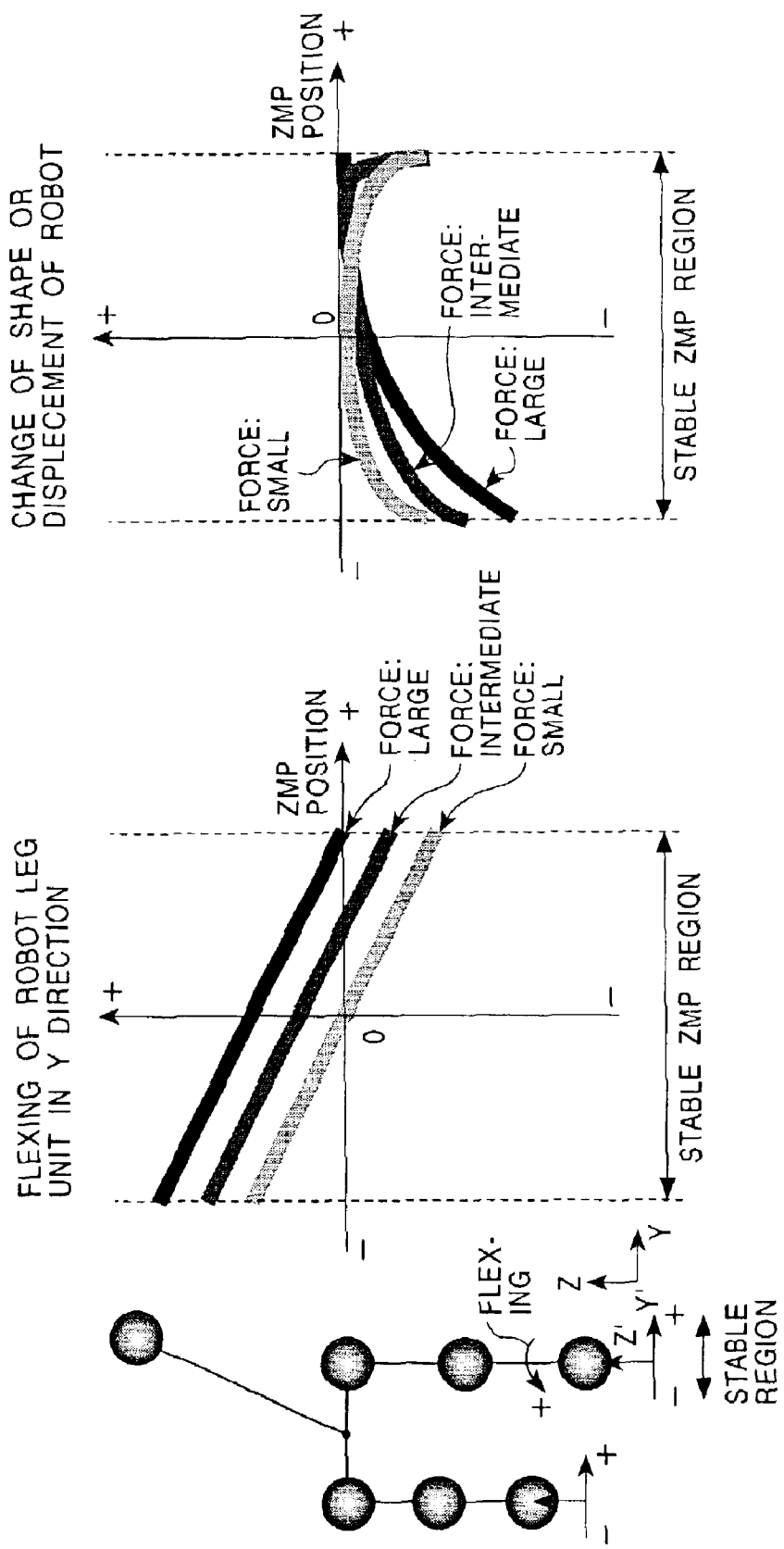
FIG. 12 illustrates a structure of the ZMP behavior space of an upstanding left leg in a Y direction (perpendicular to the direction of movement) during the later term of a single support.
Figure 13:
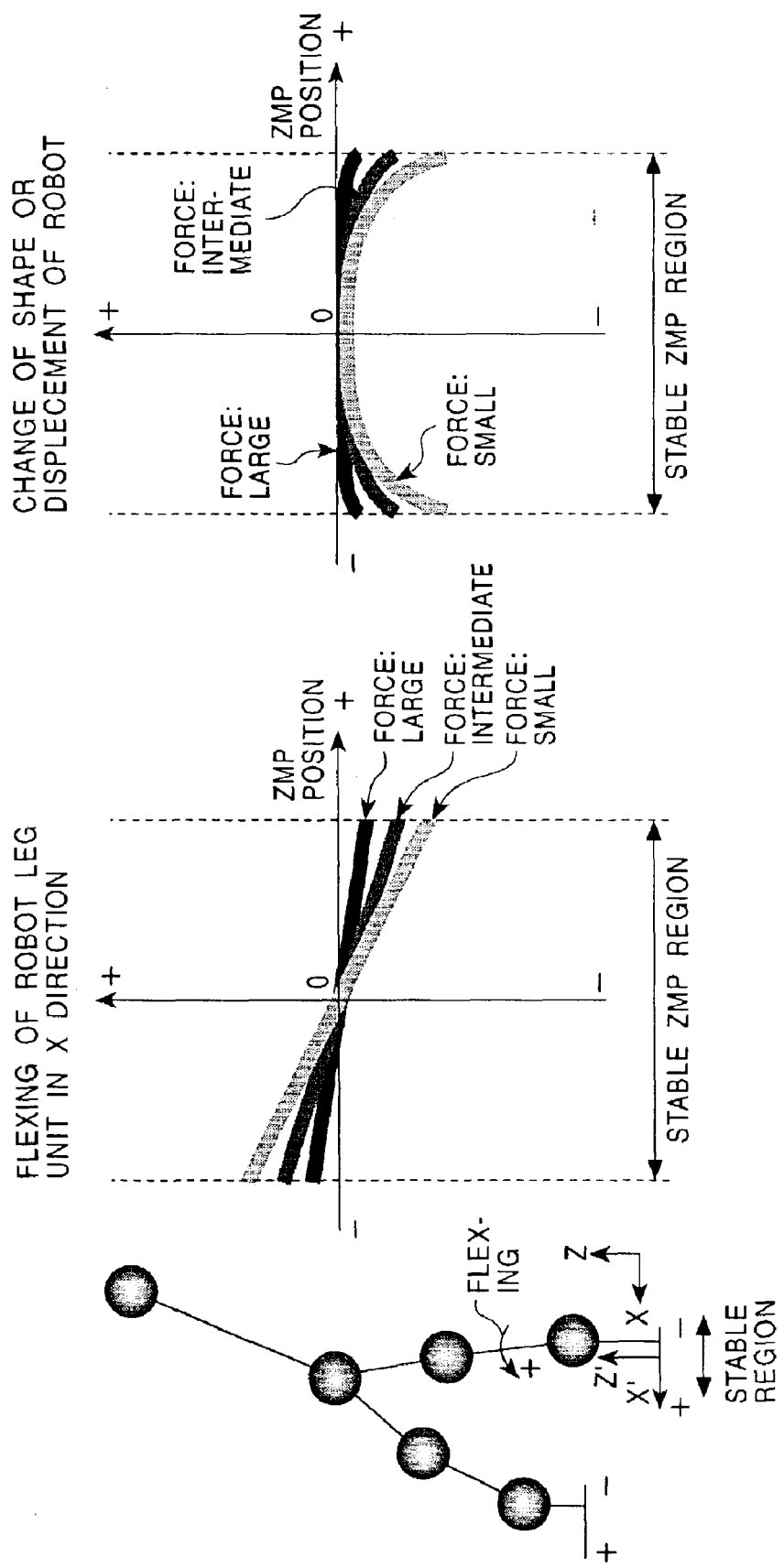
FIG. 13 illustrates a structure of the ZMP behavior space of the upstanding left leg in an X direction (the direction of movement) during the later term of the single support phase.

FIG. 12 and FIG. 13 respectively illustrate structures of the ZMP behavior space of an upstanding left leg in a Y direction (perpendicular to the direction of movement) and an X direction (the direction of movement) during the later term of a single support phase.

Referring to FIG. 12, in the ZMP behavior space of the left upstanding leg in the Y direction during the later term of a single support phase, the momentum of the robot takes place in the negative direction, namely, in the direction that the ZMP position outwardly shifts from the center of the stable ZMP region as the ZMP position shifts from the center of the stable ZMP region, when the floor reaction force is small. With the floor reaction force increasing, the space distortion for causing no momentum of the robot is provided when the ZMP position outwardly shifts from the robot body. As a result, flexing is reduced in approximately linear proportion to the shifting of the ZMP position in the Y direction in the upstanding left leg as a supporting leg. With a small floor reaction force, the left leg is inwardly flexed as the ZMP position inwardly shifts to the robot body, and is outwardly flexed as the ZMP position outwardly shifts from the robot body. With the floor reaction force increasing, the upstanding left leg becomes difficult to be outwardly flexed even when the ZMP position outwardly shifts from the robot body.

Assuming that the overall weight of the robot is 100, the floor reaction force is defined as a "large" force when it becomes equal to or larger than 100. When the floor reaction force is within a range from 20 to 100, it is defined as an "intermediate" force and when the floor reaction force is equal to or smaller than 20, it is defined as a "small" force (the same is true of the following discussion). These are rough measures, and depending on the robot structure and weight, this categorization is subject to change. A "small floor reaction force," in qualitative point of view, refers to a floor reaction force acting on the other foot when one foot supports almost entire body of the robot during a double support phase.

Referring to FIG. 13, in the ZMP behavior space of the left upstanding leg in the X direction during the later term of the single support phase, the momentum of the robot takes place in the negative direction, namely, in the direction that the ZMP position outwardly shifts from the center of the stable ZMP region as the ZMP position shifts from the center of the stable ZMP region. With the floor reaction force increasing, the space distortion for causing the momentum of the robot to gradually decrease is provided. As a result, flexing is reduced in approximately linear proportion to the shifting of the ZMP position in the X direction in the upstanding left leg as a supporting leg. With a small floor reaction force, the upstanding left leg is forwardly flexed as the ZMP position forwardly shifts from the robot body, and is backwardly flexed as the ZMP position backwardly shifts from the robot body. With the floor reaction force increasing, the upstanding left leg becomes difficult to be flexed regardless of whether the ZMP position forwardly or backwardly shifts from the robot body.

Figure 14:
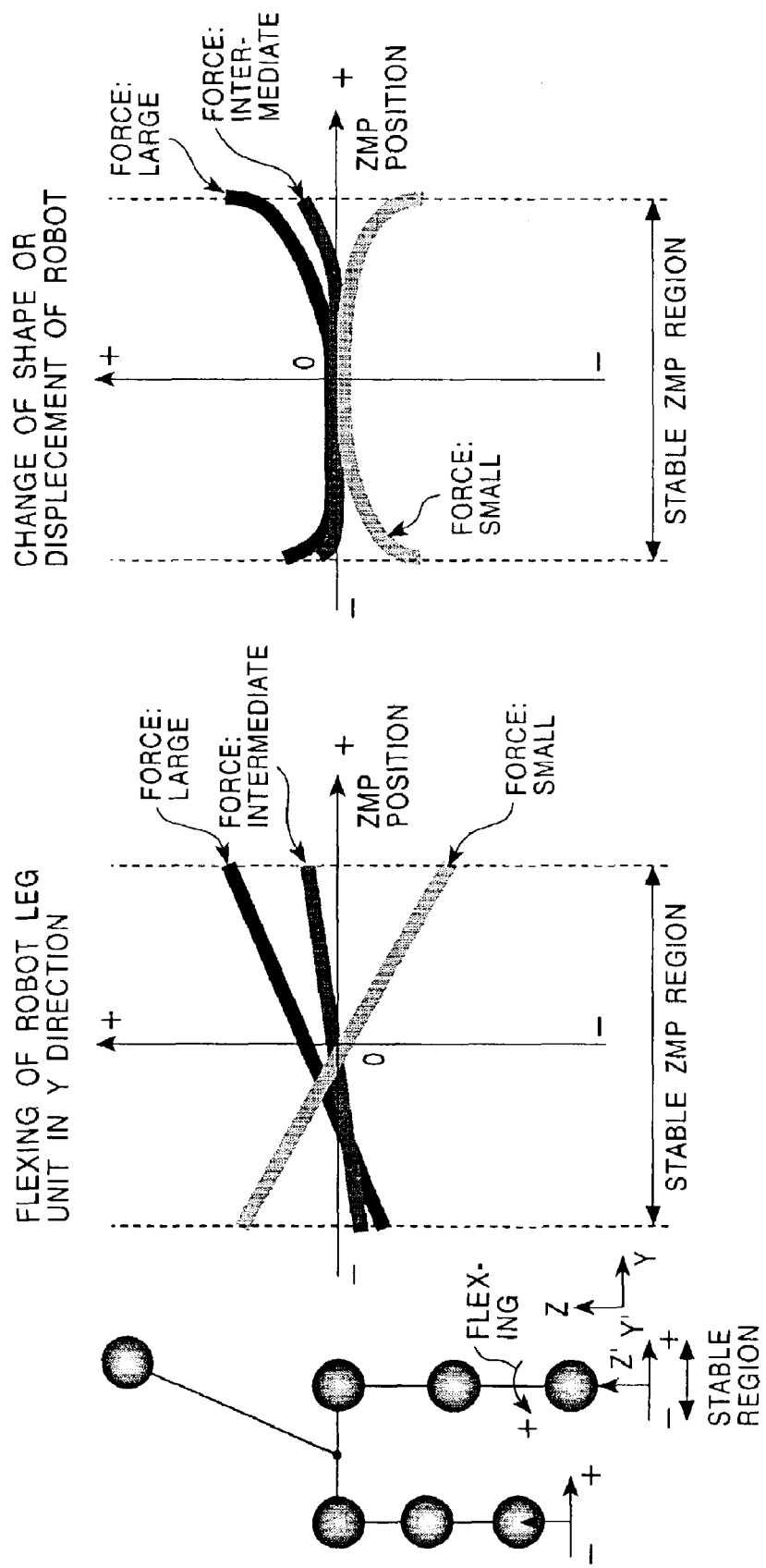
FIG. 14 illustrates an ideal structure of the ZMP behavior space of the upstanding left leg in the Y direction (perpendicular to the direction of movement) during the later term of the single support phase.
Figure 15:
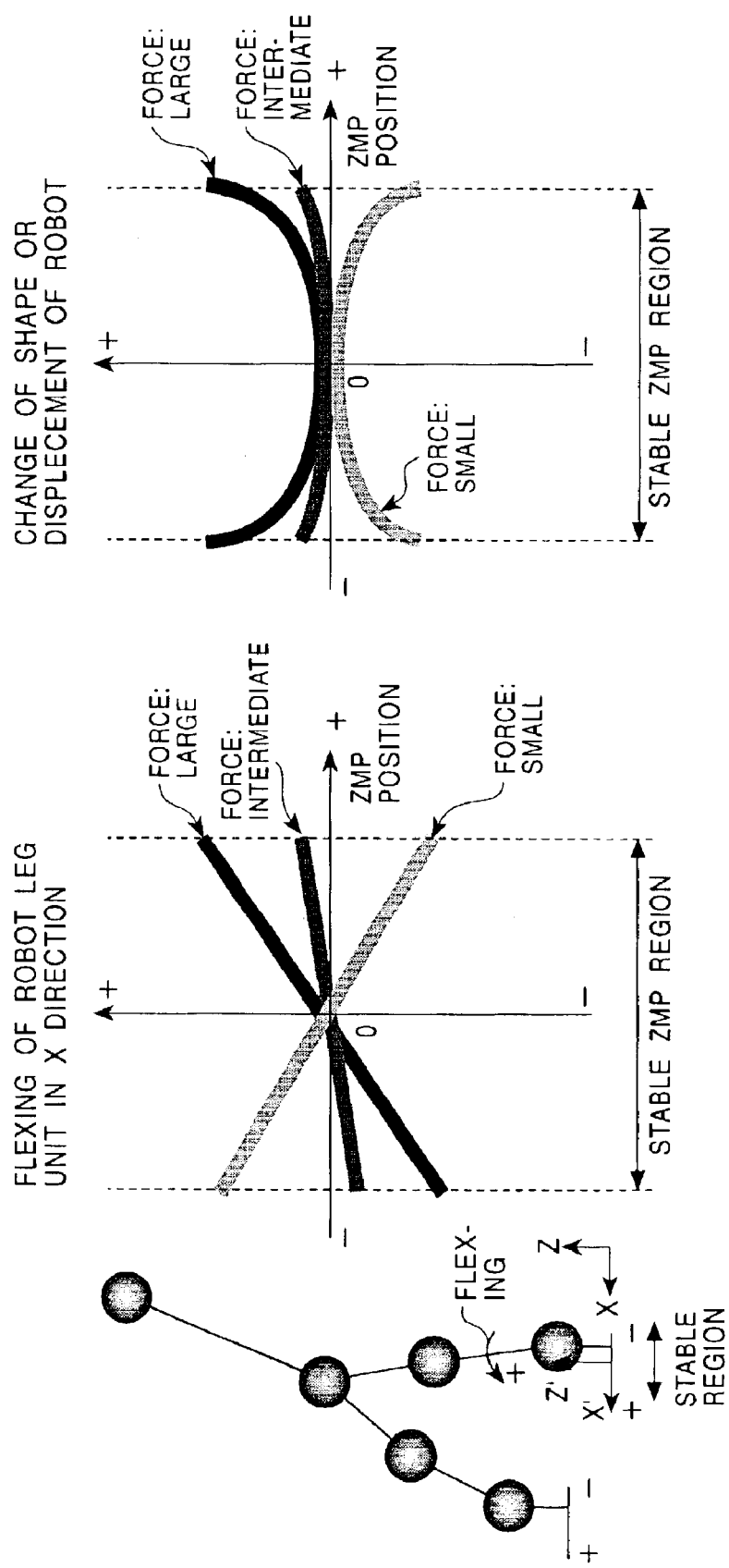
FIG. 15 illustrates an ideal structure of the ZMP behavior space of the upstanding left leg in the X direction (the direction of movement) during the later term of the single support phase.

FIG. 14 and FIG. 15 respectively illustrate structures of the ideal ZMP behavior space of the upstanding left leg in the Y direction (perpendicular to the direction of movement) and the X direction (the direction of movement) during the later term of the single support phase.

Referring to FIG. 14, in the ideal ZMP behavior space of the left upstanding leg in the Y direction during the later term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the upstanding left leg is inwardly flexed as the ZMP position inwardly shifts to the robot body, and is outwardly flexed as the ZMP position outwardly shifts to the robot body. With the floor reaction force increasing, conversely, the upstanding left leg is outwardly flexed as the ZMP position inwardly shifts to the robot body, and is inwardly flexed as the ZMP position outwardly shifts from the robot body.

Referring to FIG. 15, in the ideal ZMP behavior space of the upstanding left leg in the X direction during the later term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the upstanding left leg is forwardly flexed as the ZMP position forwardly shifts from the robot body, and is backwardly flexed as the ZMP position backwardly shifts from the robot body. With the floor reaction force increasing, conversely, the upstanding left leg is backwardly flexed as the ZMP position forwardly shifts from the robot body, and is forwardly flexed as the ZMP position backwardly shifts from the robot body.

Figure 16:
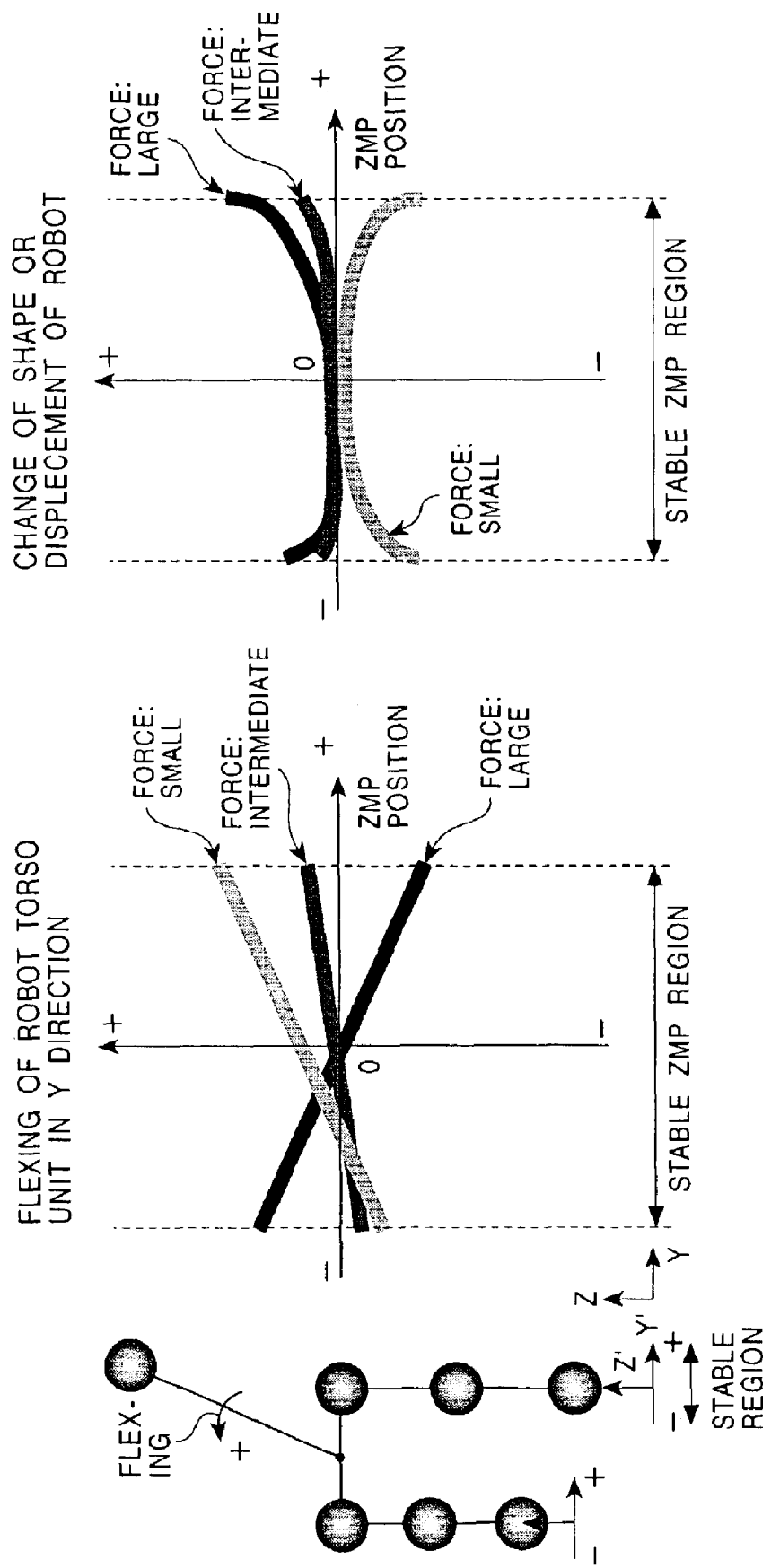
FIG. 16 illustrates an ideal structure of the ZMP behavior space of a torso unit in the Y direction (perpendicular to the direction of movement) during the later term of the single support phase.
Figure 17:
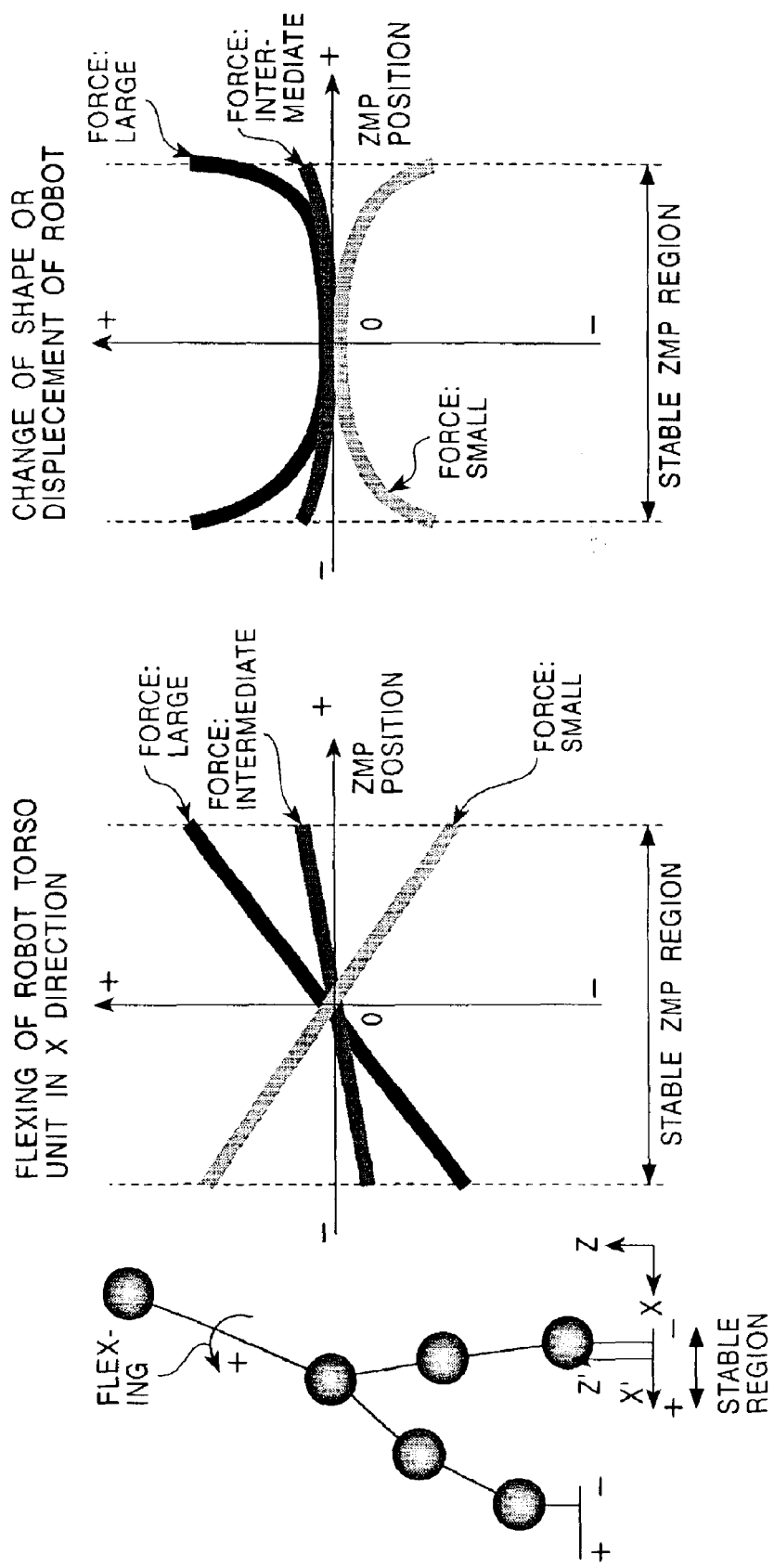
FIG. 17 illustrates an ideal structure of the ZMP behavior space of the torso unit in the X direction (the direction of movement) during the later term of single support phase.

FIG. 16 and FIG. 17 respectively illustrate structures of the ideal ZMP behavior space of the of the torso unit in the Y direction (perpendicular to the direction of movement) and the X direction (the direction of movement) during the later term of the single support phase.

Referring to FIG. 16, in the ideal ZMP behavior space of the torso unit in the Y direction during the later term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the torso unit is inwardly flexed as the ZMP position inwardly shifts to the robot body, and is outwardly flexed as the ZMP position outwardly shifts to the robot body. With the floor reaction force increasing, conversely, the torso unit is outwardly flexed as the ZMP position inwardly shifts to the robot body, and is inwardly flexed as the ZMP position outwardly shifts from the robot body.

Referring to FIG. 17, in the ideal ZMP behavior space of the torso unit in the X direction during the later term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the torso unit is forwardly flexed as the ZMP position forwardly shifts from the robot body, and is backwardly flexed as the ZMP position backwardly shifts from the robot body. With the floor reaction force increasing, conversely, the torso unit is backwardly flexed as the ZMP position forwardly shifts from the robot body, and is forwardly flexed as the ZMP position backwardly shifts from the robot body.

Figure 18:
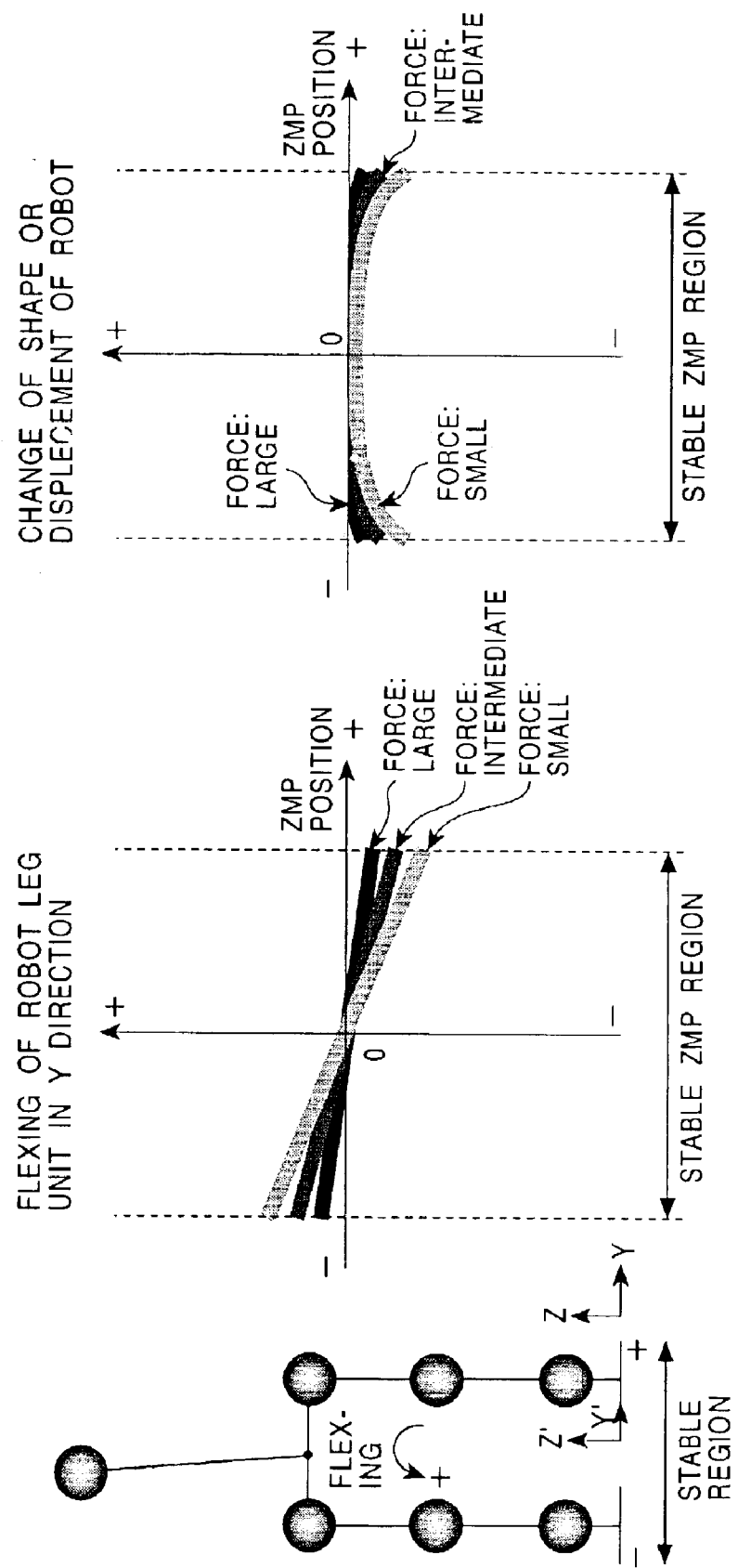
FIG. 18 illustrates a structure of the ZMP behavior space of the upstanding left leg in the Y direction (perpendicular to the direction of movement) during a double support phase.
Figure 19:
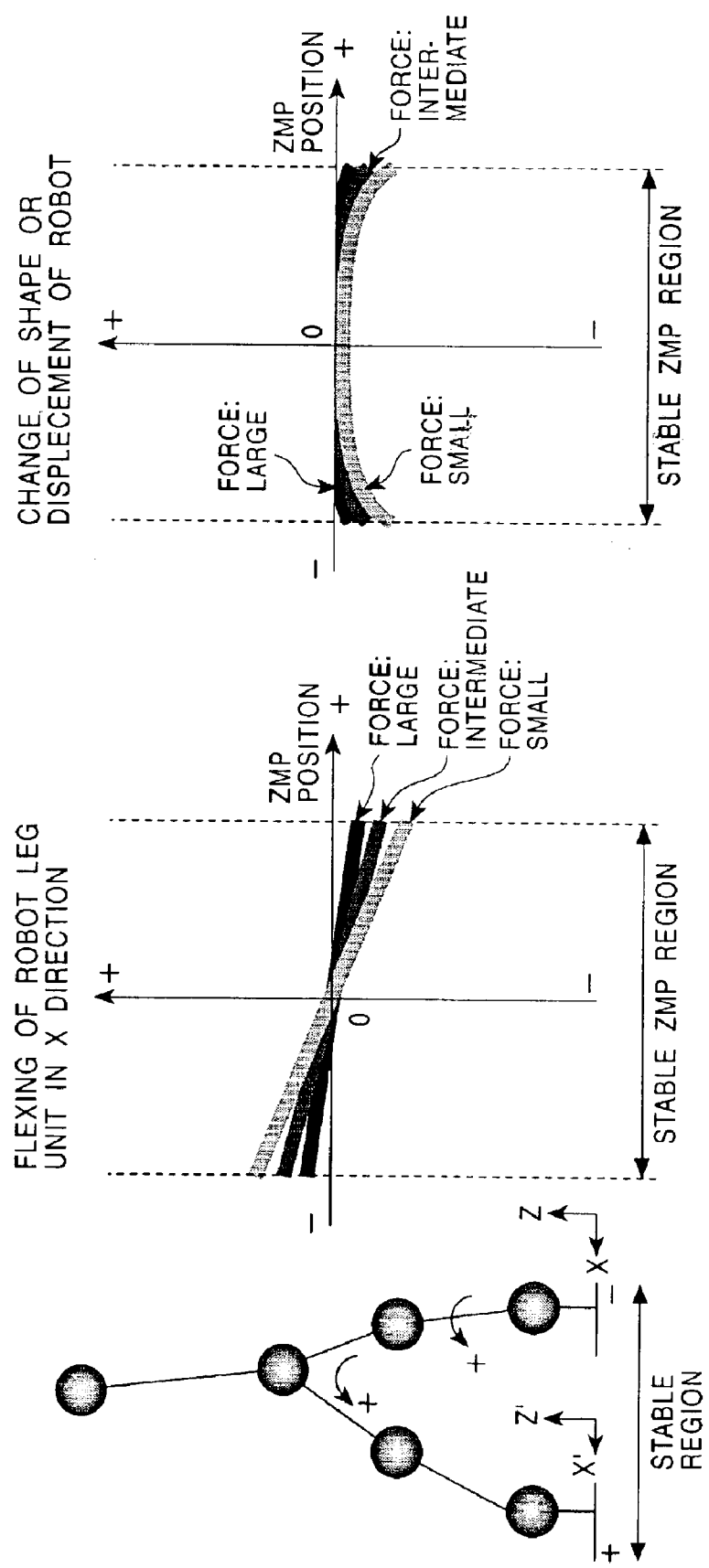
FIG. 19 illustrates a structure of the ZMP behavior space of the upstanding left leg in the X direction (the direction of movement) during the double support phase.

FIG. 18 and FIG. 19 respectively illustrate structures of the ZMP behavior space of the upstanding left leg in the Y direction (perpendicular to the direction of movement) and the X direction (the direction of movement) during the double support phase.

Referring to FIG. 18, in the ZMP behavior space of the upstanding left leg in the Y direction during the double support phase, the momentum of the robot takes place in the negative direction, namely, in the direction that the ZMP position outwardly shifts from the center of the stable ZMP region as the ZMP position outwardly shifts from the center of the stable ZMP region. With the floor reaction force increasing, the resulting space distortion causes the momentum of the robot to decrease. Since the two legs support the robot body during the double support phase, the rigidity in the ZMP behavior space becomes higher than during the single support period, and the space distortion is small. As a result, the flexing of the upstanding left leg is reduced in approximately linear proportion to the shifting of the ZMP position in the Y direction. With a small floor reaction force, the upstanding left leg is inwardly flexed as the ZMP position inwardly shifts to the robot body, and is outwardly flexed as the ZMP position outwardly shifts from the robot body. With the floor reaction force increasing, the left leg is designed to be difficult to flex regardless of whether the ZMP position inwardly or outwardly shifts with respect to the robot body. Since the robot is supported by the two legs during the double support phase, the flexing is smaller during the double support phase than during the single support phase with the robot supported by the one leg.

Referring to FIG. 19, in the ZMP behavior space of the upstanding left leg in the X direction during the double support phase, the momentum of the robot takes place in the negative direction, namely, in the direction that the ZMP position outwardly shifts from the center of the stable ZMP region as the ZMP position outwardly shifts from the center of the stable ZMP region. With the floor reaction force increasing, the resulting space distortion causes the momentum of the robot to decrease. Since the two legs support the robot body during the double support phase, the rigidity in the ZMP behavior space becomes higher than during the single support period, and the space distortion is small. As a result, the flexing of the upstanding left leg is reduced in approximately linear proportion to the shifting of the ZMP position in the X direction. With a small floor reaction force, the upstanding left leg is forwardly flexed as the ZMP position forwardly shifts from the robot body, and is backwardly flexed as the ZMP position backwardly shifts from the robot body. With the floor reaction force increasing, the upstanding left leg is designed to be difficult to flex regardless of whether the ZMP position inwardly or outwardly shifts with respect to the robot body. Since the robot is supported by the two legs during the double support phase, the flexing is smaller during the double support phase than during the single support phase with the robot supported by the one leg.

Figure 20:
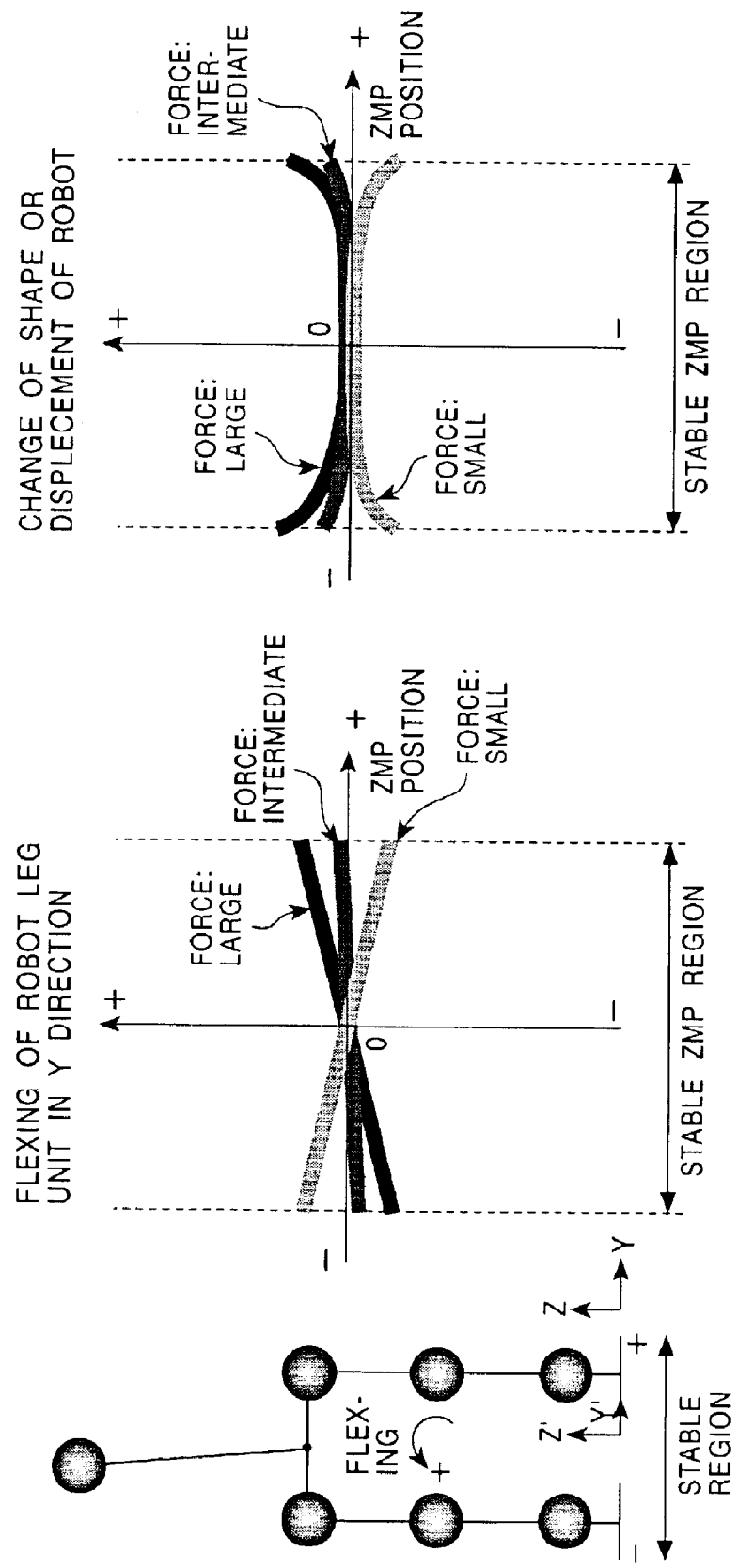
FIG. 20 illustrates an ideal structure of the ZMP behavior space of the upstanding left leg in the Y direction (perpendicular to the direction of movement) during the double support phase.
Figure 21:
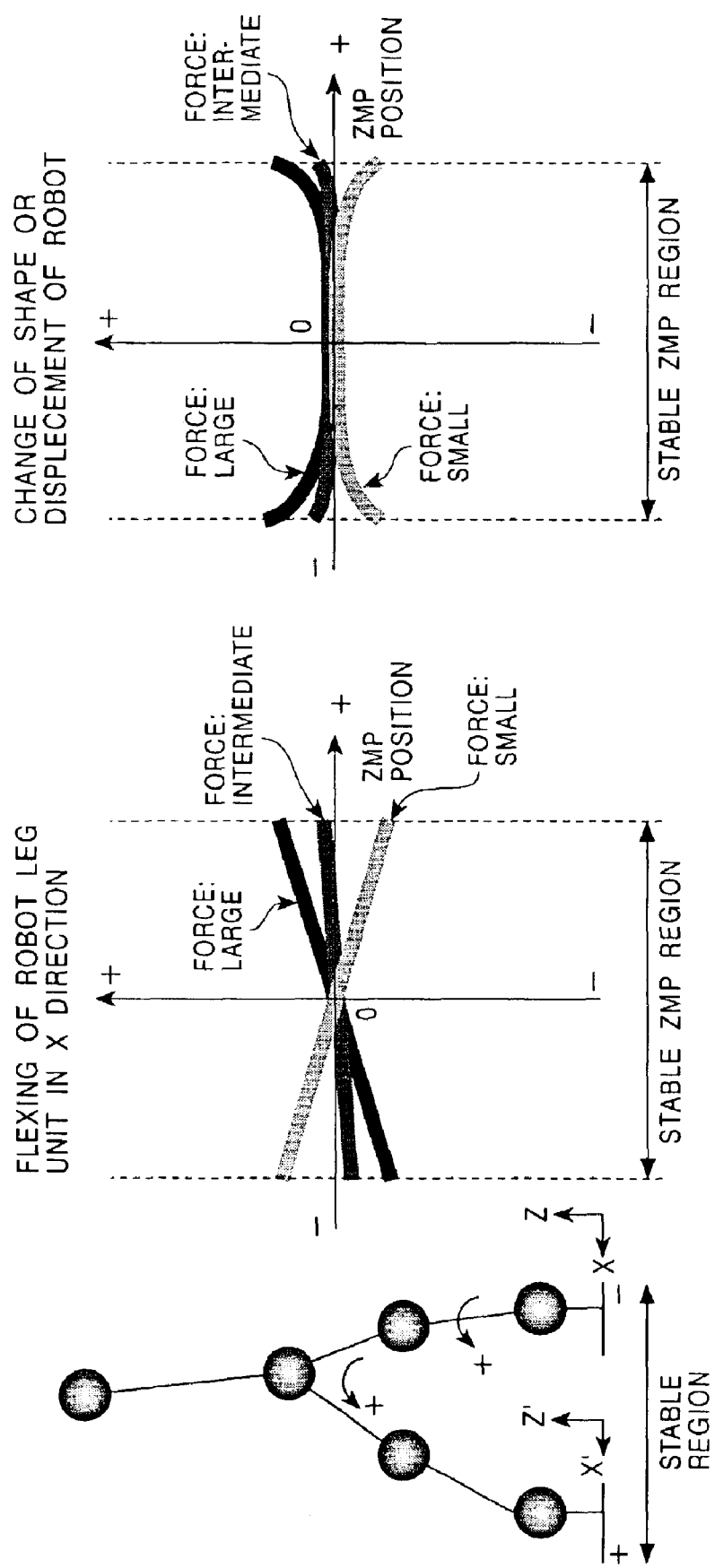
FIG. 21 illustrates an ideal structure of the ZMP behavior space of the upstanding left leg in the Y direction (perpendicular to the direction of movement) during the double support phase.

FIG. 20 and FIG. 21 respectively illustrate structures of the ideal ZMP behavior space of the upstanding left leg in the Y direction (perpendicular to the direction of movement) and the X direction (the direction of movement) during the double support phase.

Referring to FIG. 20, in the ideal ZMP behavior space of the upstanding left leg in the Y direction during the double support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. Since the two legs support the robot body during the double support phase, the rigidity in the ZMP behavior space becomes higher than during the single support period, and the space distortion is small. As a result, with a small floor reaction force, the left leg is inwardly flexed as the ZMP position inwardly shifts to the robot body, and is outwardly flexed as the ZMP position outwardly shifts from the robot body. With the floor reaction force increasing, conversely, the upstanding left leg is outwardly flexed as the ZMP position inwardly shifts to the robot body, and is inwardly flexed as the ZMP position outwardly shifts from the robot body. Since the robot is supported by the two legs during the double support phase, the flexing is smaller during the double support phase than during the single support phase with the robot supported by the one leg.

Referring to FIG. 21, in the ideal ZMP behavior space of the upstanding left leg in the X direction during the double support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. Since the two legs support the robot body during the double support phase, the rigidity in the ZMP behavior space becomes higher than during the single support period, and the space distortion is small. As a result, with a small floor reaction force, the upstanding left leg is forwardly flexed as the ZMP position forwardly shifts from the robot body, and is backwardly flexed as the ZMP position backwardly shifts from the robot body. With the floor reaction force increasing, conversely, the upstanding left leg is backwardly flexed as the ZMP position forwardly shifts from the robot body, and is forwardly flexed as the ZMP position backwardly shifts from the robot body. Since the robot is supported by the two legs during the double support phase, the flexing is smaller during the double support phase than during the single support phase with the robot supported by the one leg.

Figure 22:
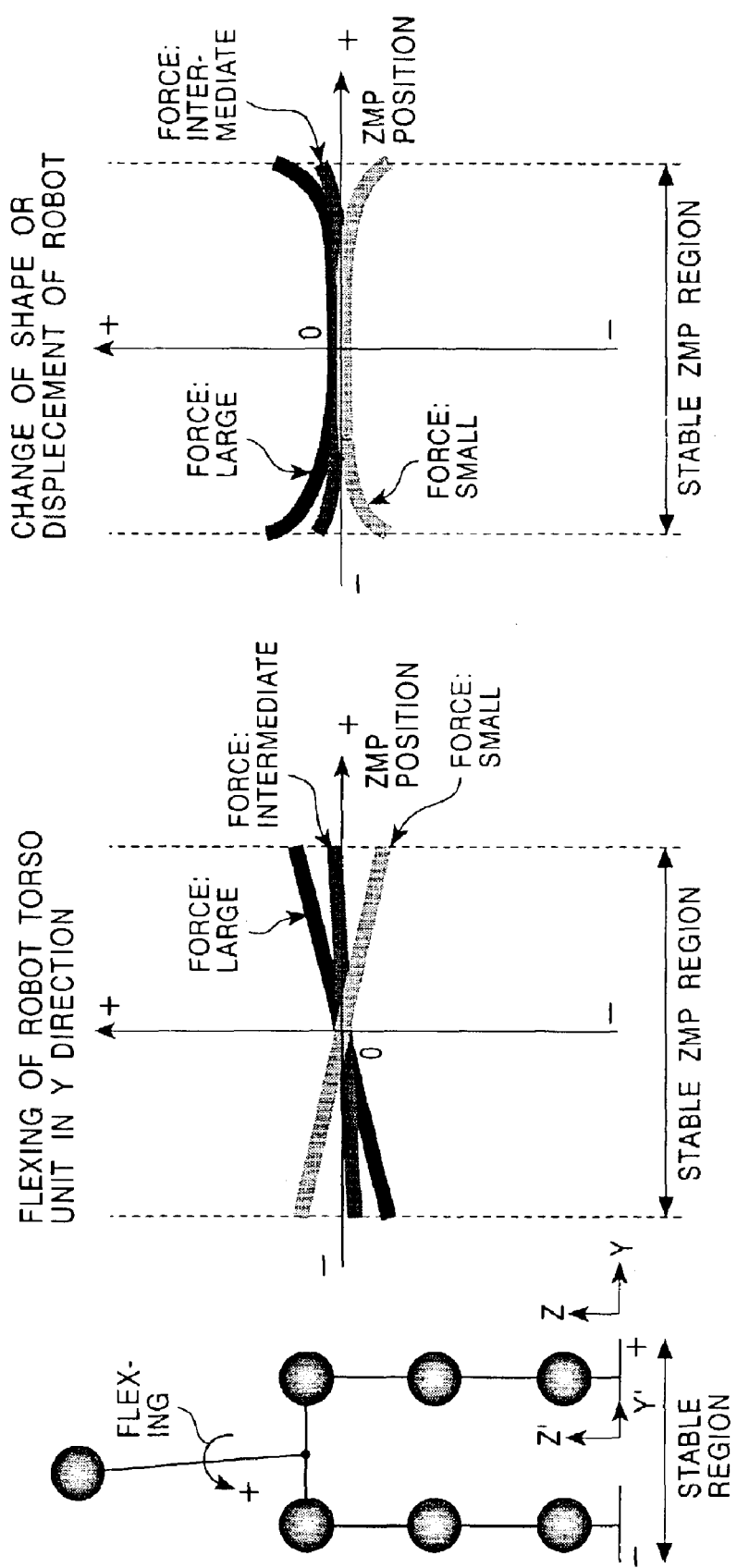
FIG. 22 illustrates an ideal structure of the ZMP behavior space of the torso unit in the Y direction (perpendicular to the direction of movement) during the double support phase.
Figure 23:
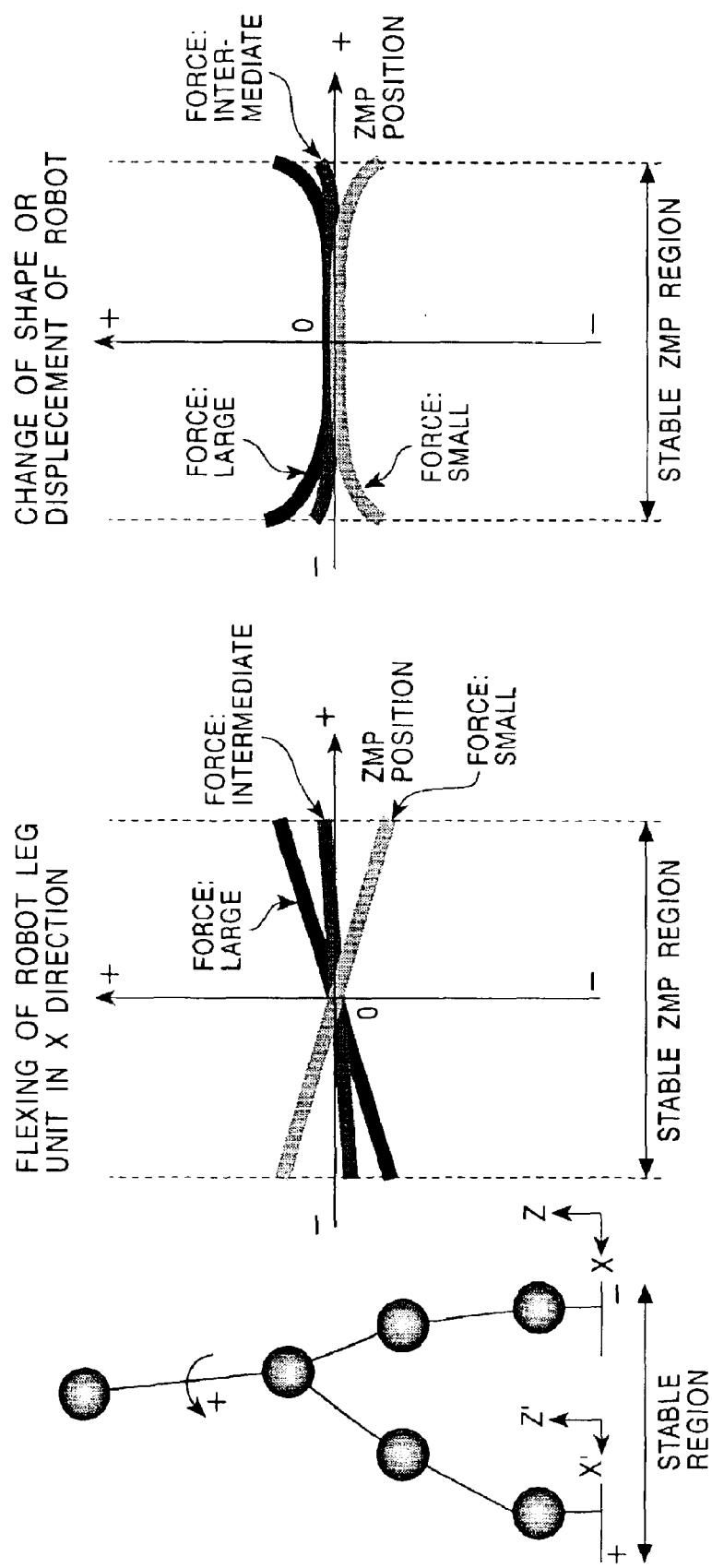
FIG. 23 illustrates an ideal structure of the ZMP behavior space of the torso unit in the X direction (the direction of movement) during the double support phase.

FIG. 22 and FIG. 23 respectively illustrate structures of the ideal ZMP behavior space of the torso unit in the Y direction (perpendicular to the direction of movement) and the X direction (the direction of movement) during the double support phase.

Referring to FIG. 22, in the ideal ZMP behavior space of the torso unit in the Y direction during the double support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. Since the two legs support the robot body during the double support phase, the rigidity in the ZMP behavior space becomes higher than during the single support period, and the space distortion is small. As a result, with a small floor reaction force, the torso unit is inwardly flexed as the ZMP position inwardly shifts to the robot body, and is outwardly flexed as the ZMP position outwardly shifts from the robot body. With the floor reaction force increasing, conversely, the torso unit is outwardly flexed as the ZMP position inwardly shifts to the robot body, and is inwardly flexed as the ZMP position outwardly shifts from the robot body.

Referring to FIG. 23, in the ideal ZMP behavior space of the torso unit in the X direction during the double support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. Since the two legs support the robot body during the double support phase, the rigidity in the ZMP behavior space becomes higher than during the single support period, and the space distortion is small. As a result, with a small floor reaction force, the torso unit is forwardly flexed as the ZMP position forwardly shifts from the robot body, and is backwardly flexed as the ZMP position back-wardly shifts from the robot body. With the floor reaction force increasing, conversely, the torso unit is backwardly flexed as the ZMP position forwardly shifts from the robot body, and is forwardly flexed as the ZMP position backwardly shifts from the robot body.

Figure 24:
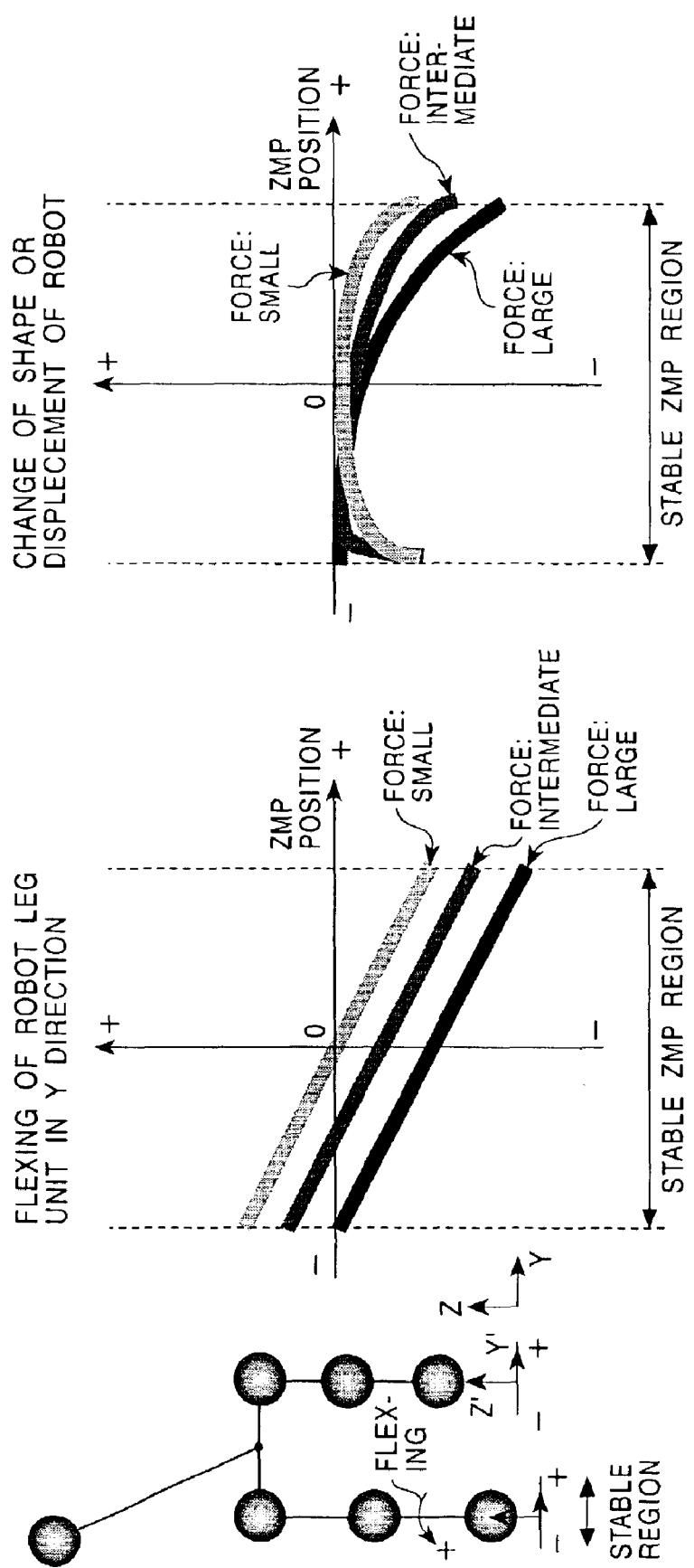
FIG. 24 illustrates a structure of the ZMP behavior space of an upstanding right leg in the Y direction (perpendicular to the direction of movement) during the early term of a single support phase.
Figure 25:
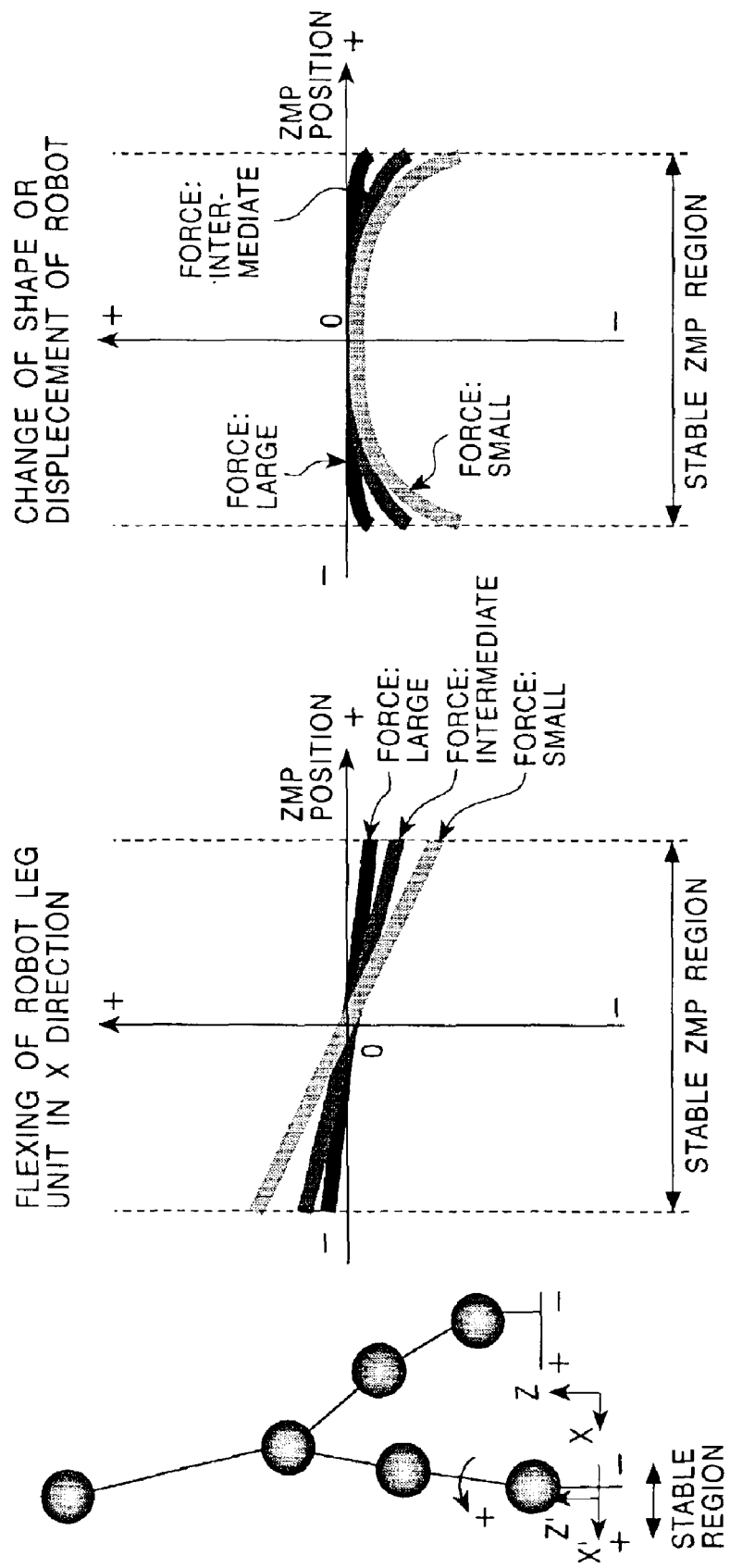
FIG. 25 illustrates a structure of the ZMP behavior space of the upstanding right leg in the X direction (the direction of movement) during the early term of the single support phase.

FIG. 24 and FIG. 25 respectively illustrate structures of the ZMP behavior space of the upstanding left leg in the Y direction (perpendicular to the direction of movement) and the X direction (the direction of movement) during the early term of a single support phase.

Referring to FIG. 24, in the ZMP behavior space of the upstanding right leg in the Y direction during the early term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes no momentum of the robot as the ZMP position outwardly shifts from the robot body. As a result, flexing is reduced in approximately linear proportion to the shifting of the ZMP position in the Y direction in the upstanding right leg as a supporting leg. With a small floor reaction force, the right leg is inwardly flexed as the ZMP position inwardly shifts to the robot body, and is outwardly flexed as the ZMP position outwardly shifts from the robot body. With the floor reaction force increasing, the upstanding right leg becomes difficult to be flexed even when the ZMP position outwardly shifts from the robot body.

Referring to FIG. 25, in the ZMP behavior space of the upstanding right leg in the Y direction during the early term of the single support phase, the momentum of the robot takes place in the negative direction, namely, in the direction that the ZMP position outwardly shifts from the center of the stable ZMP region as the ZMP position outwardly shifts from the center of the stable ZMP region. With the floor reaction force increasing, the resulting space distortion causes the momentum of the robot to gradually decrease. As a result, flexing is reduced in approximately linear proportion to the shifting of the ZMP position in the X direction in the upstanding right leg as a supporting leg. With a small floor reaction force, the upstanding right leg is forwardly flexed as the ZMP position forwardly shifts from the robot body, and is backwardly flexed as the ZMP position backwardly shifts from the robot body. With the floor reaction force increasing, the upstanding right leg becomes difficult to be flexed regardless of whether the ZMP position forwardly or backwardly shifts from the robot body.

Figure 26:
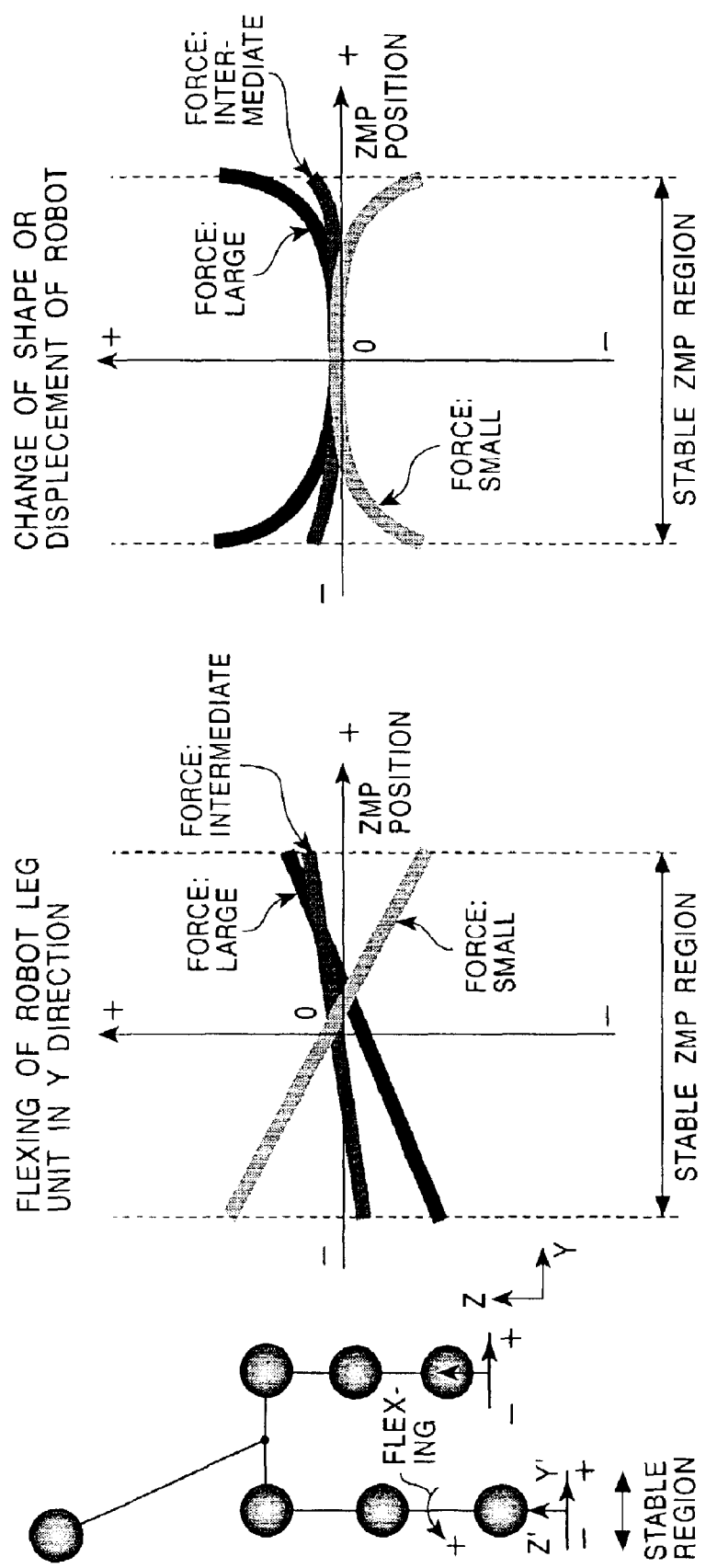
FIG. 26 illustrates an ideal structure of the ZMP behavior space of the upstanding right leg in the Y direction (perpendicular to the direction of movement) during the early term of the single support phase.
Figure 27:
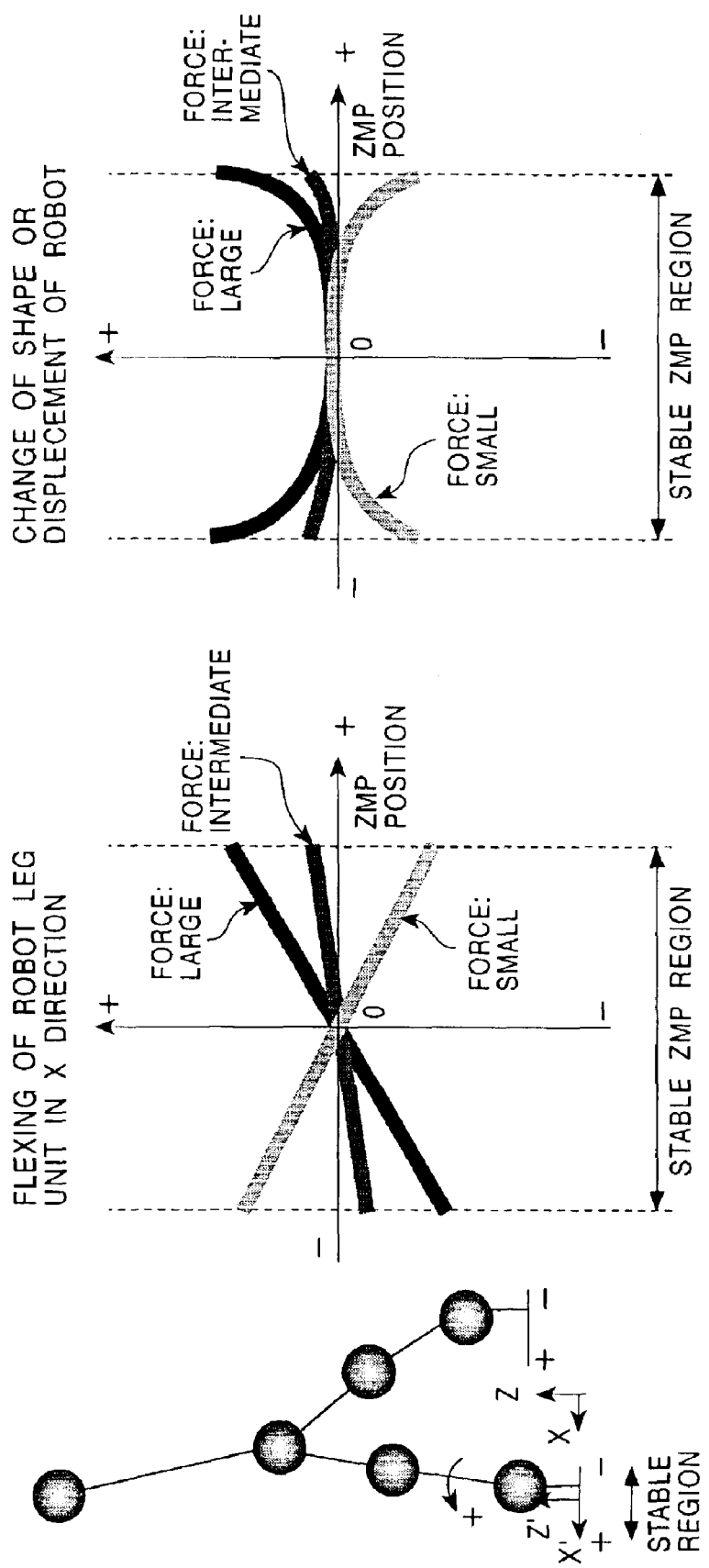
FIG. 27 illustrates an ideal structure of the ZMP behavior space of the upstanding right leg in the X direction (the direction of movement) during the early term of the single support phase.

FIG. 26 and FIG. 27 respectively illustrate structures of the ideal ZMP behavior space of the upstanding right leg in the Y direction (perpendicular to the direction of movement) and the X direction (the direction of movement) during the early term of the single support phase.

Referring to FIG. 26, in the ideal ZMP behavior space of the upstanding right leg in the Y direction during the early term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the upstanding right leg is outwardly flexed as the ZMP position outwardly shifts from the robot body, and is inwardly flexed as the ZMP position inwardly shifts to the robot body. With the floor reaction force increasing, conversely, the upstanding right leg is inwardly flexed as the ZMP position outwardly shifts from the robot body, and is outwardly flexed as the ZMP position inwardly shifts from the robot body.

Referring to FIG. 27, in the ideal ZMP behavior space of the upstanding right leg in the X direction during the early term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the upstanding right leg is forwardly flexed as the ZMP position forwardly shifts from the robot body, and is backwardly flexed as the ZMP position backwardly shifts from the robot body. With the floor reaction force increasing, conversely, the upstanding right leg is backwardly flexed as the ZMP position forwardly shifts from the robot body, and is forwardly flexed as the ZMP position backwardly shifts from the robot body.

Figure 28:
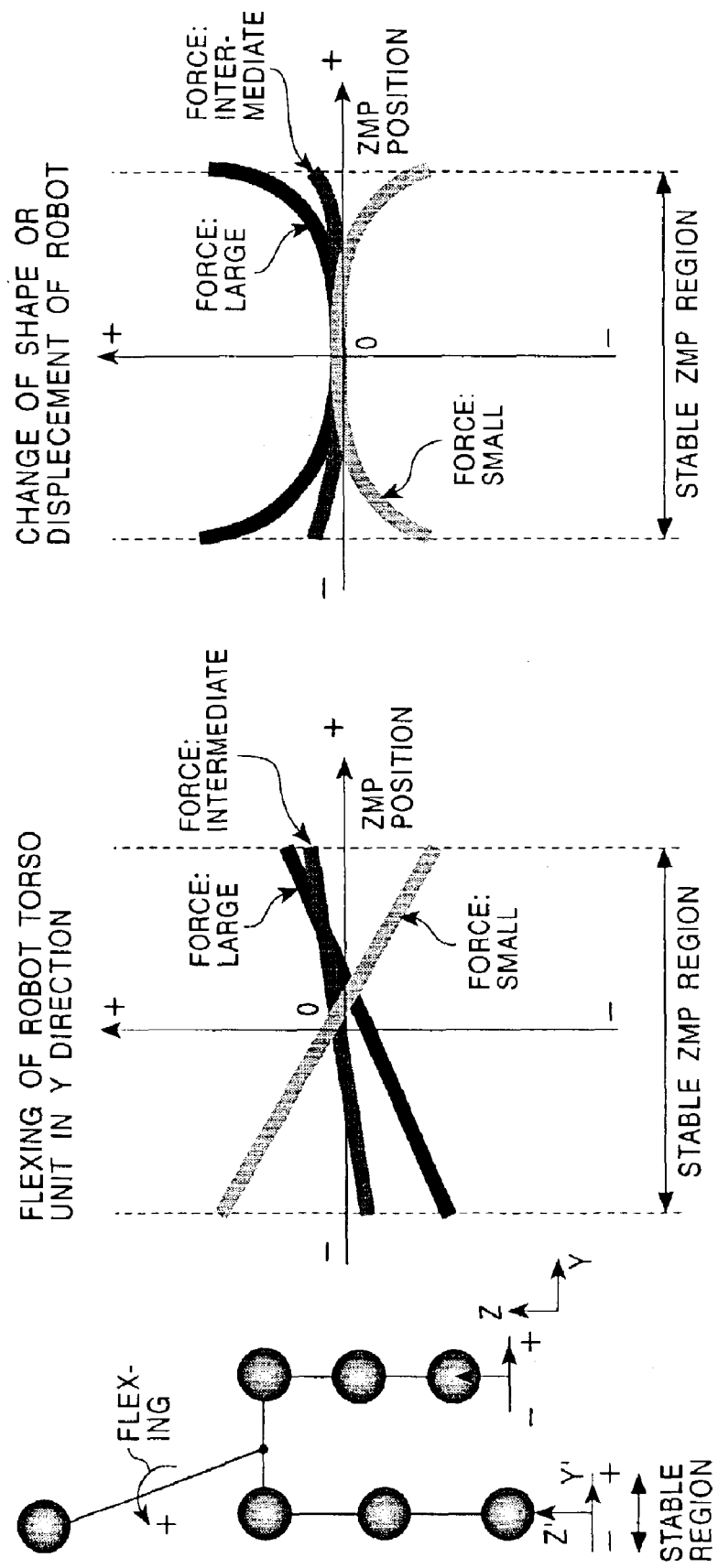
FIG. 28 illustrates an ideal structure of the ZMP behavior space of the torso unit in the Y direction (perpendicular to the direction of movement) during the early term of the single support phase.
Figure 29:
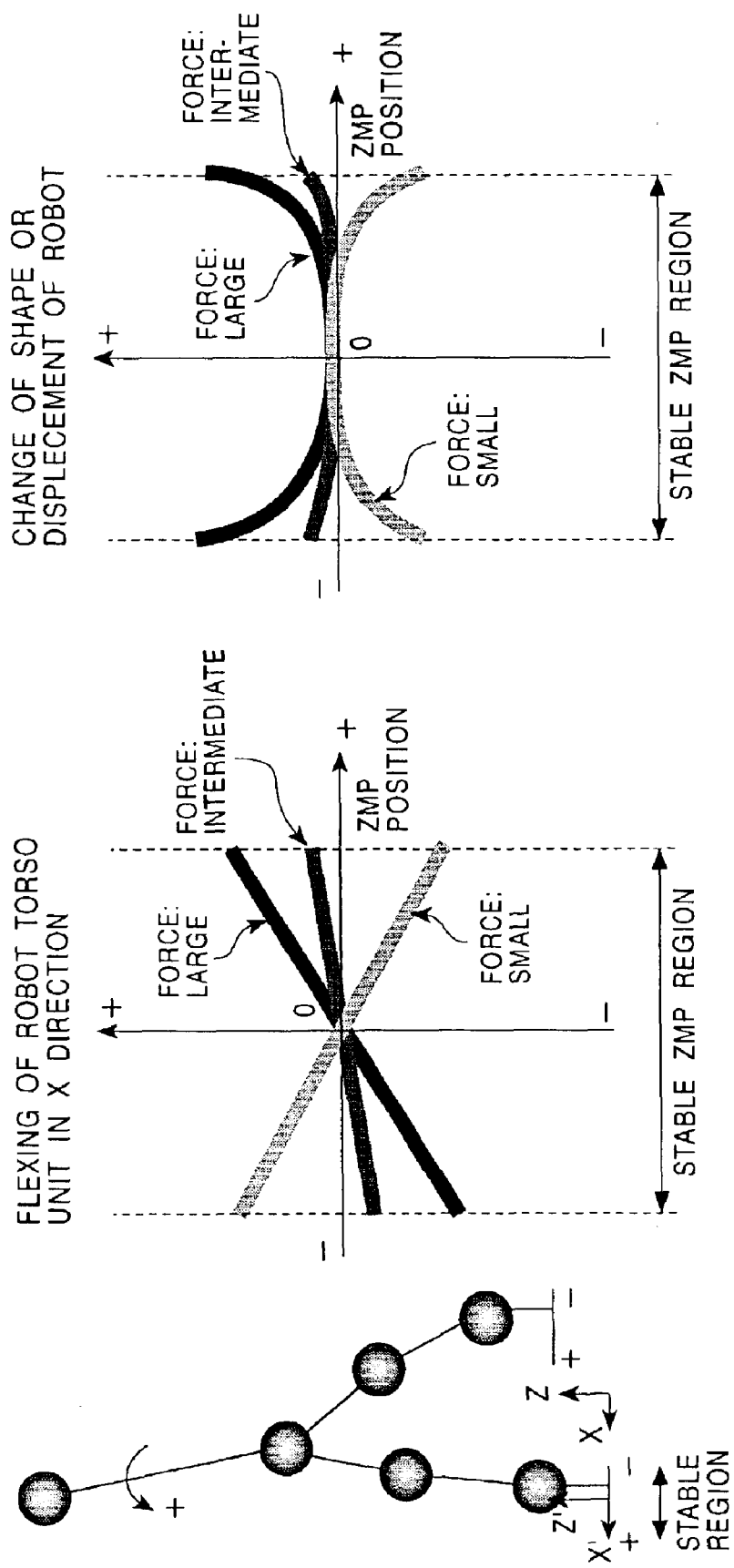
FIG. 29 illustrates an ideal structure of the ZMP behavior space of the torso unit in the X direction (the direction of movement) during the early term of the single support phase.

FIG. 28 and FIG. 29 respectively illustrate structures of the ideal ZMP behavior space of the torso unit in the Y direction (perpendicular to the direction of movement) and the X direction (the direction of movement) during the early term of the single support phase.

Referring to FIG. 28, in the ideal ZMP behavior space of the torso unit in the Y direction during the early term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the torso unit is outwardly flexed as the ZMP position outwardly shifts from the robot body, and is inwardly flexed as the ZMP position inwardly shifts to the robot body. With the floor reaction force increasing, conversely, the torso unit is inwardly flexed as the ZMP position outwardly shifts from the robot body, and is outwardly flexed as the ZMP position inwardly shifts from the robot body.

Referring to FIG. 29, in the ideal ZMP behavior space of the torso unit in the X direction during the early term of the single support phase, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As a result, with a small floor reaction force, the torso unit is forwardly flexed as the ZMP position forwardly shifts from the robot body, and is backwardly flexed as the ZMP position backwardly shifts from the robot body. With the floor reaction force increasing, conversely, the torso unit is backwardly flexed as the ZMP position forwardly shifts from the robot body, and is forwardly flexed as the ZMP position backwardly shifts from the robot body.

C. Example of the ZMP Behavior Space

In section B, the robot system configuration method featuring an excellent posture stability, not solely dependent on the ZMP stability determination criterion, has been discussed from the standpoint of the ZMP behavior space defined by the ZMP position and the floor reaction force based on the assumption that the robot and the walking surface are not extremely close to a solid body in nature.

In this section, the structure of the legged mobile robot embodying the ZMP behavior space in hardware to which a space distortion is imparted to stabilize the robot body is discussed.

C-1. Formation of the ZMP Behavior Space Stabilized with Foot Structure

Discussed in this section is one embodiment relating to a ZMP behavior space to which a space distortion for stabilizing the robot body with ease is imparted using the foot structure of the legged mobile robot 100.

Figure 30:
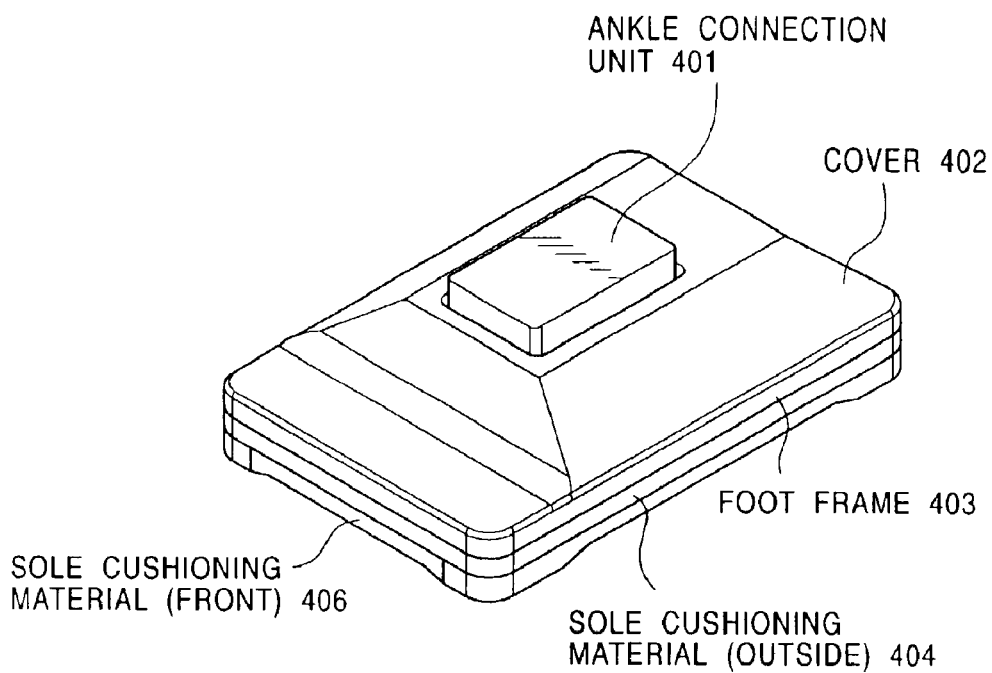
FIG. 30 is an external perspective view of the topside of a left foot for use in the legged mobile robot 100 in accordance with one embodiment of the present invention.
Figure 31:
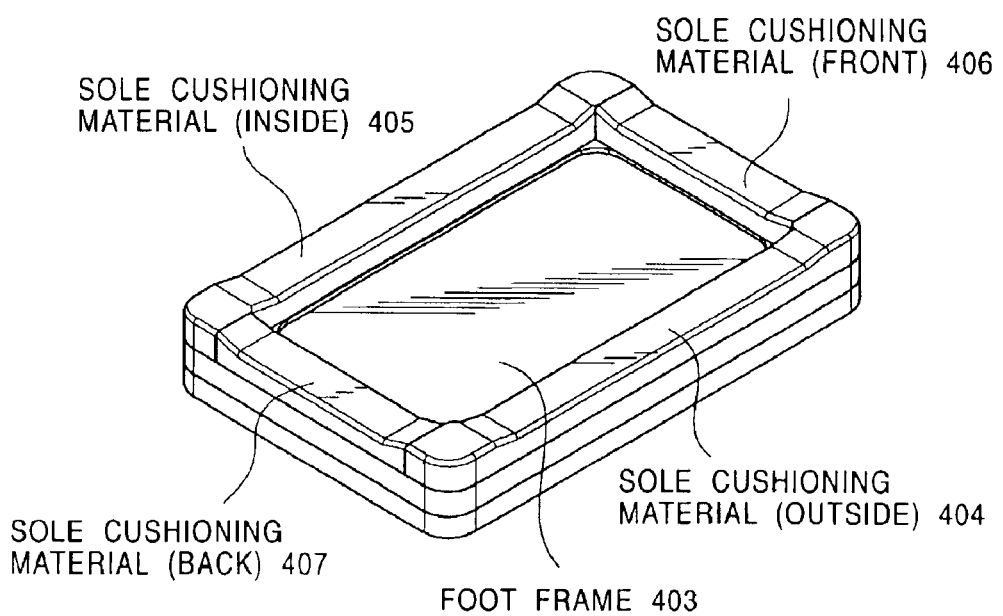
FIG. 31 is an external perspective view of the bottom side of the left foot for use in the legged mobile robot 100 in accordance with the one embodiment of the present invention.
Figure 36:
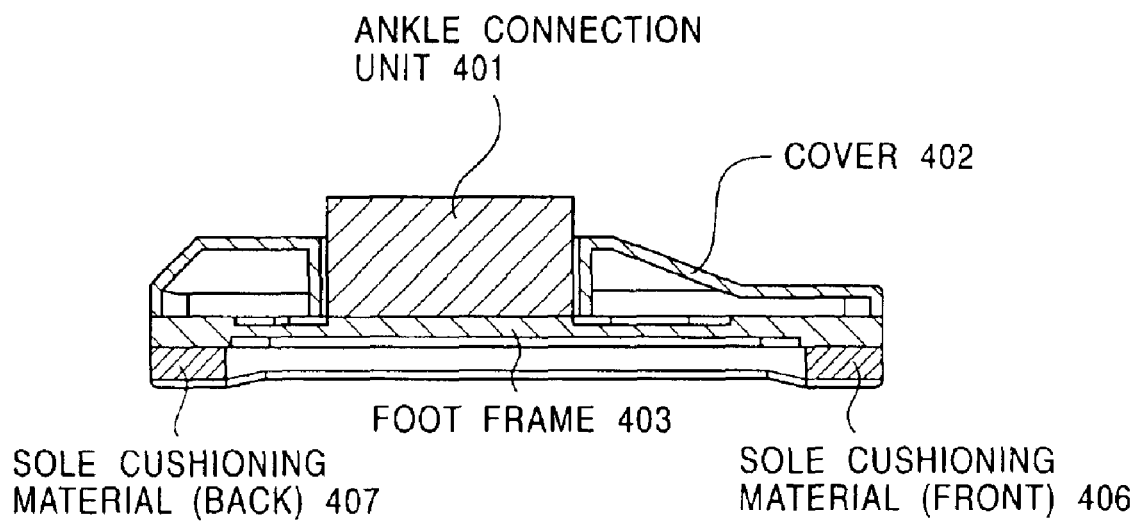
FIG. 36 is a cross-sectional view taken along line A-A in FIG. 35.

FIG. 30 is an external perspective view of the topside of a left foot for use in the legged mobile robot 100 in accordance with one embodiment of the present invention. FIG. 31 is an external perspective view of the bottom side of the left foot. FIG. 32 through FIG. 35 are respectively a side view (of the outside of the foot), a bottom view, a front view, and a top view of the foot. FIG. 36 is a cross-sectional view taken along line A-A in FIG. 35.

In the discussion that follows, the "sole" of the foot is a bottom surface of the foot, namely, a surface in contact with the walking surface, and the "top" surface of the foot is a surface opposite from the sole of the foot. The "inside" of the foot corresponds to the inside of the robot body (for example, the right-hand side of the left foot, namely, the arch of the left foot), and the "outside" of the foot corresponds to the inside of the robot body (for example, the left-hand side of the left foot, namely, opposite from the arch of the left foot).

Referring to FIG. 30 and FIG. 31, the foot includes a foot frame 403, and a cover 402 for covering the top surface of the foot frame 403. Referring to FIG. 36, the cover 402 has a hollow structure for lightweight design.

Arranged on the approximate center of the top surface of the foot frame 403 is an ankle connection unit 401 to be connected to the movable leg unit and an ankle joint.

The foot frame 403, the cover 402, and the ankle connection unit 401 are manufactured of a lightweight and high-rigidity material such as super duralmin.

Figure 33:
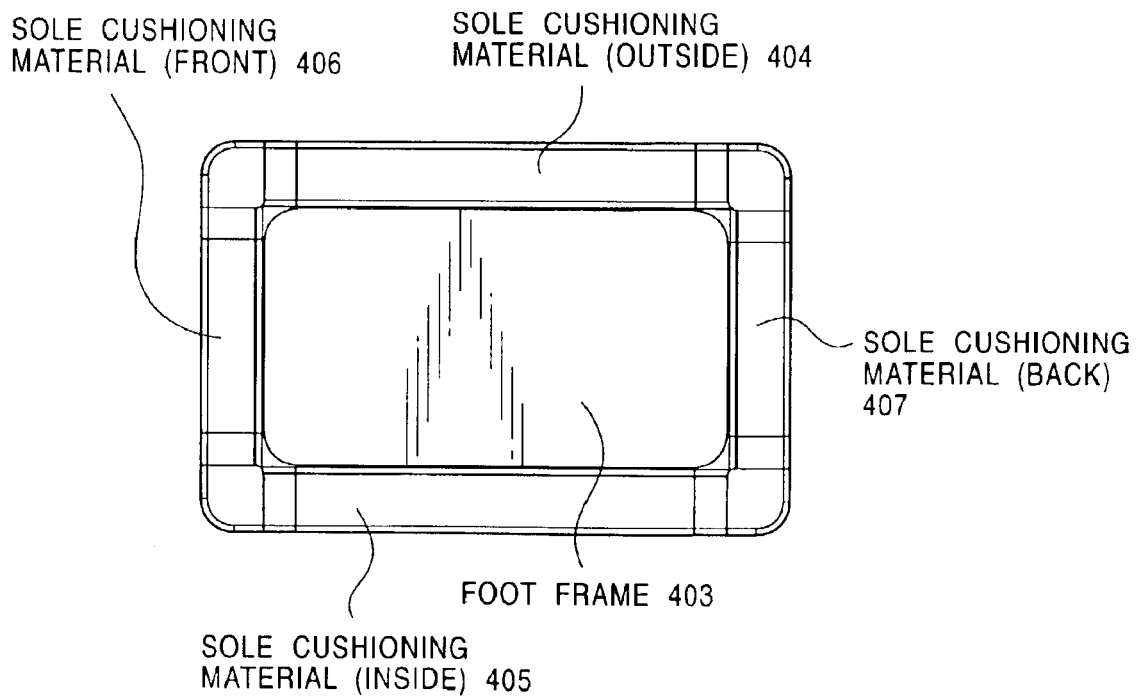
FIG. 33 is a bottom view of the left foot.
Figure 34:
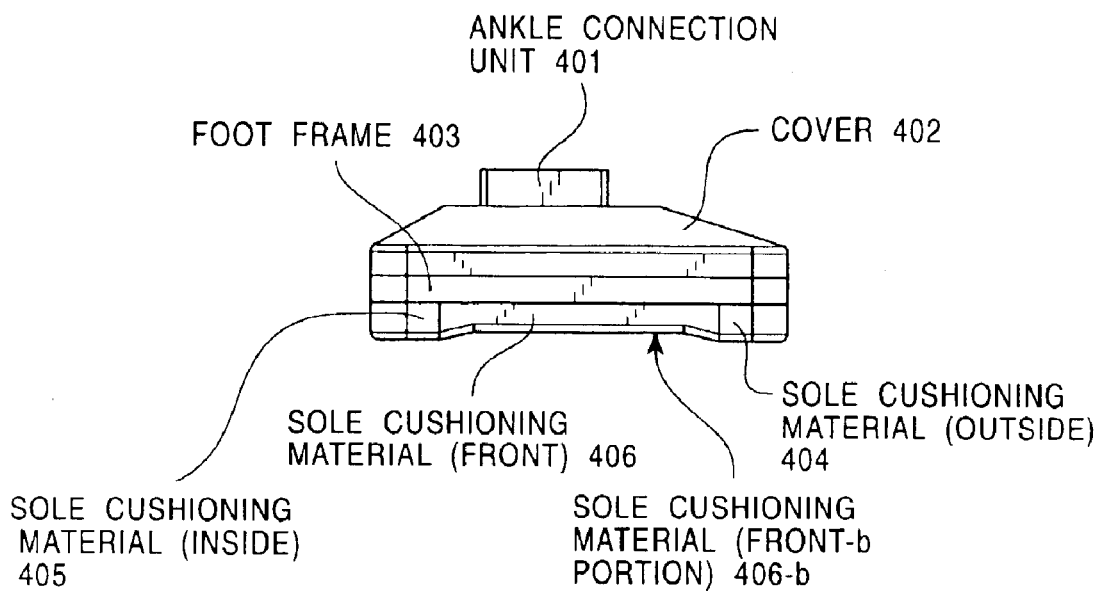
FIG. 34 is a front view of the left foot.
Figure 35:
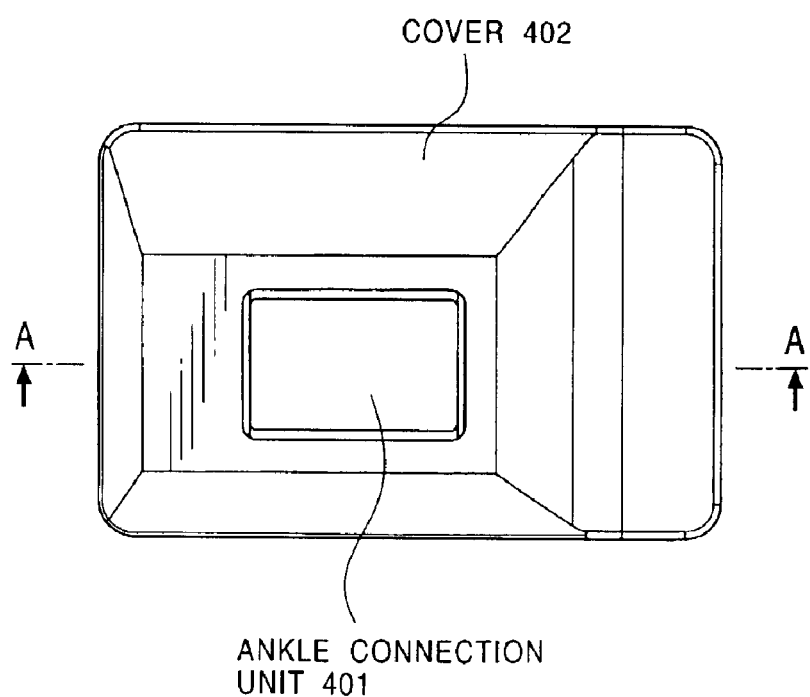
FIG. 35 is a top view of the left foot.

Arranged on the front and back portion, left and right portions of the sole of the foot frame 403 are a sole cushioning material (outside) 404, a sole cushioning material (inside) 405, a sole cushioning material (front) 406, and a sole cushioning material (back) 407 as illustrated in FIG. 33. These cushioning materials 404 through 407 are manufactured of an elastic body having a predetermined coefficient of elasticity such as urethane rubber.

Figure 32:
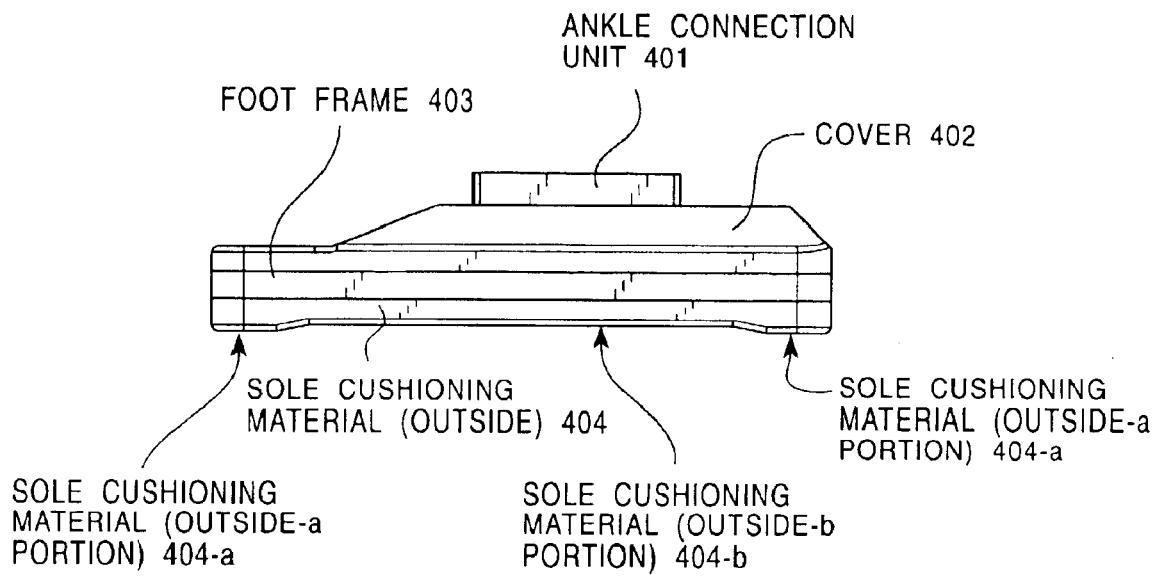
FIG. 32 is a side view illustrating the outside of the left foot.

As understood from FIG. 32, the sole cushioning material (outside) 404 is a recessed structure with projected portions 404-*a* on both sides, and a recessed portion 404-*b*. As understood from FIG. 31, similarly, the sole cushioning material (inside) 405 is a recessed structure with both end portions projected. The sole of the foot has thus four corner projections. The depth of the recessed portion of each sole cushioning materials (inside and outside) 404 and 405 is about 0.5 mm.

When a reaction force is applied in response to the landing of the sole on the walking surface, the robot is initially supported by the projected portions 404-a only, and the coefficient of elasticity is small (in other words, a deformation responsive to an external force is large). When the portions 404-a are compressed, reaching the same level as the recessed portion 404-b, the robot is supported by the entire sole of the foot. The coefficient of elasticity becomes large (in other words, the deformation responsive to the external force is small).

When the cushioning materials 404 and 405 are constructed of the recessed structure in this way, the deformation characteristics of the cushioning materials to the load such as the floor reaction force becomes non-linear. When the floor reaction force is small as in normal walking, the robot is supported by only the four corner projections of the sole of the foot. For example, when the floor reaction force exceeds a predetermined value in response to an impact exerted at the landing of the sole, the robot is supported by all cushioning materials 404–407 arranged on the sole of the foot. The characteristics of the foot in contact with the ground vary, thereby appropriately complying with the impact.

With the sole cushioning materials having the non-linear characteristics used, the sole cushioning material first starts being deformed at the beginning of the contact with the walking surface. A sufficient cushioning effect is thus expected. As the deformation is in progress, the deformation per applied load is being reduced in accordance with the non-linear characteristics, and the foot is free from an excess deformation which could lead to an instability of the foot.

Figure 37:
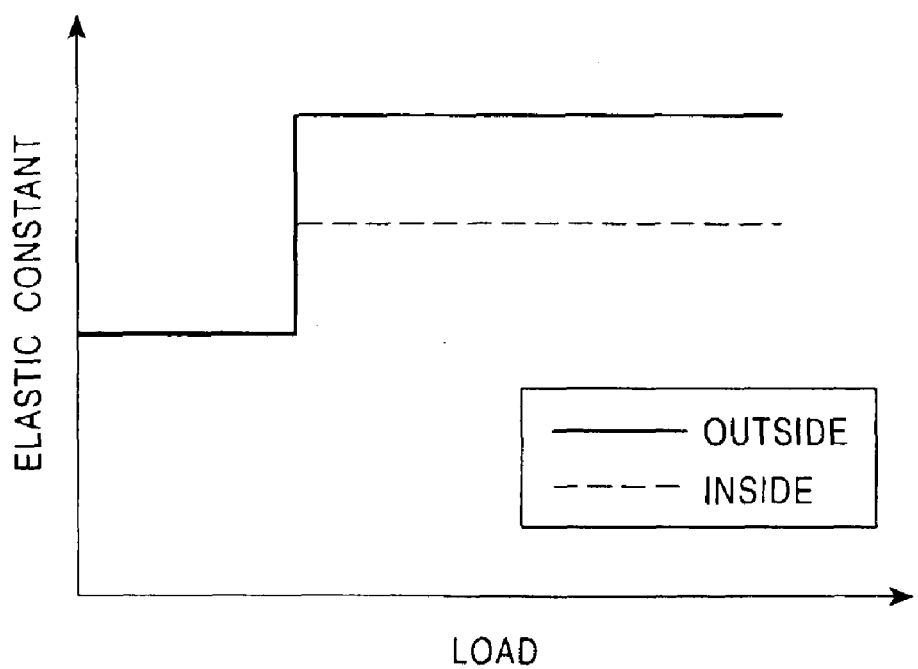
FIG. 37 is a graph comparing a sole cushioning material (inside) 405 with a sole cushioning material (outside) 404 in elastic coefficient.
Figure 38:
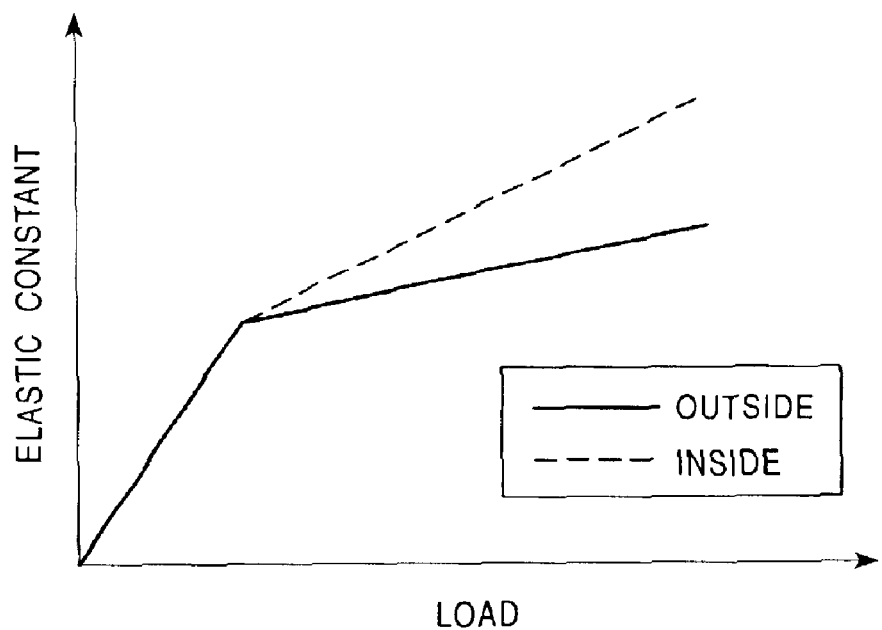
FIG. 38 is a graph comparing the sole cushioning material (inside) 405 with the sole cushioning material (outside) in terms of the momentum.

In accordance with the embodiment, the sole cushioning material (outside) 404 and the sole cushioning material (inside) 405 are different in elastic characteristics. Specifically, as shown in FIG. 37, the coefficient of elasticity of the sole cushioning material (outside) 404 is set to be larger than that of the sole cushioning material (inside) 405. As a result, the deformation of each of the sole cushioning material (outside) 404 and the sole cushioning material (inside) 405 becomes non-linear between normal walking and impact application. Referring to FIG. 38, the sole cushioning material (inside) 405 is larger than the sole cushioning material (outside) 404 in the deformation in a non-linear region.

With such a difference between the deformation characteristics of the sole cushioning material (outside) 404 and the sole cushioning material (inside) 405, the sole cushioning material (inside) 405 sinks deeper when a strong impact is applied. As a result, the leg unit (not shown) mounted on the foot frame 403 is tilted inwardly, namely, toward the inside (the arch side of the foot) of the robot body. By shifting the ZMP position of the robot within the inside of the robot body, namely, by causing a lifted leg to land, an effect works in a direction that the stable ZMP region is expanded.

With the sole structure shown in FIG. 30 through FIG. 35 adopted, in the ZMP behavior space, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As already discussed with reference to FIG. 14, FIG. 20, and FIG. 26, during each of the later term of the single support phase, the double support phase, and the early term of the single support phase, with a small floor reaction force, the upstanding leg is inwardly flexed as the ZMP position inwardly shifts to the robot body, and is outwardly flexed as the ZMP position outwardly shifts from the robot body. With the floor reaction force increasing, conversely, the upstanding leg is outwardly flexed as the ZMP position inwardly shifts to the robot body, and is inwardly flexed as the ZMP position outwardly shifts from the robot body. As a result, the stability and controllability of the robot posture are thus improved (in other words, the posture control becomes easy).

The non-linear characteristics of the cushioning materials are implemented by laminating elastic bodies having different coefficients of elasticity, rather than by arranging the projections in cross section of the cushioning materials. Furthermore, the deformation characteristics of the cushioning materials are easily set to be different between the inside (the arch side) of the foot and the outside (opposite from the arch side) of the foot by changing the shape and area of the cushioning material in use, and the coefficients of elasticity.

Figure 39:
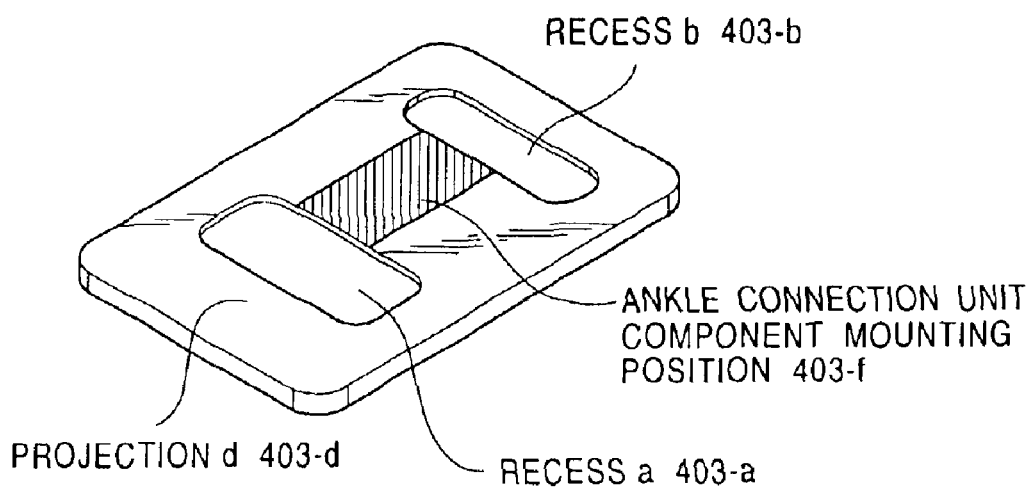
FIG. 39 is a perspective view of the top surface of a foot frame 403.
Figure 40:
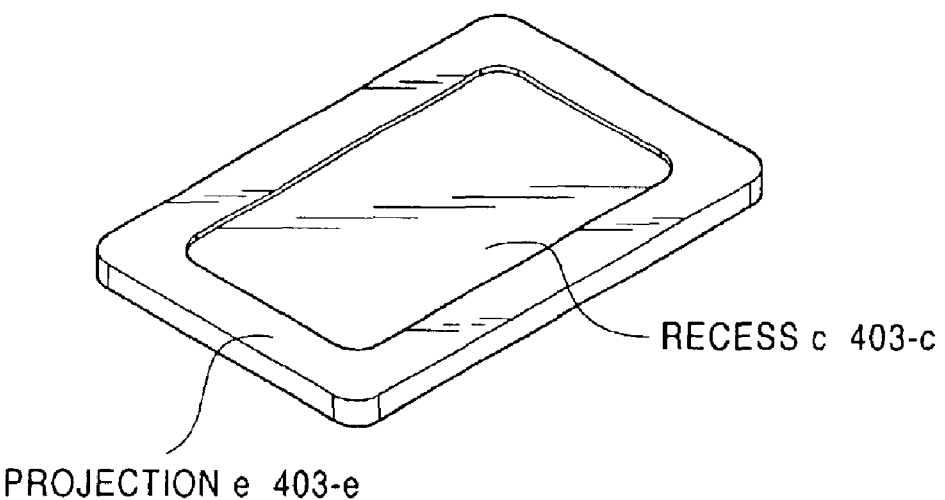
FIG. 40 is a perspective view of the bottom surface of the foot frame 403.

FIG. 39 is a perspective view of the top surface of a foot frame 403. FIG. 40 is a perspective view of the bottom surface of the foot frame 403.

As shown, the foot frame 403 is a planar structure fabricated of a lightweight and high rigid material, such as a super duralmin.

Referring to FIG. 39, the foot frame 403 has, on the topside thereof, a recess (a) 403-a and a recess (b) 403-b respectively on the front and back thereof. Arranged between the recesses 403-a and 403-b is a projection (d) 403-d which is a mounting position 403-f for ankle connection components.

Referring to FIG. 40, a recess (c) 403-c is formed in the approximate center of the sole of the foot frame 403, and a projection (e) 403-3 surrounds the recess (c) 403-c.

Figure 41:
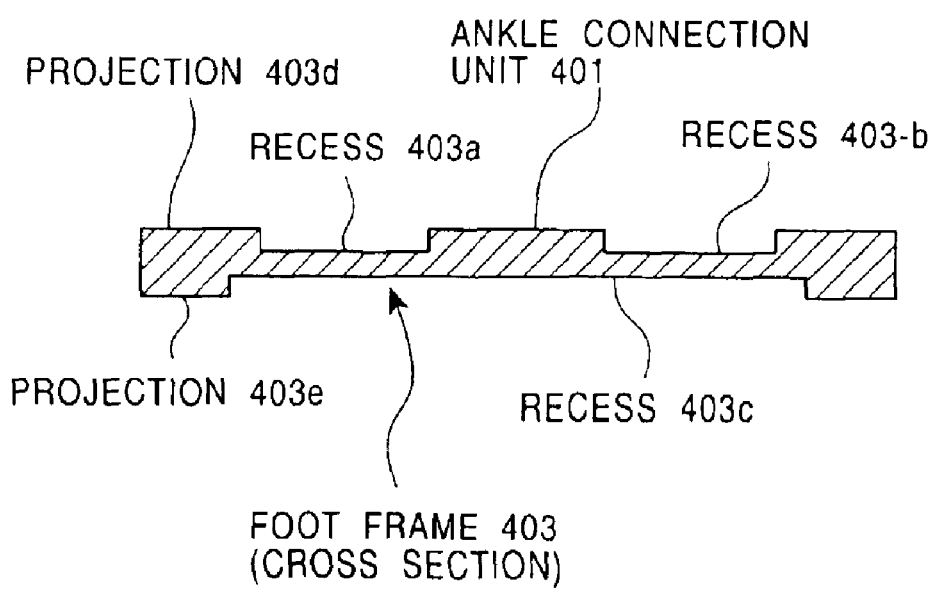
FIG. 41 is a cross-sectional view of the foot frame 403 taken along line in a roll axis direction.

FIG. 41 is a cross-sectional view of the foot frame 403 taken along line in a roll axis direction (namely, in the fore-aft direction of the robot body). As shown, recesses 403-a, 403-b, and 403-c are formed by decreasing the thickness of the planar structure of the foot frame 403, and has the effect of adjusting the balance of rigidity of the entire foot.

Figure 42:
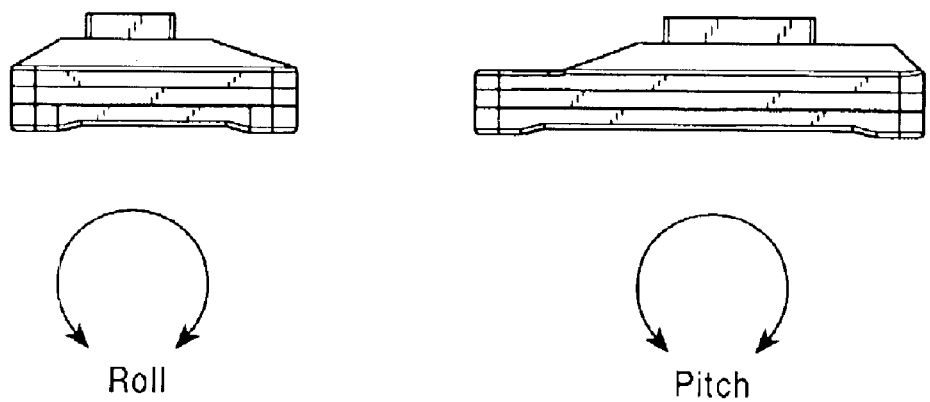
FIG. 42 illustrates the foot frame 403 in which the rigidity about the roll axis is set to be higher than the rigidity about the pitch axis.

In accordance with the present invention, the rigidity about the roll axis is set to be higher than that about the pitch axis by arranging the projection 403-d, between the recessed 403-a and 403b on both sides, in the approximate center of the topside of the foot frame 403 (see FIG. 42).

As seen from the entire structure of the robot body shown in FIG. 3 and FIG. 4, the two-legged mobile robot 100 has a range of the ZMP narrower in the transverse direction (in the direction about the roll axis) than in the direction of walking, namely, the fore-aft direction (the direction about the pitch axis). In other words, the robot has a low robustness against disturbances about the roll axis, and for this reason, severe control accuracy is required of about the roll axis. In this embodiment, the use of the structure of the foot frame 403 as shown in FIG. 39 through FIG. 41 heightens the rigidity of the roll axis. The robustness in the traverse direction responsive to the disturbances is substantially increased.

The use of the sole structure shown in FIG. 39 through FIG. 41 causes a space distortion so that the momentum of the robot takes place shifting the ZMP position to the center of the stable ZMP region in the ZMP behavior space. As already discussed with reference to FIG. 14, FIG. 20, and FIG. 26, during each of the later term of the single support phase, the double support phase, and the early term of the single support phase, the upstanding leg is inwardly flexed when the ZMP position outwardly shifts from the robot body.

With the mechanical structure that causes the space distortion in the ZMP behavior space for shifting the ZMP position to the center of the stable ZMP region, the stability and controllability of the robot posture are improved. The posture stability of the robot body is maintained with a relatively long sampling period, and the posture control thus becomes easy.

Figure 43:
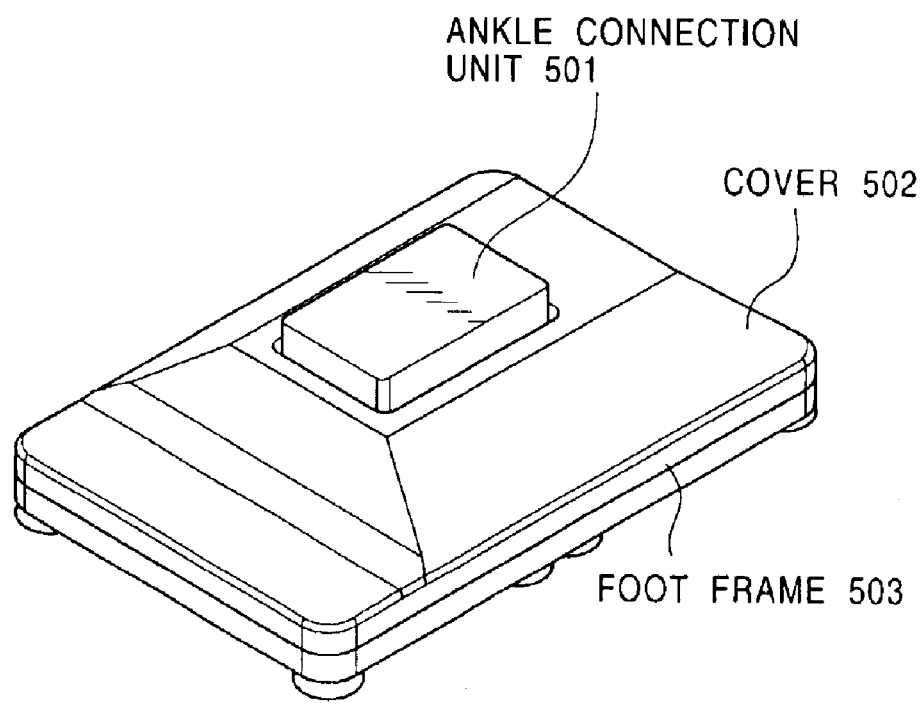
FIG. 43 is an external perspective view of the topside of the left foot in accordance with one embodiment of the present invention.
Figure 44:
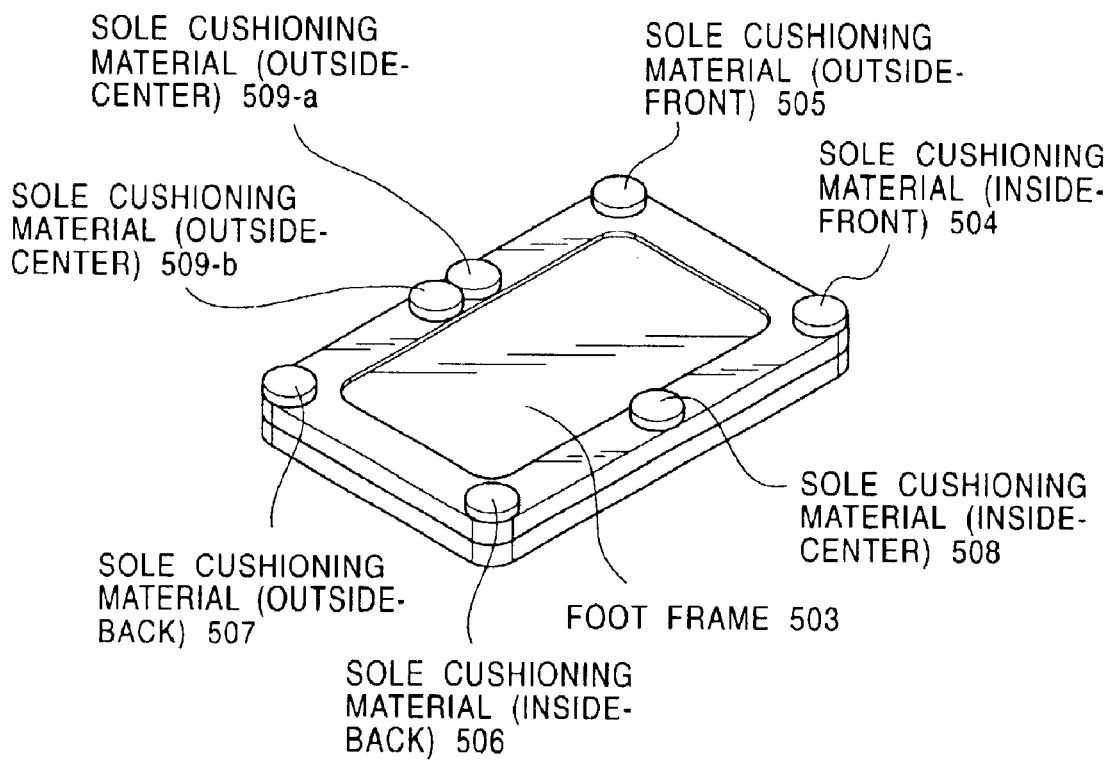
FIG. 44 is an external perspective view of the bottom side of the left foot in accordance with the one embodiment of the present invention.
Figure 45:
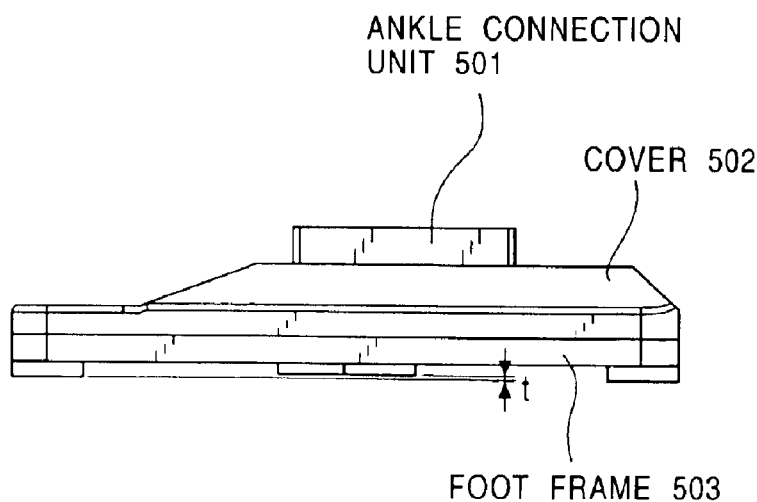
FIG. 45 is a side view of the left foot in accordance with the one embodiment of the present invention.
Figure 46:
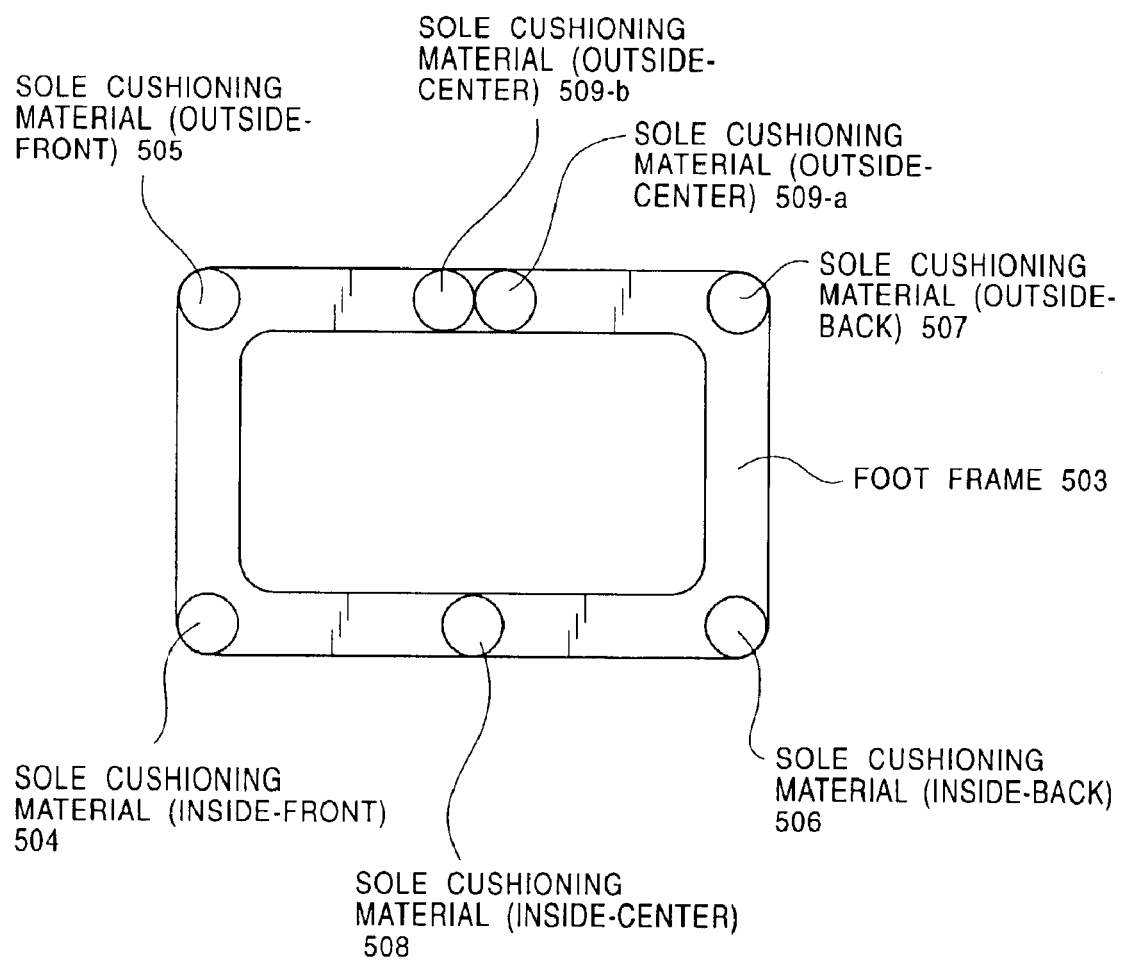
FIG. 46 is a bottom view of the left foot in accordance with the one embodiment of the present invention.

FIG. 43 is an external perspective view of the topside of the left foot in accordance with another embodiment of the present invention. FIG. 44 is an external perspective view of the bottom side of the same left foot. FIG. 45 and FIG. 46 are respectively a side view (of the outside of the foot) and a bottom view of the foot.

Referring to FIG. 43 and FIG. 44, the foot includes the foot frame 503 and a cover 502 covering the topside f the foot frame 503. The cover 502 has a hollow structure for lightweight design. Arranged in the approximate center of the topside of the foot frame 503 is an ankle connection unit 501 connected to a movable leg unit and an ankle joint.

Like in the preceding embodiment shown in FIG. 39 through FIG. 41, the foot frame 503 is formed of a planar structure with at least one recess on each of the top side and the bottom side thereof, and the balancing between the rigidity about the pitch axis and the rigidity about the roll axis is adjusted. The rigidity about the roll axis is set to be higher than the rigidity about the pitch axis (see FIG. 43). The robust in the traverse direction against the disturbances is substantially enhanced.

The body of each of the foot frame 503, the cover 502, and the ankle connection unit 501 is fabricated of a lightweight and high-rigidity material such as super duralmin (as in the preceding embodiment).

As seen from FIG. 44 and FIG. 46, a sole cushioning material (inside-front) 504, a sole cushioning material (outside-front) 505, a sole cushioning material (inside-back) 506, and a sole cushioning material (outside-back) 507 are respectively arranged on the four corners of the sole of the foot frame 503. A single sole cushioning material (inside-center) 508 is arranged along the inside edge (the arch side) of the sole of the foot, and two sole cushioning materials (outside-center) 509-a and 509-b are arranged along the outside edge of the sole of the foot. These sole cushioning materials 504 through 509 are manufactured of an elastic body having a predetermined coefficient of elasticity such as urethane rubber.

As seen from FIG. 45, the sole cushioning material (inside-center) 508 arranged in the approximate center of the inside edge of the sole and the sole cushioning materials 509-a and 509-b arranged in the approximate center of the outside edge of the sole have height dimensions smaller than those of the other sole cushioning materials 504–507. The difference in height dimensions is as large as 0.5 mm. The difference in height dimensions causes non-linearity to the elasticity of the entire foot (see FIG. 37 through FIG. 38).

When a reaction force of the walking surface acts in response to the contact of the sole to the walking surface, the robot is initially supported by only the sole cushioning materials 504 through 507 on the four corners having more height dimensions. The coefficient of elasticity is small (in other words, the deformation is large in response to the external force). When the four corner sole cushioning materials 504–507 is deformed, and reach the same level as that of the sole cushioning material (inside-center) 508 and the sole cushioning materials 509-a and 509-b, the robot is supported by all cushioning materials 504–509. The coefficient of elasticity increases (in other words, the deformation becomes small in response to the external force).

When a difference in height dimensions is made between the four corner cushioning materials 504–507 and the cushioning materials 508–509 arranged in the approximate center along the inside edge and the outside edge of the sole, the deformation characteristics of the cushioning materials is set to be non-linear in response to the load such as the floor reaction force. When the floor reaction force is small as in normal walking, the robot is supported by only the four corner projections of the sole of the foot. For example, when the floor reaction force exceeds a predetermined value in response to an impact exerted at the landing of the sole, the robot is supported by all cushioning materials 504–509 arranged on the sole of the foot. The characteristics of the foot in contact with the ground vary, thereby appropriately complying with the impact.

With the sole cushioning materials having the non-linear characteristics used, the sole cushioning material first starts being deformed at the beginning of the contact with the walking surface. A sufficient cushioning effect is thus expected. As the deformation is in progress, the deformation per applied load is being reduced in accordance with the non-linear characteristics, and the foot is free from an excess deformation, which could lead to instability of the foot.

Furthermore in accordance with the embodiment, a difference is made in the elastic characteristics between the inside and the outside of the sole by introducing a difference in number between the sole cushioning materials 508 in the approximate center of the inside edge of the sole and the sole cushioning materials 509 in the approximate center of the outside edge of the sole. Specifically, as illustrated in FIG. 37, the coefficient of elasticity is set to be large by setting the number of cushioning materials on the outside of the sole than that on the inside. As a result, the deformation of the sole cushioning materials (outside) 509 and the sole cushioning material (inside) 508 becomes non-linear between normal walking and impact application. Referring to FIG. 38, the sole cushioning material (inside) 508 is larger than the sole cushioning material (outside) 509 in the deformation in a non-linear region.

With such a difference between the deformation characteristics of the sole cushioning material (outside) 509 and the sole cushioning material (inside) 508, the sole cushioning material (inside) 508 sinks deeper when a strong impact is applied. As a result, the leg unit (not shown) mounted on the foot frame 503 is tilted inwardly, namely, toward the center of the robot body. By shifting the ZMP position of the robot within the inside of the robot body, namely, by causing a lifted leg to land, an effect works in a direction that the stable ZMP region is expanded.

With the sole structure shown in FIG. 43 through FIG. 46 adopted, in the ideal ZMP behavior space, the momentum of the robot takes place in the negative direction, namely, in the direction that the ZMP position outwardly shifts from the center of the stable ZMP region as the ZMP position outwardly shifts from the center of the stable ZMP region, when the floor reaction force is small. With the floor reaction force increasing, the resulting space distortion causes the momentum of the robot to shift in the positive direction, namely, in the direction that the ZMP position shifts to the center of the stable ZMP region as the ZMP position outwardly shifts from the center of the stable ZMP region. As already discussed with reference to FIG. 14, FIG. 20, and FIG. 26, during each of the later term of the single support phase, the double support phase, and the early term of the single support phase, with a small floor reaction force, the upstanding leg is inwardly flexed as the ZMP position inwardly shifts to the robot body, and is outwardly flexed as the ZMP position outwardly shifts from the robot body. With the floor reaction force increasing, conversely, the upstanding leg is outwardly flexed as the ZMP position inwardly shifts to the robot body, and is inwardly flexed as the ZMP position outwardly shifts from the robot body. As a result, the stability and controllability of the robot posture are thus improved (in other words, the posture control becomes easy).

The non-linear characteristics of the cushioning materials are implemented by laminating elastic bodies having different coefficients of elasticity, rather than by arranging the projections in cross section of the cushioning materials. Furthermore, the deformation characteristics of the cushioning materials are easily set to be different between the inside (the arch side) of the foot and the outside (opposite from the arch side) of the foot by changing the shape and area of the cushioning material in use, and the coefficients of elasticity.

In accordance with this embodiment of the present invention, a stable space distortion is incorporated in the ZMP behavior space with the unique structure of the foot of the present invention. It is thus noted that the posture of the robot body is controlled using the ZMP stability determination criterion with a relatively long sampling period.

C-2. Formation of a Stable ZMP Behavior Space with a Leg Structure

This embodiment relates to a ZMP behavior space, to which a space distortion is given using a frame structure of a leg unit of the legged mobile robot 100 to stabilize the robot body in posture.

This embodiment adopts a structure in which the inside portion and the outside portion of each of a left leg unit and a right leg unit are made different in rigidity, namely, the outside frame of the leg unit is set to be higher in rigidity than the inside frame of the leg unit (in particular, in flexural rigidity).

Since the leg unit having such a structure forms a space distortion in the ZMP behavior space shifting the ZMP position to the center of the stable ZMP region, the stability and controllability of the robot posture are thus improved (in other words, the posture control becomes easy).

Even when unexpected disturbances occur, the robot easily avoids falling (naturally using the mechanical structure) by making it difficult for the ZMP position of the robot to move toward the outside of the robot body, namely, to the side opposite from the arch of the foot.

Figure 47:
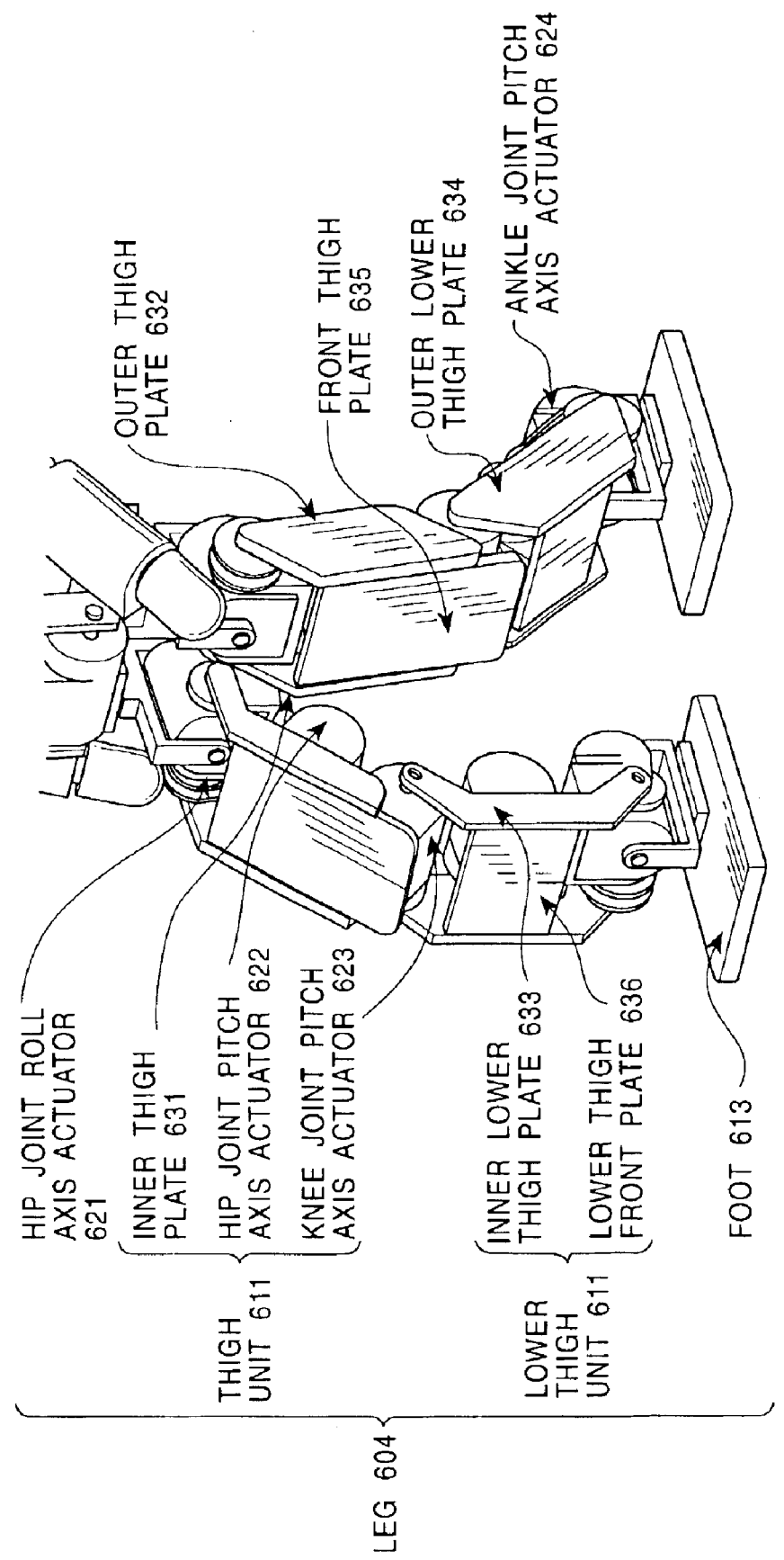
FIG. 47 is an enlarged view of each of left and right legs 104 of the legged mobile robot 100 in accordance with the one embodiment of the present invention.

FIG. 47 is an enlarged view of each of left and right leg units 604 of the legged mobile robot 100 in accordance with one embodiment of the present invention.

As shown, the leg unit 604 includes a thigh unit 611, a lower thigh unit 612, and a foot 613.

Arranged on the approximate top portion of the thigh unit 611 are a hip joint roll axis actuator 621 and a hip joint pitch axis actuator 622 for imparting degrees of freedom of joint to the roll axis and the pitch axis with respect to a torso unit 601. Arranged on the approximate end portion of the thigh unit 611 is a knee joint pitch axis actuator 623 for imparting a degree of freedom of joint to the pitch axis with respect to the lower thigh unit 612 arranged therebelow.

The inside, namely, the arch side of the thigh unit 611 is supported by an inner thigh plate 631. The outside, namely, the side opposite from the arch side, of the thigh unit 611, is supported by an outer thigh plate 632. The front of the thigh unit 611 is covered with a front thigh plate 635. The inner thigh plate 631 and the outer thigh plate 632 are manufactured of a relatively lightweight but rigid material, such as super duralmin.

Arranged closely below the lower thigh unit 612 is an ankle joint pitch axis actuator 624 for providing a degree of freedom of joint about the pitch axis with respect to the foot 613.

The inside, namely, the arch side of the lower thigh unit 612 is supported by an inner lower thigh plate 633. The outside, namely, the side opposite from the arch side of the lower thigh unit 612 is supported by an outer lower thigh plate 634. The front of the lower thigh unit 612 is covered with a lower thigh front plate 636. The inner lower thigh plate 633 and the outer lower thigh plate 634 are manufactured of a relatively lightweight but rigid material, such as super duralmin.

Figure 48:
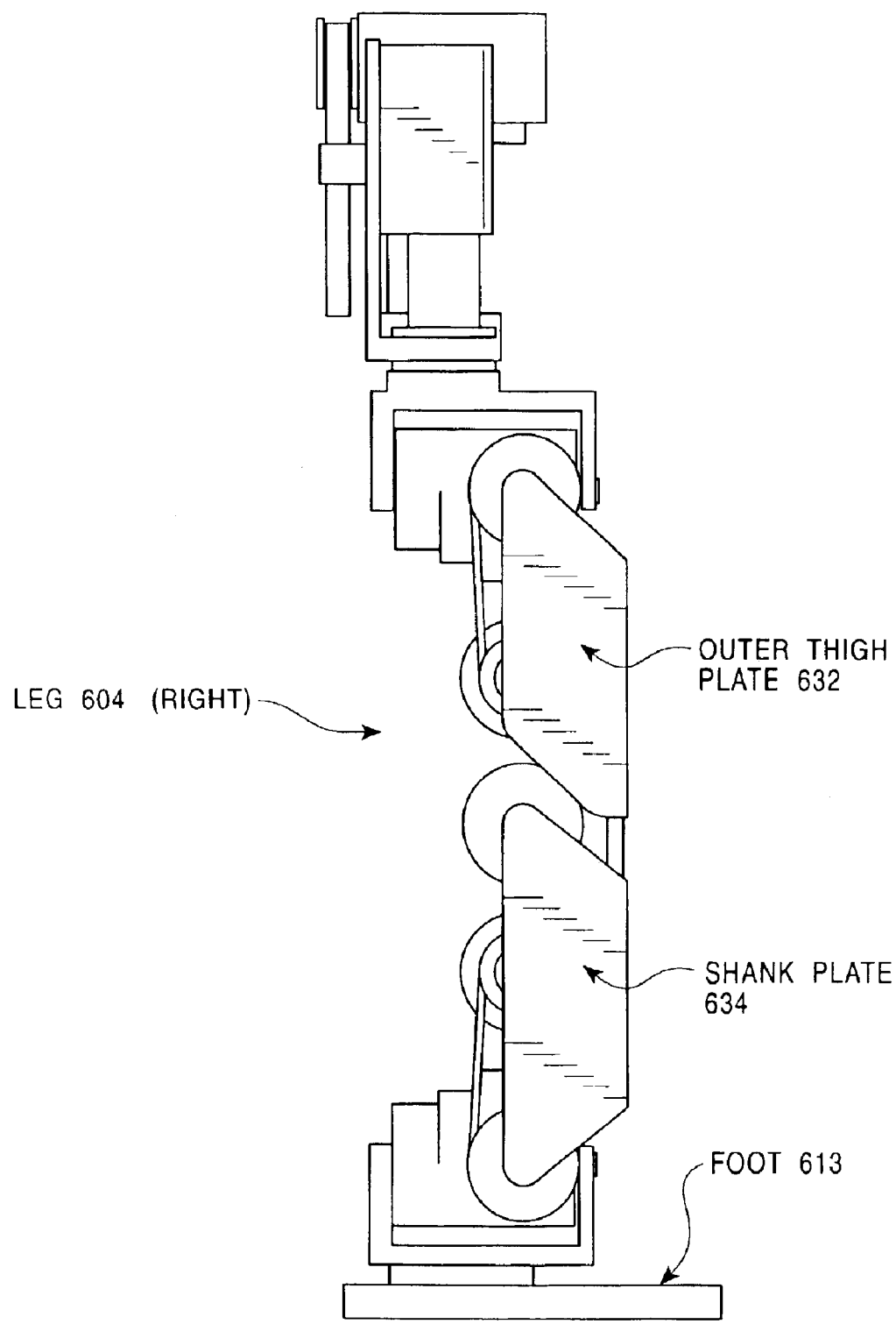
FIG. 48 is a side view illustrating the outside (opposite from the arch of the foot) of the leg unit of the legged mobile robot 100 illustrated in FIG. 47.
Figure 49:
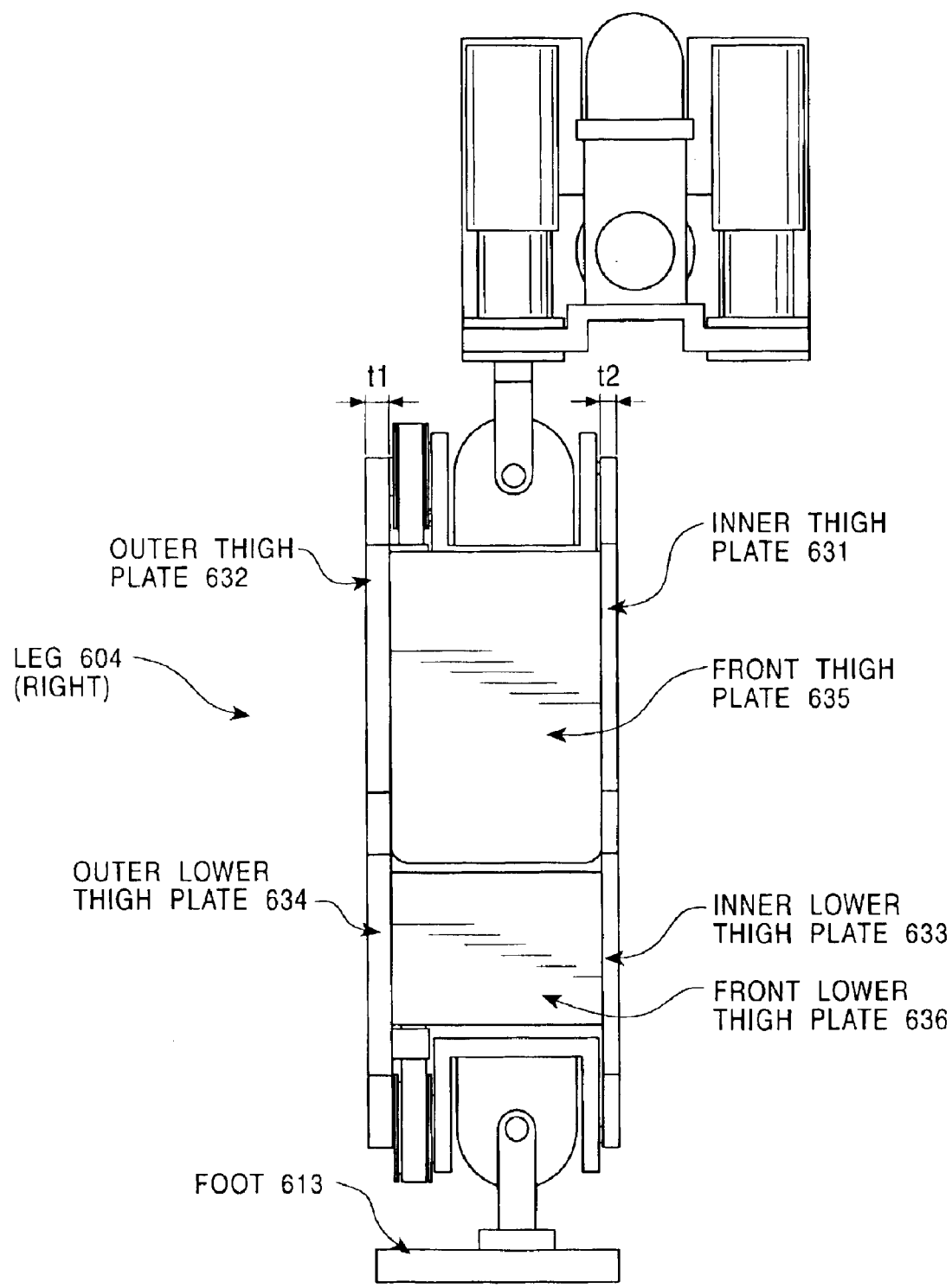
FIG. 49 is a front view of the leg unit of the legged mobile robot 100 illustrated in FIG. 47.
Figure 50:
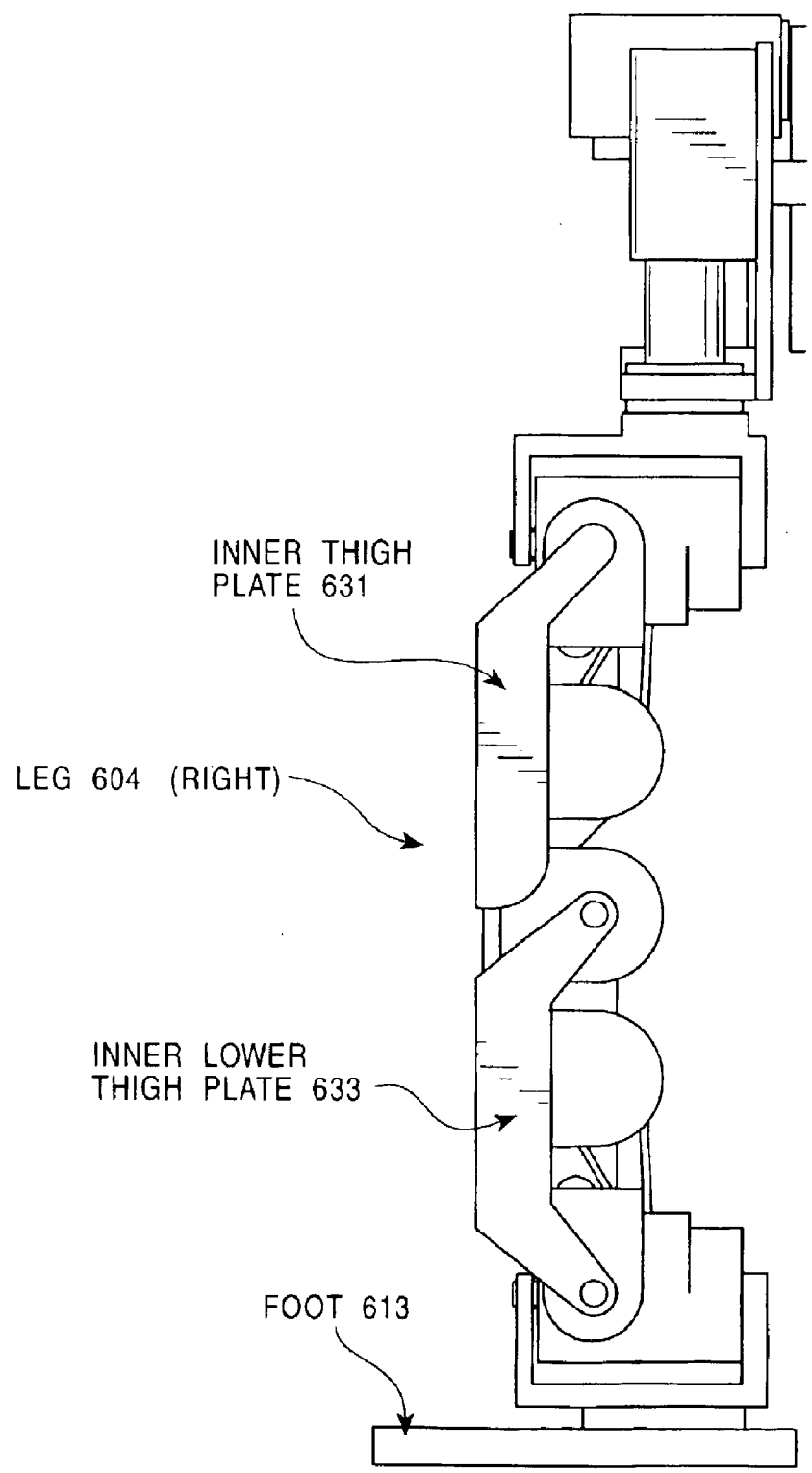
FIG. 50 is a side view illustrating the inside (the arch of the foot) of the leg unit of the legged mobile robot 100 illustrated in FIG. 47.

FIG. 48 through FIG. 50 are figures of the leg unit of the legged mobile robot 100 viewed from three different angles, namely, an outside side view (of the side opposite from the arch side), a front view, and an inside side view (of the arch side) of the foot.

As seen from FIG. 49, in this embodiment, the outer thigh plate 632 is larger in thickness than the inner thigh plate 631 (namely, t1>t2). As a result, the rigidity (flexural rigidity, in particular) of the outer thigh plate 632 is larger. Similarly, the outer lower thigh plate 634 is larger in thickness than the inner lower thigh plate 633. The rigidity (flexural rigidity, in particular) of the outer lower thigh plate 634 is larger.

With the mechanical strengths of the inside and the outside of the leg unit set in this way as illustrated in FIG. 47 through FIG. 50, a space distortion takes place causing the momentum of the robot to shift in the positive direction, namely, in the direction that the ZMP position shifts to the center of the stable ZMP region as the ZMP position outwardly shifts from the center of the stable ZMP region. As already discussed with reference to FIG. 14, FIG. 20, and FIG. 26, during each of the later term of the single support phase, the double support phase, and the early term of the single support phase, the upstanding leg is inwardly flexed as the ZMP position outwardly shifts from the robot body. As a result, the stability and controllability of the robot posture are improved. The posture stability of the robot body is maintained with a relatively long sampling period. The posture control thus becomes easy.

As a whole leg unit 604, the structure thereof has rigidity (in particular, flexural rigidity) higher in the inside than in the outside thereof. Even when unexpected disturbances occur, the leg unit 604 functions naturally (namely without any control) in a manner such that the ZMP position of the legged mobile robot 100 has difficulty in shifting out of the robot body, namely, toward the side opposite from the arch side of the foot.

By setting the rigidity of the outside frame than that of the inside frame of the leg unit 604, the shifting of the ZMP to the outside of the robot body, namely, to the side opposite from the arch side in response to unexpected disturbances is reduced. The shifting of the ZMP due to the disturbances is guided in a direction toward the inside of the robot body, namely, to the arch side of, which is easy to handle with the leg unit 604. The robustness of the whole robot 600 against the disturbance is thus substantially increased.

By setting the rigidity on the arch side to be relatively lower, a low-cost actuator having a position control function only performs a leg switching operation with a low impact and a small vibration involved. An image processing during a walking operation becomes easy. As a result, a two-legged mobile robot system or a humanoid robot having an autonomous function is produced at a very low cost.

To make it difficult for the ZMP position of the legged mobile robot 100 to move to the outside, namely, the side opposite from the arch side, the rigidity of the outside of the leg unit 604 is preferably set to be 1.2 times higher than that of the inside of the leg unit 604. More preferably, the rigidity of the outside of the leg unit 604 is preferably set to be 1.5 through 2 times higher than that of the inside of the leg unit 604.

In the embodiment shown in FIG. 47 through FIG. 50, a difference in rigidity between the outside and the inside of the leg unit 604 is introduced by making a difference in thickness among the side plates 631 through 634. The present invention is not limited to this arrangement. The same effect may be provided by making a difference in shape (a surface shape and a cross-sectional shape) and a difference in material (for example, the use of materials having different coefficients of elasticity may be used).

In accordance with this embodiment of the present invention, a stable space distortion is incorporated in the ZMP behavior space with the unique structure of the leg unit of the present invention. It is thus noted that the posture of the robot body is controlled using the ZMP stability determination criterion with a relatively long sampling period.

D. Control System of the ZMP Behavior Space

In this embodiment, the motion control module 300 computes and processes the posture of the robot body and the control of operation using the ZMP as a determination criterion for posture stability. The ZMP behavior space is defined, a stable ZMP position is determined based on the definition of the ZMP behavior space, and then the posture and the operation of the robot body are controlled so that the ZMP position continuously shifts to the center of the stable ZMP region. By successively redefining the ZMP behavior space in response to the contact condition of the robot with the walking surface, a space distortion is imparted to the ZMP behavior space so that the momentum of the robot takes place causing the ZMP position to shift to the center of the stable ZMP region. In this way, stable posture control is maintained.

In this section, the control system of the ZMP behavior space is detailed.

Figure 51:
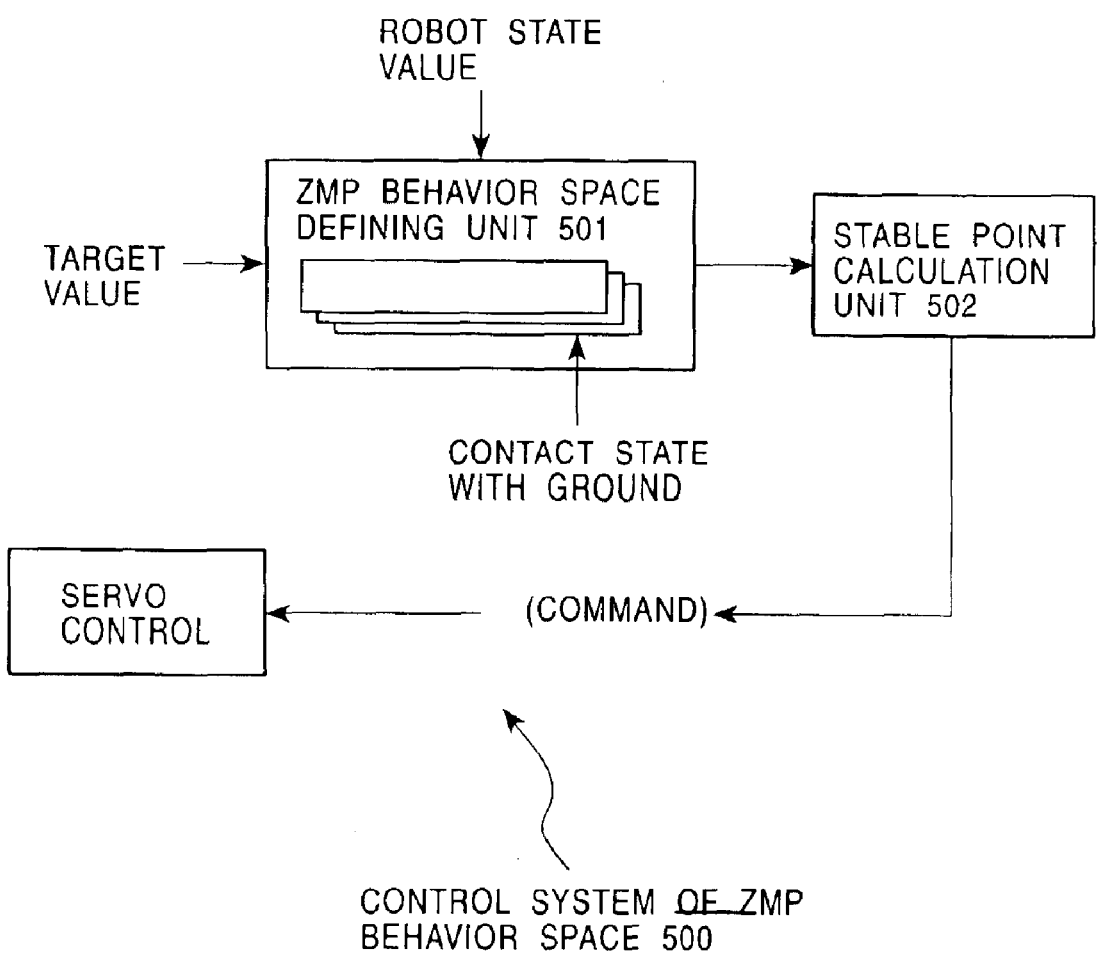
FIG. 51 is a functional block diagram illustrating the function of a control system 500 of the ZMP behavior space.

FIG. 51 is a functional block diagram illustrating the function of a control system 500 of the ZMP behavior space. The control system 500 is embodied in practice when the CPU 311 in the motion control module 300 executes a predetermined control program.

As shown, the control system 500 of the ZMP behavior space includes a ZMP behavior space defining unit 501 and a stable point calculation unit 502.

Upon receiving a target value relating to the posture of the robot body and a state value of the robot, the ZMP behavior space defining unit 501 defines the ZMP behavior space. A space distortion is formed in the defined ZMP behavior space so that the momentum of the robot takes place causing the ZMP position to shift to the center of the stable ZMP region.

The target values may include an angle of rotation, an angular speed, and an angular acceleration of each actuator calculated from a planned path. The state values of the robot body may include an angle of rotation, an angular speed, and an angular acceleration output from an encoder arranged at each actuator, signals output from other sensors on the robot body, and actual measured ZMP values.

The ZMP behavior space may be defined by the following equation, for example.

$$U = \sum_i \alpha_i \cdot \vec{T}_i + \sum_i \beta_i \cdot B(\theta_i \cdot \vec{n}_i) + \\ C \cdot \vec{F}_{zmp} + D \cdot \overrightarrow{ZMP} + \sum_i \gamma_i B \cdot \dot{\theta}_i \cdot \vec{n} + \sum_i \gamma_i B \ddot{\theta}_i \vec{n} + \ldots$$

where a vector T is a target value determined from the planned path. Matrices B, C, and D are those for space transformation.

The above defining equation of the ZMP behavior space is a description of a concept of the ZMP behavior space discussed in section B in its simplest form, and the present invention is not limited to this. The above equation is formed by linearly summing terms, and is preferably calculated taking into consideration an interference term.

In this embodiment, the ZMP behavior space defining unit 501 dynamically switches the definition of the ZMP behavior space in response to the contact condition with the walking surface. For example, the legged mobile robot repeats the operation phases in the legged action, for example, a single support phase by a left leg, a double support phase with the left leg landed, a single support phase by a right leg, and a double support phase by the right leg. The contact condition with the walking surface drastically changes at each operation phase. By successively switching the definition of the ZMP behavior space, a space distortion is formed in the ZMP behavior space so that the momentum of the robot body takes place causing the ZMP position to shift to the center of the stable ZMP region.

The stable point calculation unit 502 determines the stable point of the stable ZMP region by differentiating the definition of the ZMP behavior space twice. A command value for each actuator is formed based on the calculated stable point, and servo control of the robot body is thus performed. As a result, a space distortion for moving the ZMP position to the center of the stable ZMP region is achieved.

In accordance with the present invention, any ZMP behavior space of the robot is defined by the description of the control program executed by the CPU 311 in the motion control module 300.

The maximum point and the minimum point in the ZMP behavior space may be designated at any points. The maximum point and the minimum point in the ZMP behavior space may be designated at any points at any time. Depending on the support state of the leg, such as the later term of the single support phase, the double support phase, and the early term of the single support phase, the maximum point and the minimum point in the ZMP behavior space may be designated at any points.

By setting the maximum point and the minimum point in the ZMP behavior space, the ZMP behavior space having the space distortion, in which the stable control of the posture is easy, is dynamically generated.

In each of the above-referenced embodiments of the present invention, the ZMP behavior space is defined using the ZMP position and the floor reaction force. The ZMP behavior space may be defined using the direction and magnitude of an external force exerted on the robot body in addition to the ZMP position and the floor reaction force.

Appendix

The present invention has been discussed with reference to the particular embodiments. It is however obvious that those skilled in the art easily modify and change the embodiments without departing from the scope of the present invention.

The subject of the present invention is not necessarily limited to products called "robots". The present invention is equally applicable to any machines, which move mimicking the behavior of humans by means of electrical and magnetic effects. For example, the present invention is applicable to products in other industrial fields, such as toys.

The present invention has been disclosed with reference to exemplary embodiments, and should not be understood as limiting the scope of the present invention. In the determination of the scope of the present invention, the preceding claims should be referred to.

INDUSTRIAL APPLICABILITY

The present invention provides an excellent legged mobile robot and a control method therefor, in which the posture control of the robot is appropriately performed using a so-called ZMP (Zero Moment Point) as a stability determination criterion during a legged job.

The present invention provides an excellent legged mobile robot and a control method therefor, in which the posture control of the robot is appropriately performed using the ZMP stability determination criterion with a relatively long sampling period.

The present invention provides an excellent legged mobile robot and a control method therefor, in which a ZMP behavior space to allow the robot to continuously ambulate in a stable and autonomous fashion under living environments of human beings is formed.

In accordance with the present invention, the ZMP behavior space is defined using the ZMP position and the floor reaction force of the floor surface acting on the robot body, the stable ZMP position is determined based on the definition of the ZMP behavior space, and the command value for maintaining the stability of the robot posture is issued to each movable component. The space distortion to be imparted to the ZMP behavior space is dynamically controlled in response to the contact condition with the walking surface, and the momentum of the robot is generated to continuously shift the ZMP position to the center of the stable ZMP region. The posture control of the robot body thus becomes easy.

The present invention provides a foot structure in a movable leg unit of a legged mobile robot, in which an impact of a walking surface to which a foot is subject to during landing is absorbed, and the stable posture of the robot body which is about to be destroyed is restored or the restoration of the stable posture becomes easy.

The present invention provides an excellent legged mobile robot which easily maintains a stable posture thereof without depending solely on the operation control of the robot body.

The present invention provides an excellent legged mobile robot which easily maintains the posture stability thereof by enhancing the robustness thereof against traverse disturbances.

What is claimed is:

1. A legged mobile robot having at least two movable legs, comprising:

ZMP behavior space control means for controlling a ZMP behavior space which is defined by a ZMP position at which a pitch axis moment and a roll axis moment of the body of the robot become zero and a floor reaction force of a floor surface acting on the body of the robot, wherein the ZMP behavior space control means causes beforehand a predetermined distortion or predetermined characteristics to the ZMP behavior space so that a momentum takes place in the robot body to shift the ZMP position to the center of a stable ZMP region as the ZMP position shifts from the center of the stable ZMP region which is a supporting polygon formed of the ground contact point of a sole of the movable leg and a walking surface.

2. A legged mobile robot according to claim 1, wherein the predetermined characteristics are that the momentum of the robot changes in magnitude or direction in response to the floor reaction force.

3. A legged mobile robot according to claim 1, wherein the ZMP behavior space control means sets the momentum of the robot body to a minimum point in the approximate center of the stable ZMP region.

4. A legged mobile robot according to claim 1, wherein the ZMP behavior space control means sets the momentum of the robot body to a minimum point in the approximate center of the stable ZMP region, while setting the momentum of the robot body to a maximum point in the vicinity of the boundary of the stable ZMP region.

5. A legged mobile robot according to claim 1, wherein the ZMP behavior space control means causes a space distortion to an upstanding leg during the later term of a single support phase, in the ZMP behavior space formed of a first coordinate axis having, as a positive direction, a direction in which the ZMP position outwardly shifts out of the robot body, and a second coordinate axis having, as a positive direction, a direction in which the momentum of the robot causes the ZMP position to shift toward the center of the stable ZMP region, so that the momentum of the robot has a maximum value in a negative region of the ZMP behavior space, and so that the ZMP position of the maximum value of the momentum of the robot is shifted in a positive direction as the floor reaction force increases.

6. A legged mobile robot according to claim 1, wherein the ZMP behavior space control means causes a space distortion to an upstanding leg during the later term of a single support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region, so that the momentum of the robot in a negative region of the ZMP behavior space has a maximum value in the approximate center of the stable ZMP region, and so that a change in the momentum of the robot is decreased as the floor reaction force increases.

7. A legged mobile robot according to claim 1, wherein, in a direction perpendicular to the direction of movement, the ZMP behavior space control means causes a space distortion to an upstanding leg during the later term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control means causes a space distortion to the upstanding leg during the later term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

8. A legged mobile robot according to claim 1, wherein, in a direction perpendicular to the direction of movement, the ZMP behavior space control means causes a space distortion to a torso unit during the later term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and
  wherein, in the direction of movement, the ZMP behavior space control means causes a space distortion to the torso unit during the later term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

9. A legged mobile robot according to claim 1, wherein the ZMP behavior space control means causes a space distortion to upstanding legs during a double support phase, in the ZMP behavior space formed of a first coordinate axis having, as a positive direction, a direction in which the ZMP position outwardly shifts out of the robot body, and a second coordinate axis having, as a positive direction, a direction in which the momentum of the robot causes the ZMP position to shift toward the center of the stable ZMP region,
  so that the momentum of the robot in a negative region of the ZMP behavior space has a maximum value in the approximate center of the stable ZMP region, and so that a change in the momentum of the robot is decreased as the floor reaction force increases.

10. A legged mobile robot according to claim 1, wherein the ZMP behavior space control means causes a space distortion to upstanding legs during a double support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region,
  so that the momentum of the robot in a negative region of the ZMP behavior space has a maximum value in the approximate center of the stable ZMP region, and so that a change in the momentum of the robot is decreased as the floor reaction force increases.

11. A legged mobile robot according to claim 1, wherein, in a direction perpendicular to the direction of movement, the ZMP behavior space control means causes a space distortion to upstanding legs during a double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and
  wherein, in the direction of movement, the ZMP behavior space control means causes a space distortion to the upstanding legs during the double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

12. A legged mobile robot according to claim 1, wherein, in a direction perpendicular to the direction of movement, the ZMP behavior space control means causes a space distortion to a torso unit during a double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and
  wherein, in the direction of movement, the ZMP behavior space control means causes a space distortion to the torso unit during the double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

13. A legged mobile robot according to claim 1, wherein the ZMP behavior space control means causes a space distortion to an upstanding leg during the early term of a single support phase, in the ZMP behavior space formed of a first coordinate axis having, as a negative direction, a direction in which the ZMP position outwardly shifts out of the robot body, and a second coordinate axis having, as a positive direction, in a direction in which the momentum of the robot causes the ZMP position to shift toward the Center of the stable ZMP region,
  so that the momentum of the robot has a maximum value in a negative region of the ZMP behavior space, and so that the ZMP position of the maximum value of the momentum of the robot body is shifted in the positive direction as the floor reaction increases.

14. A legged mobile robot according to claim 1, wherein the ZMP behavior space control means causes a space distortion to an upstanding leg during the early term of a single support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region, so that the momentum of the robot in a negative region of the ZMP behavior space has a maximum value in the approximate center of the stable ZMP region, and so that a change in the momentum of the robot is decreased as the floor reaction force increases.

15. A legged mobile robot according to claim 1, wherein, in a direction perpendicular to the direction of movement, the ZMP behavior space control means causes a space distortion to an upstanding leg during the early term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control means causes a space distortion to the upstanding leg during the early term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

16. A legged mobile robot according to claim 1, wherein, in a direction perpendicular to the direction of movement, the ZMP behavior space control means causes a space distortion to a torso unit during the early term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control means causes a space distortion to the torso unit during the early term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

17. A legged mobile robot according to claim 1, wherein the ZMP behavior space control means is a foot structure of each movable leg, comprising:

a foot frame having a generally planar structure, a sole cushioning body, disposed on the sole of the foot frame, having non-linear elastic characteristics with an area having a relatively large deformation for an initial period and an area having a relatively small deformation subsequent to the initial period, and an ankle connection unit, disposed on the approximate center of the top surface of the foot frame, for linking the foot frame to the movable leg of the legged mobile robot.

18. A legged mobile robot according to claim 1, wherein the ZMP behavior space control means is a leg structure of each movable leg, the leg structure comprising:

at least one joint actuator for accomplishing degrees of freedom at the movable leg, an inner support body having a first rigidity for supporting the joint actuator on the inside of the legged mobile robot body, and an outer support body, having a second rigidity relatively larger than the first rigidity, for supporting the joint actuator on the outside of the legged mobile robot body.

19. A foot structure for a legged mobile robot having at least a plurality of movable legs, the foot structure comprising:

a foot frame having a generally planar structure, a sole cushioning body, disposed on the sole of the foot frame, having non-linear elastic characteristics with an area having a relatively large deformation for an initial period and an area having a relatively small deformation subsequent to the initial period, and an ankle connection unit, disposed on the approximate center of the top surface of the foot frame, for linking the foot frame to the movable leg of the legged mobile robot.

20. A foot structure for a legged mobile robot according to claim 19, wherein the sole cushioning body is formed of at least two cushioning materials arranged at predetermined locations on the sole of the foot frame, and wherein the cushioning materials are different in height dimensions.

21. A foot structure for a legged mobile robot according to claim 19, wherein the cushioning materials are disposed on the inside portion and the outside portion of the sole of the foot frame.

22. A foot structure for a legged mobile robot according to claim 19, wherein the cushioning materials are disposed on the inside portion and the outside portion of the sole of the foot frame, and wherein the cushioning material on the outside portion is higher in rigidity than the cushioning material on the inside portion.

23. A foot structure for a legged mobile robot according to claim 19, wherein a rigidity about a roll axis of the legged mobile robot is set to be higher than a rigidity about a pitch axis of the legged mobile robot.

24. A foot structure for a legged mobile robot according to claim 19, wherein a rigidity about a roll axis of the legged mobile robot is set to be higher than a rigidity about a pitch axis of the legged mobile robot by forming recesses on the top surface and/or the sole of the foot frame at predetermined locations thereof.

25. A legged mobile robot including at least a pair of left and right movable leg units for performing a bipedalling job, the movable leg unit comprising:

at least one joint actuator for accomplishing degrees of freedom at a movable leg, an inner support body having a first rigidity for supporting the joint actuator on the inside of the legged mobile robot body, and an outer support body, having a second rigidity relatively larger than the first rigidity, for supporting the joint actuator on the outside of the legged mobile robot body; wherein the second rigidity is 1.2 times as high as the first rigidity in terms of flexural rigidity.

26. A legged mobile robot according to claim 25, wherein the difference between the first rigidity and the second rigidity is accomplished by making a difference in thickness between the inner support body and the outer support body.

27. A legged mobile robot according to claim 25, wherein the difference between the first rigidity and the second rigidity is accomplished by making a difference in shape between the inner support body and the outer support body.

28. A legged mobile robot according to claim 25, wherein the difference between the first rigidity and the second rigidity is accomplished by fabricating the inner support body and the outer support body of materials having different mechanical strengths.

29. A legged mobile robot according to claim 25, wherein the degrees of freedom of joint of the movable leg include at least the degree of freedom about a hip roll axis and the degree of freedom about a knee roll axis.

30. A movable leg unit used in a left and right pair in a legged mobile robot performing a legged job, the movable leg unit comprising:
at least one joint actuator for accomplishing degrees of freedom at a movable leg,
an inner support body having a first rigidity for supporting the joint actuator on the inside of the legged mobile robot body, and
an outer support body, having a second rigidity relatively larger than the first rigidity, for supporting the joint actuator on the outside of the legged mobile robot body; wherein the second rigidity is 1.2 times as high as the first rigidity in terms of flexural rigidity.

31. A movable leg unit for a legged mobile robot according to claim 30, wherein the difference between the first rigidity and the second rigidity is accomplished by making a difference in thickness between the inner support body and the outer support body.

32. A movable leg unit for a legged mobile robot according to claim 30, wherein the difference between the first rigidity and the second rigidity is accomplished by making a difference in shape between the inner support body and the outer support body.

33. A movable leg unit for a legged mobile robot according to claim 30, wherein the difference between the first rigidity and the second rigidity is accomplished by fabricating the inner support body and the outer support body of materials having different mechanical strengths.

34. A movable leg unit for a legged mobile robot according to claim 30, wherein the degrees of freedom of joint of the movable leg include at least the degree of freedom about a hip roll axis and the degree of freedom about a knee roll axis.

35. A method of controlling a legged mobile robot having at least two movable legs, the method comprising a ZMP behavior space control step for controlling a ZMP behavior space defined by a ZMP position at which a pitch axis moment and a roll axis moment of the body of the robot become zero and by a floor reaction force of a floor surface acting on the robot body,
wherein the ZMP behavior space control step causes beforehand a predetermined distortion or predetermined characteristics to the ZMP behavior space so that a momentum takes place in the robot body to shift the ZMP position to the center of a stable ZMP region as the ZMP position shifts from the center of the stable ZMP region which is a supporting polygon formed of the ground contact point of a sole of the movable leg and a walking surface.

36. A method of controlling a legged mobile robot according to claim 35, wherein the predetermined characteristics are that the momentum of the robot changes in magnitude or direction in response to the floor reaction force.

37. A method of controlling a legged mobile robot according to claim 35, wherein the ZMP behavior space control step sets the momentum of the robot body to a minimum point in the approximate center of the stable ZMP region.

38. A method of controlling a legged mobile robot according to claim 35, wherein the ZMP behavior space control step sets the momentum of the robot body to a minimum point in the approximate center of the stable ZMP region, while setting the momentum of the robot body to a maximum point in the vicinity of the boundary of the stable ZMP region.

39. A method of controlling a legged mobile robot according to claim 35, wherein the ZMP behavior space control step causes a space distortion to an upstanding leg during the later term of a single support phase, in the ZMP behavior space formed of a first coordinate axis having, as a positive direction, a direction in which the ZMP position outwardly shifts out of the robot body, and a second coordinate axis having, as a positive direction, a direction in which the momentum of the robot causes the ZMP position to shift toward the center of the stable ZMP region,
so that the momentum of the robot has a maximum value in a negative region of the ZMP behavior space, and so that the ZMP position of the maximum value of the momentum of the robot is shifted in a positive direction as the floor reaction force increases.

40. A method of controlling a legged mobile robot according to claim 35, wherein the ZMP behavior space control step causes a space distortion to an upstanding leg during the later term of a single support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region,
so that the momentum of the robot in a negative region of the ZMP behavior space has a maximum value in the approximate center of the stable ZMP region, and so that a change in the momentum of the robot is decreased as the floor reaction force increases.

41. A method of controlling a legged mobile robot according to claim 35, wherein, in a direction perpendicular to the direction of movement, the ZMP behavior space control step causes a space distortion to an upstanding leg during the later term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and
wherein, in the direction of movement, the ZMP behavior space control step causes a space distortion to the upstanding leg during tine later term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

42. A method of controlling a legged mobile robot according to claim 35, wherein, in a direction perpendicular to the direction of movement, the ZMP behavior space control step causes a space distortion to a torso unit during the later term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control step causes a space distortion to the torso unit during the later term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts Out of the center of the stable ZMP region when the floor reaction force increases.

43. A method of controlling a legged mobile robot according to claim 35, wherein the ZMP behavior space control step causes a space distortion to upstanding legs during a double support phase, in the ZMP behavior space formed of a first coordinate axis having, as a positive direction, a direction in which the ZMP position outwardly shifts out of the robot body, and a second coordinate axis having, as a positive direction, a direction in which the momentum of the robot causes the ZMP position to shift toward the center of the stable ZMP region, so that the momentum of the robot in a negative region of the ZMP behavior space has a maximum value in the approximate center of the stable ZMP region, and so that a change in the momentum of the robot is decreased as the floor reaction force increases.

44. A method of controlling a legged mobile robot according to claim 35, wherein the ZMP behavior space control step causes a space distortion to upstanding legs during a double support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region, so that the momentum of the robot in a negative region of the ZMP behavior space has a maximum value in the approximate center of the stable ZMP region, and so that a change in the momentum of the robot is decreased as the floor reaction force increases.

45. A method of controlling a legged mobile robot according to claim 35, wherein, in a direction perpendicular to the direction of movement, the ZMP behavior space control step causes a space distortion to upstanding legs during a double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control step causes a space distortion to the upstanding legs during the double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

46. A method of controlling a legged mobile robot according to claim 35, wherein, in a direction perpendicular to the direction of movement, the ZMP behavior space control step causes a space distortion to a torso unit during a double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control step causes a space distortion to the torso unit during the double support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

47. A method of controlling a legged mobile robot according to claim 35, wherein the ZMP behavior space control step causes a space distortion to an upstanding leg during the early term of a single support phase, in the ZMP behavior space formed of a first coordinate axis having, as a negative direction, a direction in which the ZMP position outwardly shifts Out of the robot body, and a second coordinate axis having, as a positive direction, a direction in which the momentum of the robot causes the ZMP position to shift toward the center of the stable ZMP region, so that the momentum of the robot has a maximum value in a negative region of the ZMP behavior space, and so that the ZMP position of the maximum value of the momentum of the robot is shifted in the positive direction as the floor reaction increases.

48. A method of controlling a legged mobile robot according to claim 35, wherein the ZMP behavior space control step causes a space distortion to an upstanding leg during the early term of a single support phase, in the ZMP behavior space formed of a first coordinate axis having, as a positive direction, a direction in which the ZMP position forwardly shifts from the robot body, and a second coordinate axis having, as a positive direction, a direction in which the momentum of the robot causes the ZMP position to shift toward the center of the stable ZMP region, so that the momentum of the robot in a negative region of the ZMP behavior space has a maximum value in the approximate center of the stable ZMP region, and so that a change in the momentum of the robot is decreased as the floor reaction force increases.

49. A method of controlling a legged mobile robot according to claim 35, wherein, in a direction perpendicular to the direction of movement, the ZMP behavior space control step causes a space distortion to an upstanding leg during the early term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control step causes a space distortion to the upstanding leg during the early term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

50. A method of controlling a legged mobile robot according to claim 35, wherein, in a direction perpendicular to the direction of movement, the ZMP behavior space control step causes a space distortion to a torso unit during the early term of a single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases, and wherein, in the direction of movement, the ZMP behavior space control step causes a space distortion to the torso unit during the early term of the single support phase so that the momentum of the robot takes place causing the ZMP position to shift in a direction out of the center of the stable ZMP region as the ZMP position shifts out of the center of the stable ZMP region when the floor reaction force is small, and so that the momentum of the robot takes place causing the ZMP position to shift to the center of the stable ZMP region as the ZMP position shifts out of the center of the stable ZMP region when the floor reaction force increases.

* * * * *